(12) United States Patent
Singh et al.

(10) Patent No.: US 12,433,876 B2
(45) Date of Patent: Oct. 7, 2025

(54) SEPTIN INHIBITORS FOR TREATMENT OF CANCERS

(71) Applicant: UNIVERSITY OF ROCHESTER, Rochester, NY (US)

(72) Inventors: Rakesh K. Singh, Barrington, RI (US); Kyu K. Kim, Rochester, NY (US); Rachael Turner, Mendon, NY (US); Richard G. Moore, Victor, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 880 days.

(21) Appl. No.: 17/637,953

(22) PCT Filed: Aug. 31, 2020

(86) PCT No.: PCT/US2020/048712
§ 371 (c)(1),
(2) Date: Feb. 24, 2022

(87) PCT Pub. No.: WO2021/042022
PCT Pub. Date: Mar. 4, 2021

(65) Prior Publication Data
US 2022/0280491 A1 Sep. 8, 2022

Related U.S. Application Data

(60) Provisional application No. 62/894,424, filed on Aug. 30, 2019.

(51) Int. Cl.
| | | |
|---|---|---|
| *A61P 35/00* | (2006.01) | |
| *A61K 31/337* | (2006.01) | |
| *A61K 31/44* | (2006.01) | |
| *A61K 31/4439* | (2006.01) | |
| *A61K 31/505* | (2006.01) | |
| *A61K 31/506* | (2006.01) | |
| *A61K 39/395* | (2006.01) | |
| *C07D 213/75* | (2006.01) | |
| *C07D 239/42* | (2006.01) | |
| *C07D 401/12* | (2006.01) | |

(52) U.S. Cl.
CPC ............ *A61K 31/44* (2013.01); *A61K 31/337* (2013.01); *A61K 31/4439* (2013.01); *A61K 31/505* (2013.01); *A61K 31/506* (2013.01); *A61K 39/3955* (2013.01); *A61P 35/00* (2018.01); *C07D 213/75* (2013.01); *C07D 239/42* (2013.01); *C07D 401/12* (2013.01)

(58) Field of Classification Search
None
See application file for complete search history.

(56) References Cited

U.S. PATENT DOCUMENTS

| | | | |
|---|---|---|---|
| 3,426,031 | A | 2/1969 | Fischback |
| 5,660,827 | A | 8/1997 | Thorpe et al. |
| 5,776,427 | A | 7/1998 | Thorpe et al. |
| 5,965,132 | A | 10/1999 | Thorpe et al. |
| 6,194,388 | B1 | 2/2001 | Krieg et al. |
| 6,207,646 | B1 | 3/2001 | Krieg et al. |
| 6,239,116 | B1 | 5/2001 | Krieg et al. |
| 6,312,694 | B1 | 11/2001 | Thorpe et al. |
| 6,342,219 | B1 | 1/2002 | Thorpe et al. |

FOREIGN PATENT DOCUMENTS

| | | |
|---|---|---|
| CN | 103709097 A | 4/2014 |
| CN | 109 705 031 A | 5/2019 |
| GB | 2068365 B | 8/1981 |
| JP | 2005-538152 A | 12/2005 |
| JP | 2017-526711 A | 9/2017 |
| WO | 1997/003702 | 2/1997 |
| WO | 2004/022529 A | 3/2004 |
| WO | 2012/103523 A2 | 8/2012 |
| WO | 2016/037578 A1 | 3/2016 |
| WO | 2020/126968 A2 | 6/2020 |

OTHER PUBLICATIONS

Office Action issued in Japanese Application No. 2022-507705, dated Jul. 23, 2024.
Bhasker et al., Synthesis and antimicrobial activity of novel 1-[3-(1,8-naphthyridin-2-yl)phenyl]-3-arylurea derivatives., Asian Journal of Chemistry, 2018, 30(4), p. 771-774.
Ichihara et al., Development of self-indicating resin. 1,Combinatorial Chemistry & High Throughput Screening,2007,10(4),p. 261-267.
Abad et al., X-ray Structure of Fluorinated N-(2-Chloropyridin-4-yl)-N'-phenylureas. Role of F Substitution in the Crystal Packing., Crystal Growth & Design, 2006, 6(1), p. 46-57.
Henrie II et al., Activity optimization of pyridinyl N-oxide urea cytokinin mimics., Journal of Agricultural and Food Chemistry, 1988, 36(3), p. 626-33.
Amir, Sharon, et al. "SEPT9_v1 up-regulates hypoxia-inducible factor 1 by preventing its RACK1-mediated degradation." Journal of Biological Chemistry 284.17 (2009): 11142-11151.
Angelis, D., Karasmanis, E. P., Bai, X. & Spiliotis, E. T. In silico docking of forchlorfenuron (FCF) to septins suggests that FCF interferes with GTP binding. Plos One 9, e96390, https://doi.org/10.1371/journal.pone.0096390 (2014).
Angelis, Dimitrios, and Elias T. Spiliotis. "Septin mutations in human cancers." Frontiers in cell and developmental biology 4 (2016): 122.
Belkacemi, Yazid, et al. "Local and regional breast cancer recurrences: Salvage therapy options in the new era of molecular subtypes." Frontiers in oncology 8 (2018): 112.

(Continued)

*Primary Examiner* — Kortney L. Klinkel
*Assistant Examiner* — Donna M Nestor
(74) *Attorney, Agent, or Firm* — Meunier Carlin & Curfinan LLC

(57) ABSTRACT

The present disclosure provides novel compounds, compositions, and methods for modulating one or more septin proteins, e.g., septin-2. Such compounds and compositions are useful for the treatment of a cancer, e.g., endometrial, pancreatic, lung, breast or ovarian cancer, such as serous and ovarian clear cell carcinoma.

7 Claims, 25 Drawing Sheets

(56) References Cited

OTHER PUBLICATIONS

Blum, Walter, et al. "The phytohormone forchlorfenuron decreases viability and proliferation of malignant mesothelioma cells in vitro and in vivo." Oncotarget 10.65 (2019): 6944.

Bolger, Anthony M., Marc Lohse, and Bjoern Usadel. "Trimmomatic: a flexible trimmer for Illumina sequence data." Bioinformatics 30.15 (2014): 2114-2120.

Bridges, Andrew A., and Amy S. Gladfelter. "Septin form and function at the cell cortex." Journal of Biological Chemistry 290.28 (2015): 17173-17180.

Buza, Natalia, Dana M. Roque, and Alessandro D. Santin. "HER2/neu in endometrial cancer: a promising therapeutic target with diagnostic challenges." Archives of Pathology and Laboratory Medicine 138.3 (2014): 343-350.

Calvo, Fernando, et al. "Cdc42EP3/BORG2 and septin network enables mechano-transduction and the emergence of cancer-associated fibroblasts." Cell reports 13.12 (2015): 2699-2714.

Cantillo et al. (2017) Gynecologic Oncology 145: Supplement 1, pp. 123-124.

Caudron, Fabrice, and Yves Barral. "Septins and the lateral compartmentalization of eukaryotic membranes." Developmental cell 16.4 (2009): 493-506.

Cerveira, Nuno, Susana Bizarro, and Manuel R. Teixeira. "MLL-SEPTIN gene fusions in hematological malignancies." (2011): 713-724.

Chickering, D., J. Jacob, and E. Mathiowitz. "Poly (fumaric-co-sebacic) microspheres as oral drug delivery systems." Biotechnology and bioengineering 52.1 (1996): 96-101.

Chung, Seyung S., et al. "STAT3 activation in HER2-overexpressing breast cancer promotes epithelial-mesenchymal transition and cancer stem cell traits." International journal of oncology 44.2 (2014): 403-411.

Clayton, Alison J., et al. "Incidence of cerebral metastases in patients treated with trastuzumab for metastatic breast cancer." British journal of cancer 91.4 (2004): 639-643.

Connolly, Diana, et al. "Septin roles in tumorigenesis." (2011): 725-738.

DeFazio-Eli, Lisa, et al. "Quantitative assays for the measurement of HER1-HER2 heterodimerization and phosphorylation in cell lines and breast tumors: applications for diagnostics and targeted drug mechanism of action." Breast Cancer Research 13.2 (2011): 1-18, R44.

Diesenberg, Katrin, et al. "SEPT9 negatively regulates ubiquitin-dependent downregulation of EGFR." Journal of cell science 128.2 (2015): 397-407.

Dobin, Alexander, et al. "STAR: ultrafast universal RNA-seq aligner." Bioinformatics 29.1 (2013): 15-21.

Dolat, L. et al. Septins promote stress fiber-mediated maturation of focal adhesions and renal epithelial motility. J. Cell Biol. 207, 225-235, https://doi.org/10.1083/jcb.201405050 (2014).

Dolat, Lee, and Elias T. Spiliotis. "Septins promote macropinosome maturation and traffic to the lysosome by facilitating membrane fusion." Journal of Cell Biology 214.5 (2016): 517-527.

Dolat, Lee, Qicong Hu, and Elias T. Spiliotis. "Septin functions in organ system physiology and pathology." Biological chemistry 395.2 (2014): 123-141.

English, Diana P., Dana M. Roque, and Alessandro D. Santin. "HER2 expression beyond breast cancer: therapeutic implications for gynecologic malignancies." Molecular diagnosis & therapy 17.2 (2013): 85-99.

Fraley, Robert, and Demetrios Papahadjopoulos. "New generation liposomes: the engineering of an efficient vehicle for intracellular delivery of nucleic acids." Trends in Biochemical Sciences 6 (1981): 77-80.

Froidevaux-Klipfel, Laurence, et al. "Septin cooperation with tubulin polyglutamylation contributes to cancer cell adaptation to taxanes." Oncotarget 6.34 (2015): 36063.

Garuti, Laura, et al. "Diaryl urea: a privileged structure in anticancer agents." Current medicinal chemistry 23.15 (2016): 1528-1548.

Gonzalez, M. E., Makarova, O., Peterson, E. A., Privette, L. M. & Petty, E. M. Up-regulation of SEPT9_v1 stabilizes c-Jun-N-terminal kinase and contributes to its pro-proliferative activity in mammary epithelial cells. Cell Signal. 21, 477-487, https://doi.org/10.1016/j.cellsig.2008.11.007 (2009).

Gregoriadis, Gregory. "Liposomes for drugs and vaccines." Trends in Biotechnology 3.9 (1985): 235-241.

Hall, Peter A., and SE Hilary Russell. "The pathobiology of the septin gene family." The Journal of Pathology: A Journal of the Pathological Society of Great Britain and Ireland 204.4 (2004): 489-505.

Hayes, Daniel F., et al. "Circulating HER-2/erbB-2/c-neu (HER-2) extracellular domain as a prognostic factor in patients with metastatic breast cancer: Cancer and Leukemia Group B Study 8662." Clinical cancer research 7.9 (2001): 2703-2711.

Heasley, Lydia R., Galo Garcia III, and Michael A. McMurray. "Off-target effects of the septin drug forchlorfenuron on nonplant eukaryotes." Eukaryotic Cell 13.11 (2014): 1411-1420.

Hu, Q., Nelson, W. J. & Spiliotis, E. T. Forchlorfenuron alters mammalian septin assembly, organization, and dynamics. J. Biol. Chem. 283, 29563-29571, https://doi.org/10.1074/jbc.M804962200 (2008).

James, N. E., Chichester, C. & Ribeiro, J. R. Beyond the Biomarker: Understanding the Diverse Roles of Human Epididymis Protein 4 in the Pathogenesis of Epithelial Ovarian Cancer. Front. Oncol. 8, 124, https://doi.org/10.3389/fonc.2018.00124 (2018).

James, Nicole E., et al. "Septin-2 is overexpressed in epithelial ovarian cancer and mediates proliferation via regulation of cellular metabolic proteins." Oncotarget 10.31 (2019): 2959.

Jiang, H. et al. MicroRNA-127-3p promotes glioblastoma cell migration and invasion by targeting the tumor-suppressor gene SEPT7. Oncol. Rep. 31, 2261-2269, https://doi.org/10.3892/or.2014.3055 (2014).

Kartmann, Bettina, and Dagmar Roth. "Novel roles for mammalian septins: from vesicle trafficking to oncogenesis." Journal of cell science 114.5 (2001): 839-844.

Kim, K. K. et al. Tetrathiomolybdate inhibits mitochondrial complex IV and mediates degradation of hypoxia-inducible factor-1alpha in cancer cells. Sci. Rep. 5, 14296, https://doi.org/10.1038/srep14296 (2015).

Kopečný, David, et al. "Phenyl- and benzylurea cytokinins as competitive inhibitors of cytokinin oxidase/dehydrogenase: a structural study." Biochimie 92.8 (2010): 1052-1062.

Kuo, Yung-Che, et al. "SEPT12 orchestrates the formation of mammalian sperm annulus by organizing core octameric complexes with other SEPT proteins." Journal of cell science 128.5 (2015): 923-934.

Liao, Yang, Gordon K. Smyth, and Wei Shi. "featureCounts: an efficient general purpose program for assigning sequence reads to genomic features." Bioinformatics 30.7 (2014): 923-930.

Love, Michael I., Wolfgang Huber, and Simon Anders. "Moderated estimation of fold change and dispersion for RNA-seq data with DESeq2." Genome biology 15.12 (2014): 1-21, 50.

Marcus, Elizabeth A., et al. "Septin oligomerization regulates persistent expression of ErbB2/HER2 in gastric cancer cells." Biochemical Journal 473.12 (2016): 1703-1718.

Marttinen, Mikael, et al. "Synaptic dysfunction and septin protein family members in neurodegenerative diseases." Molecular neurodegeneration 10.1 (2015): 1-12.

Mathiowitz, Edith, et al. "Biologically erodable microspheres as potential oral drug delivery systems." Nature 386.6623 (1997): 410-414.

Mizutani, Y. et al. Possible role of a septin, SEPT1, in spreading in squamous cell carcinoma DJM-1 cells. Biol. Chem. 394, 281-290, https://doi.org/10.1515/hsz-2012-0258 (2013).

Moore, R. G. et al. Serum HE4 levels are less frequently elevated than CA125 in women with benign gynecologic disorders. Am. J. Obstet. Gynecol. 206, 351 e351-358, https://doi.org/10.1016/j.ajog.2011.12.029 (2012).

Moore, R. G. et al. Utility of a novel serum tumor biomarker HE4 in patients with endometrioid adenocarcinoma of the uterus. Gynecol. Oncol. 110, 196-201, https://doi.org/10.1016/j.ygyno.2008.04.002 (2008).

(56) References Cited

OTHER PUBLICATIONS

Moore, Richard G., et al. "HE4 (WFDC2) gene overexpression promotes ovarian tumor growth." Scientific reports 4.1 (2014): 3574, 1-7.

Moore, Richard G., et al. "The use of multiple novel tumor biomarkers for the detection of ovarian carcinoma in patients with a pelvic mass." Gynecologic oncology 108.2 (2008): 402-408.

Morris, Patrick G., Heather L. McArthur, and Clifford A. Hudis. "Therapeutic options for metastatic breast cancer." Expert opinion on pharmacotherapy 10.6 (2009): 967-981.

Mostowy, Serge, and Pascale Cossart. "Septins: the fourth component of the cytoskeleton." Nature reviews Molecular cell biology 13.3 (2012): 183-194.

Mostowy, Serge, et al. "Entrapment of intracytosolic bacteria by septin cage-like structures." Cell host & microbe 8.5 (2010): 433-444.

Pagliuso, Alessandro, et al. "A role for septin 2 in Drp1-mediated mitochondrial fission." EMBO reports 17.6 (2016): 858-873.

Pintard, Lionel, Andrew Willems, and Matthias Peter. "Cullin-based ubiquitin ligases: Cul3-BTB complexes join the family." The EMBO journal 23.8 (2004): 1681-1687.

Pohlmann, Paula R., Ingrid A. Mayer, and Ray Mernaugh. "Resistance to trastuzumab in breast cancer." Clinical cancer research 15.24 (2009): 7479-7491.

R Core Team. R: A language and environment for statistical computing. R Foundation for Statistical Computing, Vienna, Austria. (2016). URL https://www.R-project.org/.

Ruiz-Saenz, Ana, et al. "HER2 Amplification in Tumors Activates PI3K/Akt Signaling Independent of HER3HER2-Amplified Tumors Overcome the Requirement for HER3." Cancer research 78.13 (2018): 3645-3658.

Rüschoff, Josef, et al. "HER2 testing in gastric cancer: a practical approach." Modern Pathology 25.5 (2012): 637-650.

Russell, S. E. H., and P. A. Hall. "Do septins have a role in cancer ?." British journal of cancer 93.5 (2005): 499-503.

Sadeghian-Rizi, Sedighe, et al. "Synthesis and characterization of some novel diaryl urea derivatives bearing quinoxalindione moiety." Research in Pharmaceutical Sciences 13.1 (2018): 82.

Sawhney, Amarpreet S., Chandrashekhar P. Pathak, and Jeffrey A. Hubbell. "Bioerodible hydrogels based on photopolymerized poly (ethylene glycol)-co-poly (.alpha.-hydroxy acid) diacrylate macromers." Macromolecules 26.4 (1993): 581-587.

Schmidt, K., Nichols, BJ. Functional interdependence between septin and actin cytoskeleton. BMC Cell Biol.12,43 (2004).

Siegel, R. L., Miller, K. D. & Jemal, A. Cancer Statistics, 2017. CA Cancer J. Clin. 67, 7-30, https://doi.org/10.3322/caac.21387 (2017).

Sirianni, Andrea, et al. "Mitochondria mediate septin cage assembly to promote autophagy of Shigella." EMBO reports 17.7 (2016): 1029-1043.

Slamon, Dennis J., et al. "Human breast cancer: correlation of relapse and survival with amplification of the HER-2/neu oncogene." science 235.4785 (1987): 177-182.

Tokhtaeva, Elmira, et al. "Septin dynamics are essential for exocytosis." Journal of Biological Chemistry 290.9 (2015): 5280-5297.

Traikov, Sofia, et al. "Septin6 and Septin7 GTP binding proteins regulate AP-3- and ESCRT-dependent multivesicular body biogenesis." PloS one 9.11 (2014): e109372.

Uhlén, Mathias, et al. "Proteomics. Tissue-based map of the human proteome." Science (New York, NY) 347.6220 (2015): 1260419-1260419.

Uhlen, Mathias, et al. "Towards a knowledge-based human protein atlas." Nature biotechnology 28.12 (2010): 1248-1250.

Vardi-Oknin, Dikla, Maya Golan, and Nicola J. Mabjeesh. "Forchlorfenuron disrupts SEPT9_i1 filaments and inhibits HIF-1." PloS one 8.8 (2013): e73179.

Yamazaki, Tomokazu, et al. "Localization and evolution of septins in algae." The Plant Journal 74.4 (2013): 605-614.

Zhang, Nianzhu, et al. "The requirement of SEPT2 and SEPT7 for migration and invasion in human breast cancer via MEK/ERK activation." Oncotarget 7.38 (2016): 61587.

International Search Report and Written Opinion issued in PCT/US2020/048712, dated Nov. 13, 2020, 19 pages.

Hu, Qicong et al. "Forchlorfenuron Alters Mammalian Septin Assembly, Organization, and Dynamics," Journal of Biological Chemistry, vol. 283, No. 43, Oct. 24, 2008.

Suarez-Pantaleon, Celia et al. "Forchlorfenuron-mimicking haptens: from immunogen design to antibody characterization by hierarchical clustering analysis," Organic & Biomolecular Chemistry, vol. 9, No. 13, Jan. 1, 2011.

Takahashi, Soshiro et al. "Cytokinin activity of N-phenyl-N'-(4-pyridyl)urea derivatives," Phytochemistry, vol. 17, No. 8, Jan. 1, 1978.

Takami, A. et al. "Design and synthesis of Rho kinase inhibitors (I)," Bioorganic & Medicinal Chemistry, Elsevier, NL, vol. 12, No. 9, May 1, 2004.

Lehtonnen, Sanna et al. "Septin in kidney: A territory little explored," Cytoskeleton, Jul. 13, 2018, pp. 154-162, Retrieved from the Internet: URL:https://doi.org/10.1002/cm.21477.

SEPTIN INHIBITORS FOR TREATMENT OF CANCERS

CROSS REFERENCE TO RELATED APPLICATIONS

This is a national stage application filed under 35 U.S.C. § 371 of PCT International Application No. PCT/US2020/048712, entitled "SEPTIN INHIBITORS FOR TREATMENT OF CANCERS," and filed Aug. 31, 2020, which claims the benefit of priority of U.S. Provisional Application No. 62/894,424, filed Aug. 30, 2019, the disclosures of which are incorporated herein by reference in their entireties.

BACKGROUND

Therapeutic options for the treatment of liver, lung, renal and pancreatic cancer continue to be needed. Similarly, for patients with the progressed cancers, such as ovarian cancers and endometrial cancers, effective therapeutic options are limited. Successive second and third line therapies do not add meaningful responses besides adding numerous life-debilitating toxicities.

Therefore, identification of molecular targets driving the tumorigenesis and development of targeted therapies against such driver genes is needed to improve the survival rate of patients diagnosed with these lethal malignancies.

Septins are cytoskeletal-like GTP-binding proteins, which are essential for several biological processes, such as cytokinesis, cell migration, chromosomal dynamics and protein secretion (Dolat et al. (2014) *J Cell Biol* 207(2): 225-235, Mostowy and Cossart (2012) *Nat Rev Mol Cell Biol* 13(3): 183-194, and Tokhtaeva et al. (2015) *J Biol Chem* 290(9): 5280-5297). Altered expression and gene mutation of septins have been identified in multiple malignancies.

SUMMARY OF THE INVENTION

The invention provides compounds, compositions, kits, articles of manufacture, and methods for their uses. Exemplary compounds, illustrated with their structures, are provided herein. Exemplary uses are described herein, including but not limited to inhibiting or reducing septin protein expression levels and/or activity, in vitro, ex vivo, or in vivo, inhibiting or reducing viability and/or proliferation of a cell expressing septin, and preventing or treating, e.g., reducing and/or delaying symptoms of, a cancer, a tumor, a metastasis, as well as other neurological and/or psychological disorders or conditions, by inhibiting or reducing viability and/or proliferation of cancer cells expressing Septin. Exemplary cancers, tumor, metastasis, disorders or conditions include, but are not limited to, gynecologic cancer, pancreatic cancer, endometrial cancer, liver cancer, renal cancer, hematologic cancers, central nervous system (CNS) cancer, and others described herein.

The invention provides compounds as modulators of septin proteins. Such modulators are capable of reducing or increasing septin expression and/or activity in vitro, ex vivo, and/or in vivo. In some embodiments, such modulators are capable of reducing or antagonizing septin expression and/or activity.

The septin protein described herein is any one or a combination of septin proteins known in the art, e.g., septin-1, septin-2, septin-3, septin-4, septin-5, septin-6, septin-7, septin-8, septin-9, septin-10, septin-11, septin-12, and/or septin-14. In some embodiments, the septin protein is septin-2, septin-4, septin-9, and/or septin-14. In some embodiments, the septin protein is septin-2 or septin-9. In some embodiments, the septin protein is septin-2.

In one embodiment, the present invention provides novel compounds, compositions, and methods of their use, e.g., to inhibit septin proteins. In certain embodiments, the compounds can be used in a method to treat a cancer, e.g., ovarian cancer such as ovarian clear cell carcinoma.

Disclosed herein is an exemplary compound of formula (I):

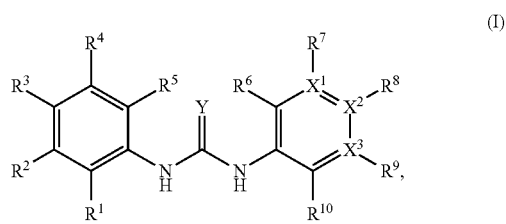

or a pharmaceutically acceptable salt thereof,
wherein:
each of $X^1$, $X^2$, and $X^3$ is independently C or N, wherein at least one of $X^1$, $X^2$, and $X^3$ is N;
Y is O, S, NH, N—OH, N—OR$^{11}$, or NR$^{11}$;
each of $R^1$, $R^2$, $R^3$, $R^4$, $R^5$, $R^6$, and $R^{10}$ is independently H, F, Cl, Br, I, $NO_2$, (C=O)—R$^{11}$, (C=O)—OR$^{11}$, (C=O)—NHR$^{11}$, (C=O)—N(R$^{11}$)$_2$, $C_1$-$C_6$ alkyl, $C_2$-$C_6$ alkenyl, $C_2$-$C_6$ alkynyl, $C_6$-$C_{10}$ aryl or 5-10 membered heteroaryl, wherein the $C_1$-$C_6$ alkyl, $C_2$-$C_6$ alkenyl, $C_2$-$C_6$ alkynyl, $C_6$-$C_{10}$ aryl or 5-10 membered heteroaryl optionally comprises one, two, three, or more substitutions with F, Cl, Br, I, (C=O)—R$^{11}$, (C=O)—OR$^{11}$, (C=O)—NHR$^{11}$, (C=O)—N(R$^{11}$)$_2$, $C_1$-$C_6$ alkyl, $C_6$-$C_{10}$ aryl or 5-10 membered heteroaryl;
each of $R^7$, $R^8$, and $R^9$, when present, is independently H, F, Cl, Br, I, $NO_2$, (C=O)—R$^{11}$, (C=O)—OR$^{11}$, (C=O)—NHR$^{11}$, (C=O)—N(R$^{11}$)$_2$, $C_1$-$C_6$ alkyl, $C_2$-$C_6$ alkenyl, $C_2$-$C_6$ alkynyl, $C_6$-$C_{10}$ aryl or 5-10 membered heteroaryl, wherein the $C_1$-$C_6$ alkyl, $C_2$-$C_6$ alkenyl, $C_2$-$C_6$ alkynyl, $C_6$-$C_{10}$ aryl or 5-10 membered heteroaryl optionally comprises one, two, three, or more substitutions with F, Cl, Br, I, (C=O)—R$^{11}$, (C=O)—OR$^{11}$, (C=O)—NHR$^{11}$, (C=O)—N(R$^{11}$)$_2$, $C_1$-$C_6$ alkyl, $C_6$-$C_{10}$ aryl or 5-10 membered heteroaryl; and
each $R^{11}$ is independently $C_1$-$C_6$ alkyl, $C_2$-$C_6$ alkenyl, $C_2$-$C_6$ alkynyl, $C_6$-$C_{10}$ aryl or 5-10 membered heteroaryl, wherein the $C_1$-$C_6$ alkyl, $C_2$-$C_6$ alkenyl, $C_2$-$C_6$ alkynyl, $C_6$-$C_{10}$ aryl or 5-10 membered heteroaryl optionally comprises one, two, three, or more substitutions with F, Cl, Br, I, (C=O)—($C_1$-$C_6$ alkyl), (C=O)—O($C_1$-$C_6$ alkyl), (C=O)—NH($C_1$-$C_6$ alkyl), or (C=O)—N($C_1$-$C_6$ alkyl)$_2$.

In some embodiments, the compounds described herein comprise the structure of:

(UR214-7)

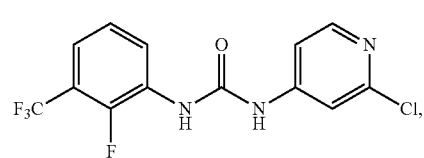

-continued (UR214-8)
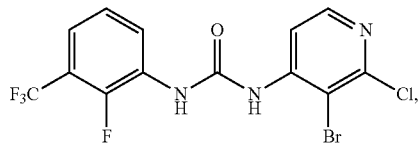

(UR214-9)
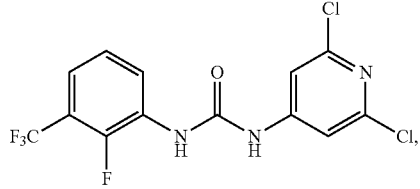

(UR214-10)
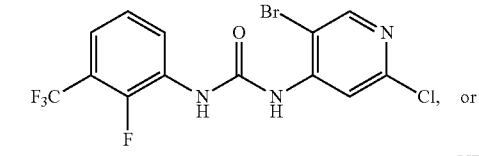

(UR214-11)
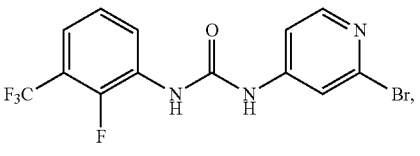

or a pharmaceutically acceptable salt thereof.

In some embodiments, the compounds described herein comprise the structure of:

(UR214-9)
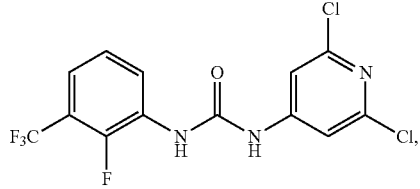

or a pharmaceutically acceptable salt thereof.

In some embodiments, the $X^2$ position in the compounds described herein is N. In some embodiments, both the $X^1$ and $X^3$ positions in the compounds described herein are C.

In some embodiments, the compounds described herein comprise the structure of formula (II):

(II)
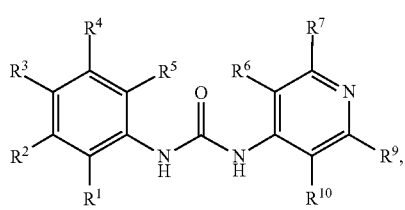

or a pharmaceutically acceptable salt thereof.

In some embodiments, the compounds described herein comprise the structure of formula (III):

(III)
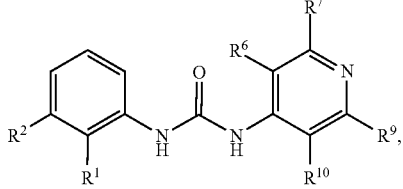

or a pharmaceutically acceptable salt thereof.

In some embodiments, the compounds described herein comprise the structure of formula (IV):

(IV)
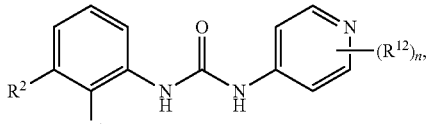

or a pharmaceutically acceptable salt thereof. Optionally, the compounds described herein comprise the structure of formula (IV), wherein each $R^{12}$ is independently F, Cl, Br, I, $NO_2$, (C=O)—$R^{11}$, (C=O)—$OR^{11}$, (C=O)—$NHR^{11}$, (C=O)—$N(R^{11})_2$, $C_1$-$C_6$ alkyl, $C_2$-$C_6$ alkenyl, $C_2$-$C_6$ alkynyl, $C_6$-$C_{10}$ aryl or 5-10 membered heteroaryl, wherein the $C_1$-$C_6$ alkyl, $C_2$-$C_6$ alkenyl, $C_2$-$C_6$ alkynyl, $C_6$-$C_{10}$ aryl or 5-10 membered heteroaryl optionally comprises one, two, three, or more substitutions with F, Cl, Br, I, (C=O)—$R^{11}$, (C=O)—$OR^{11}$, (C=O)—$NHR^{11}$, (C=O)—$N(R^{11})_2$, $C_1$-$C_6$ alkyl, $C_6$-$C_{10}$ aryl or 5-10 membered heteroaryl; and n is 1 or 2.

In some embodiments, for the compounds described herein, $R^1$ is F, Cl, Br, I, $NO_2$, (C=O)—$R^{11}$, (C=O)—$OR^{11}$, (C=O)—$NHR^{11}$, (C=O)—$N(R^{11})_2$, or $C_1$-$C_6$ alkyl, wherein the $C_1$-$C_6$ alkyl optionally comprises one, two, three, or more substitutions with F, Cl, Br, I, or phenyl.

In some embodiments, for the compounds described herein, $R^2$ is F, Cl, Br, I, $NO_2$, (C=O)—$R^{11}$, (C=O)—$OR^{11}$, (C=O)—$NHR^{11}$, (C=O)—$N(R^{11})_2$, or $C_1$-$C_6$ alkyl, wherein the $C_1$-$C_6$ alkyl optionally comprises one, two, three, or more substitutions with F, Cl, Br, I, or phenyl.

In some embodiments, for the compounds described herein, each of $R^1$ and $R^2$ is independently F, Cl, Br, I, or $C_1$-$C_6$ alkyl, wherein the $C_1$-$C_6$ alkyl optionally comprises one, two, three, or more substitutions with F, Cl, Br, I, or phenyl.

In some embodiments, for the compounds described herein, $R^{12}$ is an ortho substituent.

In some embodiments, for the compounds described herein, each $R^{12}$ is F, Cl, Br, I, or $C_1$-$C_6$ alkyl, wherein the $C_1$-$C_6$ alkyl optionally comprises one, two, three, or more substitutions with F, Cl, Br, or I.

In some embodiments, for the compounds described herein, each $R^{11}$ is independently $C_1$-$C_6$ alkyl, $C_2$-$C_6$ alkenyl, $C_2$-$C_6$ alkynyl, $C_6$-$C_{10}$ aryl or 5-10 membered heteroaryl, wherein the $C_1$-$C_6$ alkyl, $C_2$-$C_6$ alkenyl, $C_2$-$C_6$ alkynyl, $C_6$-$C_{10}$ aryl or 5-10 membered heteroaryl optionally comprises one, two, three, or more substitutions with F, Cl, Br, I, (C═O)—(C$_1$-C$_6$ alkyl), (C═O)—O(C$_1$-C$_6$ alkyl), (C═O)—NH(C$_1$-C$_6$ alkyl), or (C═O)—N(C$_1$-C$_6$ alkyl)$_2$.

In some embodiments, the compounds described herein is forchlorfenuron (FCF). In some embodiments, the compounds described herein is not FCF. For example, the compounds described herein include FCF analogs but not FCF.

In some embodiments, for the compounds described herein, i) R$^2$ is not a phenoxy; or ii) R$^3$ is not an imidazolyl or pyrimidinyl.

In some embodiments, the compounds described herein comprise the structure of:

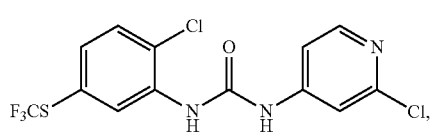
(UR214-1)

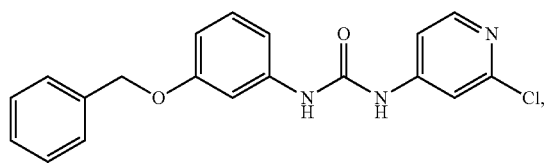
(UR214-2)

(UR214-3)
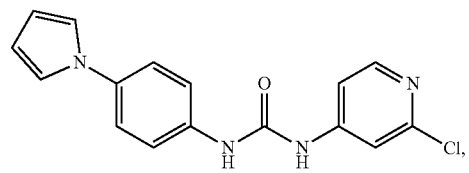

(UR214-4)
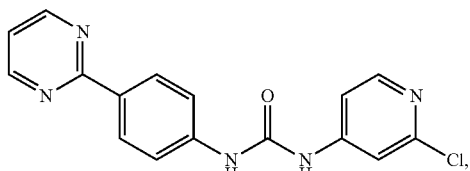

(UR214-5)
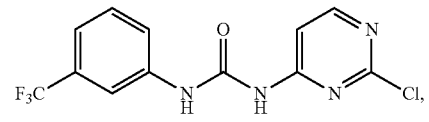

(UR214-6)
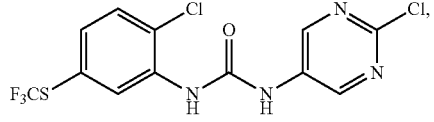

(UR214-7)
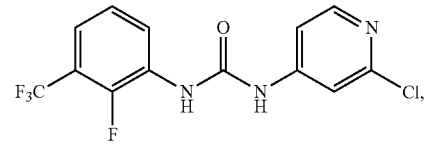

(UR214-8)
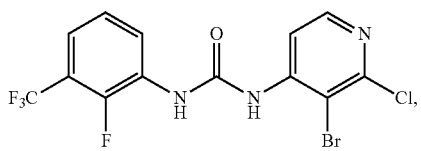

(UR214-9)
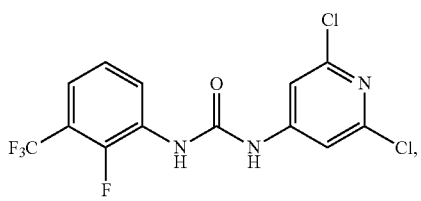

(UR214-10)
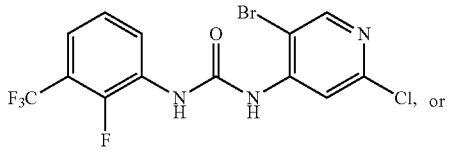

(UR214-11)
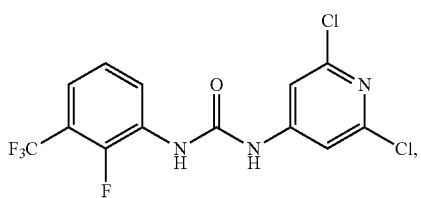

or a pharmaceutically acceptable salt thereof.

In some embodiments, the compounds described herein comprise the structure of:

(UR214-1)
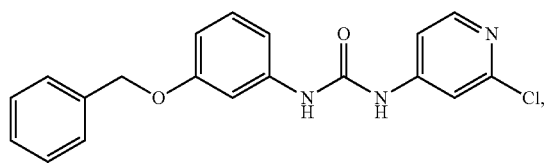

(UR214-7)
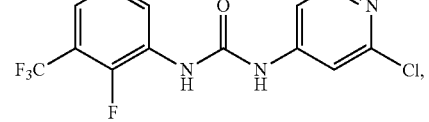

(UR214-8)

(UR214-9)

-continued (UR214-10)
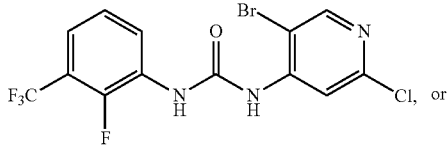

(UR214-11)
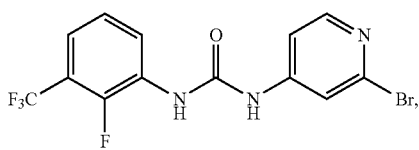

or a pharmaceutically acceptable salt thereof.

In some embodiments, the compounds described herein comprise the structure of:

(UR214-7)
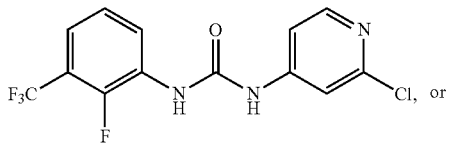

(UR214-9)
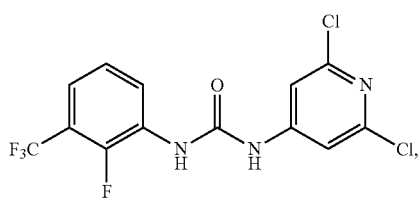

or a pharmaceutically acceptable salt thereof.

The invention provides a composition, preferably a pharmaceutical composition, comprising at least one of the compounds described herein, or a pharmaceutically acceptable salt thereof, and, optionally, a pharmaceutically acceptable excipient.

The invention also provides a kit comprising at least one of the compounds described herein, or a pharmaceutically acceptable salt thereof, or at least one of the compositions, preferably pharmaceutical compositions, described herein, and, optionally, instructions for use of the at least one of the compounds, the pharmaceutically acceptable salt thereof, or the at least one of the compositions.

The invention also provides an articles of manufacture comprising a unit dosage of at least one of the compounds described herein, or a pharmaceutically acceptable salt thereof, or at least one of the compositions, preferably pharmaceutical compositions, described herein, in suitable packaging for use of the at least one of the compounds, the pharmaceutically acceptable salt thereof, or the at least one of the compositions.

In some embodiments, the compounds, compositions, preferably pharmaceutical compositions, the kits, or the article of manufacture, described herein, are capable of:

i) causing septin filament catastrophe;
ii) reducing activity of a septin protein;
iii) reducing activity of a septin, actin and/or tubulin protein in a cell;
iv) disrupting cellular location of a Septin protein;
v) reducing viability or proliferation of a cell expressing a Septin protein;
vi) stalling cell cycle progression;
vii) inducing cell apoptosis;
viii) decreasing HE (e.g., HE4) secretion from a cell;
ix) reducing HER2 expression in a cell; or
x) when under a therapeutically effective amount, treating a subject having a disease or disorder characterized of increased expression or activity of a septin protein. In some embodiments, the cell is a cancer cell.

The invention also provides a method of reducing activity of a septin protein, comprising contacting the septin protein with the compounds, compositions, preferably pharmaceutical compositions, the kits, or the article of manufacture, described herein.

The invention also provides a method of reducing activity of a septin protein in a cell, comprising contacting the septin protein with the compounds, compositions, preferably pharmaceutical compositions, the kits, or the article of manufacture, described herein.

The invention also provides a method of reducing viability of a cell, comprising contacting the cell with the compounds, compositions, preferably pharmaceutical compositions, the kits, or the article of manufacture, described herein.

In some embodiments, the compounds or compositions disrupt cellular location of the septin protein, reduce cell proliferation, stall cell cycle progression (e.g., at S phase), induce cell apoptosis, decrease HE4 secretion from the cell, reduce HER2 expression (preferably, without reducing EGFR expression) in the cell. In some embodiments, the cell is a cancer cell. In some embodiments, the cell overexpresses the septin protein, such as Septin-2 and/or Septin-9.

The cancer type for treatment using the compounds, compositions, preferably pharmaceutical compositions, the kits, or the article of manufacture, described herein, includes at least one of cancers described herein, such as pancreatic cancer, breast cancer, lung cancer (e.g. small cell and non-small cell lung cancer), kidney (renal) cancer, liver cancer, ovarian cancer, endometrial cancer, basal cell carcinoma, biliary tract cancer, bladder cancer, bone cancer, brain and/or CNS cancer, cervical cancer, choriocarcinoma, colon and rectum cancer, connective tissue cancer, cancer of the digestive system, endometrial cancer, esophageal cancer, eye cancer, fibroma, cancer of the head and neck, gastric cancer, intra-epithelial neoplasm, larynx cancer, leukemia (e.g., acute myeloid leukemia, acute lymphoid leukemia, chronic myeloid leukemia, chronic lymphoid leukemia, etc.), lymphoma (e.g., Hodgkin's and Non-Hodgkin's lymphoma), melanoma, oral cavity cancer (e.g., lip, tongue, mouth, and pharynx), prostate cancer, retinoblastoma, rhabdomyosarcoma, rectal cancer, cancer of the respiratory system, sarcoma, skin cancer, stomach cancer, testicular cancer, thyroid cancer, uterine cancer, cancer of the urinary system, as well as other carcinomas and sarcomas, or any combination thereof. In some embodiments, the cancer described herein comprises an ovarian cancer, an endometrial cancer, a kidney (renal) cancer, a lung cancer, a liver cancer, a pancreatic cancer, a colorectal cancer, a skin cancer, a brain cancer, a neuroblastoma, a breast cancer, or a blood cancer such as leukemia and/or lymphoma. In some embodiments, the cancer comprises a pancreatic, breast, lung, kidney, liver, ovarian, or an endometrial cancer, or any combination thereof. In some embodiments, the cancer comprises an ovarian clear cell carcinoma (OCCC).

Optionally, when administering the compounds, compositions, preferably pharmaceutical compositions, the kits, or the article of manufacture, described herein, to the cells, a second agent or therapy capable of reducing cell viability is also adminstered, at the same time, before, or after administering the compounds, compositions, preferably pharmaceutical compositions, the kits, or the article of manufacture, described herein.

The invention also provides a method of treating a cancer in a subject (preferably, a subject expressing or overexpressing a septin protein) in need thereof, comprising administering to the subject a therapeutically effective amount of the compounds, compositions, preferably pharmaceutical compositions, the kits, or the article of manufacture, described herein. In some embodiments, the compounds or compositions disrupt cellular location of the septin protein, reduce cell proliferation, stall cell cycle progression (e.g., at S phase), induce cell apoptosis, decrease HE4 secretion from the cell, reduce HER2 expression (preferably, without reducing EGFR expression) in the cell. In some embodiments, the cell is a cancer cell. In some embodiments, the cell overexpresses the septin protein, such as Septin-2 and/or Septin-9.

Compounds and compositions described herein are delivered to the subject through any one of routes found suitable by a doctor and/or known in the art. Exemplary delivery routes include intrathecal, intravenous (IV), sub-cutaneous, oral, skin patch, nasal aerosol, etc. In some embodiments, route of administration comprises least intrusive modes of delivery such as oral or IV administration.

The subject is one of any subjects described herein. In some embodiments, the subject is a mammal. In some embodiments, the subject is a human, a non-human primate, a mouse, a rat, a hamster, a guinea pig, a moneky, an ape, a rabbit, a cat, a dog, a horse, a pig, a lion, a tiger, or a wolve.

BRIEF DESCRIPTION OF THE DRAWINGS

In FIG. 2A, cell lines were treated with a fixed concentration (100 µM) of FCF or the disclosed compounds for 24 hours. After treatment, cell viability was determined by MTS assay. (N=3). In FIG. 2B, ECC-1 cells were treated with UR214-7 or UR214-9 at the listed concentrations for 48 hours. After treatment, cell viability was determined by MTS assay (left). Cell proliferation was measured by BrdU incorporation (right). In FIG. 2C, ECC-1 cells were treated with vehicle, UR214-7, and UR-214-9 at the indicative concentrations for 24 or 72 ours. Cell viability was determined by MTS assay. In FIG. 2D, ECC-1 cells were treated with UR214-7 and UR214-9 at 33 µM for 48 hours. Cells undergoing apoptosis were measured by caspase-3/7 activity assay. In FIG. 2E, each indicated cells were treated with concentrations of the disclosed compounds for 72 hours. After treatment, cell viability was determined by MTS assay.

In FIG. 3A, ECC-1 or HCH-1 cells were incubated with UR214-7 (33 µM), UR214-9 (33 µM), or FCF (300 µM) for 24 hours. The levels of each protein were determined by Western blot analysis. In FIG. 3B, HCH-1 cells were incubated with UR214-9 (10 µM) or FCF (100 µM) for 48 hours (top) or transfected with septin-2 targeting siRNA or non-targeting control siRNA for 24 or 40 hours (bottom). Cell lysates were collected. The cellular levels of HER2 were determined by human HER2 enzyme-linked immunosorbent assay. In FIG. 3C, the cells were transfected with septin-2 targeting siRNA or non-targeting control siRNA. At 48 hours post transfection, cell population and relative expression of septin-2 were determined by sulforhodamine B assay (top) and Western blot analysis (bottom), respectively.

In FIG. 4A, HE4 overexpression clones (OVCAR8-C5) were treated with or without FCF (300 µM) for 7 hours, after which the cell lysates and matching culture media were collected and analyzed for the levels of HE4 using enzyme immunoassays. The amount of secreted HE4 was normalized to the protein concentration of respective cell lysate. In FIG. 4B, ECC-1 and HCH-1 cells treated with the indicated concentrations of FCF for 5 hours and the secreted levels of HE4 measured. In FIG. 4C, ECC-1 cells were treated with either UR214-1, UR214-7 or FCF at the concentrations indicated for 5 hours at which point the secreted levels of HE4 were determined. In FIG. 4D, ECC-1 cells were washed and incubated with FCF (300 µM) for 5 hours in basal media. Relative HE4 expression was determined by real time PCR (normalized to B2M). In FIG. 4E, ECC-1 cells were transfected with septin-2 targeting siRNA or non-targeting control siRNA for 48 hours (bottom) or for 72 hours (top). Relative gene expression of HE4 was determined by real time PCR (normalized to TBP; bottom). The intracellular levels of HE4 were measured using enzyme immunoassays (top).

In FIG. 5A the correlation of septins with survival rates of endometrial cancer patients was analyzed using the TCGA dataset. (p<0.05); x-axis: days; y-axis: survival fractions. FIG. 5B shows relative expression of septin-2, -3, and -7 in endometrial cancers (TCGA dataset). In FIG. 5C, relative gene expression of various septins was analyzed from the dataset (Wong-77-MAS5.0-u133p2), which contains gene expression profiling of microdissected cancer stroma samples from high grade serous ovarian cancer patients (red) and those from normal ovarian stroma (blue). (**p<0.01, Student's t-test vs. microdissected normal ovarian stroma).

In FIGS. 6A, 6B, and 6C, septin-2 expression in normal and malignant pancreatic, ovarian and breast cancer tissues were analyzed using the publicly accessible patient's tumor microarray data deposited on R2-Genomics Analysis and Visualization Platform. In FIG. 6D, Kaplan Meier survival analyses of the pancreatic, ovarian and breast cancer patients using the data and tools available at the Human protein Atlas or at R2-Genomics Analysis and Visualization Platform show that septin-2 enrichment correlates with decreased survival In FIG. 6E, pancreatic tumor microarray from US Biomax Inc was stained with septin-2 antibody, followed by sourced-matched secondary antibody. Images were recorded as described herein. Malignant tissues showed higher septin-2 expression than tissues isolated from normal pancreas. In FIG. 6F, malignant serous ovarian cancer tissues showed increased septin-2 expression than normal ovaries. Ovarian tumor microarray from US Biomax Inc was stained with septin-2 antibody followed by sourced-matched secondary antibody. Images were acquired as described herein.

FIG. 7A shows the chemical structure of FCF and UR214-9, highlighting the structural changes to FCF leading to UR214-9. In FIG. 7B, BXPC-3, CAPAN-1 and PANC-1 cells were seeded on glass slides and treated with DMSO or FCF (60 µM) for 48 hours. The cells were fixed, processed and stained with validated septin-2 antibody and source-matched secondary antibody, and confocal images were recorded at 60×2 magnification. In FIG. 7C, PANC-1 and JIMT-1 seeded on glass chamber slides cells were treated with DMSO (vehicle) or UR214-9 (1 µM) for 48 hours. Cells were fixed, permeabilized and stained with septin-2 antibody and DyLight 488 conjugated secondary antibody, and confocal images were recorded at 60×2 magnification. In FIG. 7D, PANC-1 cells were seeded in 100 mm$^3$ dishes and treated with DMSO, FCF (60 µM), UR214-9 (1.0 and 10.0 µM) for 48 hours. Total cell lysates were immunoblotted and probed with validated septin-2, -6, -7, and -9 antibodies. In FIG. 7E, MDA-MT-231, JIMT-1 and MCF-7 cells seed in 100 mm$^3$ petri dishes were treated with DMSO or UR214-9 (10 and 30 µM) for 48 hours. The total cell lysates were immunoblotted and probed with validated septin-2, -6, and -9 antibodies. In FIGS. 7F-7G, SKOV-3 ovarian cancer cells seeded on glass chamber slides were treated with DMSO (vehicle) or UR214-9 (1 µM) for 48 hours. Cells were fixed, permeabilized and stained with validated septin-2, -6, -7, and -9 antibodies followed by DyLight 488 conjugated secondary antibody, and confocal images were recorded at 60×2 magnification.

In FIGS. 9A-9B, septin-2:septin-2 dimer complex was docked with FCF, UR214-8, UR214-9, and UR214-10 using Molsoft's ICM software package (v. 3.8-7). Compounds were docked into the nucleotide binding site of PDB ID 2QNR, which is the highest quality structure of a septin-2 dimer complex available. Receptor preparation (based on the GDP binding site in chain A) and ligand construction was performed within ICM using standard settings. The compounds were docked with the "dock table" functionality, with a setting for effort of 2.0 and 20 poses per compound. In FIGS. 9C-9D, amino acid residues interacting with UR214-9 in GDP binding domain are shown.

In FIG. 10A, cell viability of PANC-1 and BXPC-3 cells treated with UR214-9 (DMSO, 1.25, 2.5, 5, 10 and 20 µM) for 72 hours. The cell viability of the treated groups in comparison with DMSO group was assessed by use of MTS assay and absorbance was read at 490 nM using BioRad microplate reader. In FIGS. 10B-10C, PANC-1 and BXPC-3 cells were treated with UR214-9 (3 µM) or DMSO for 48 hours. The cells were stained with Live-dead near IR dye and the live and dead population in vehicle and control group was estimated by flow cytometry. In FIG. 10D, NSG mice (n=10) were inoculated with PANC-1 cells (1 million/animal). Once tumors were palpable, mice were divided into two groups of n-5 each and treated with vehicle or UR214-9 (25 mg, M-F, IP, once daily) for 52 days. The tumor sizes were measured periodically. In FIG. 10E, JIMT1 cells were treated with UR214-9 (3 µM) or DMSO for 48 hours. The cells were stained with live/dead near IR dye and the live and dead population in vehicle and control group was estimated by flow-cytometry. In FIG. 10F, NSG mice (n=10) were inoculated with JIMT1 cells (1 million/animal). Once tumors were palpable, mice were divided into two groups of n-5 each and treated with vehicle or UR214-9 (25 mg, M-F, IP, once daily) for 28 days. The tumor sizes were measured periodically. In FIG. 10G, tumors from both animals of the control and treatment were harvested and weighed on a calibrated balance. Statistical analysis was carried out using GraphPad Prism 8 software. A P value less than 0.05 was considered significant.

In FIGS. 11A-11B, adhered BXPC-3 and PANC-1 cells were treated with FCF (60 µM) and UR214-9 (DMSO, 0.1, 1.0 and 10 µM) for 48 hours. Cells were lysed and immunoblotted with HER2, pSTAT-3, STAT-3, AKT and GAPDH antibodies. In FIG. 11C, MDA-MB-231, JIMT-1 and MCF-7 cells were treated with DMSO or UR214-9 (10 and 30 µM) for 24 hours. The cells were lysed, immunoblotted and probed with HER2 and phosphor-STAT-3 antibodies. In FIGS. 11D and 11E, HER2 expressing SKOV-3 cells (500,000 cells/animals) were implanted in the right flanks of NSG mice subcutaneously. When palpable, mice in groups (n=5 each) were treated with vehicle, UR214-9 (25 mg/kg, M-F, I.P.), or trastuzumab (Herceptin™) (10 mg/kg, M, I.P). The fourth group was treated with both UR214-9 (25 mg/kg, M-F, I.P.) and trastuzumab (10 mg/kg, M, I.P.) Tumor sizes were measured on regular intervals using a digital caliper. Longest length and width were recorded. Tumor volume was calculated using formula (L*W^2)*0.5 where L represents longest diameter and W stands for width of the tumors measured through a digital caliper. Treatment was stopped on day 27 and tumor sizes were measured on the days indicated. On day 53 since inoculation, mice were euthanized and tumors were harvested. Tumor weights were recorded using a calibrated balance. Statistical analyses were performed using Graph Prism 8.1.1. T-test analyses among groups were performed and p<0.05 was considered significant. Day 22: vehicle vs. UR214-9: p-0.0035; vehicle vs trastuzumab: p=0.0011; vehicle vs. UR214-9+trastuzumab: p=0.001*; UR214-9 vs UR214-9+trastuzumab: p=0.0059; trastuzumab vs UR214-9+trastuzumab: p=0.049*; Day 27: vehicle vs UR214-9: p=0.0004*; vehicle vs trastuzumab: p=0.0002*; vehicle vs UR214-9+trastuzumab: p<0.0001****.

DETAILED DESCRIPTION

Figure 1:
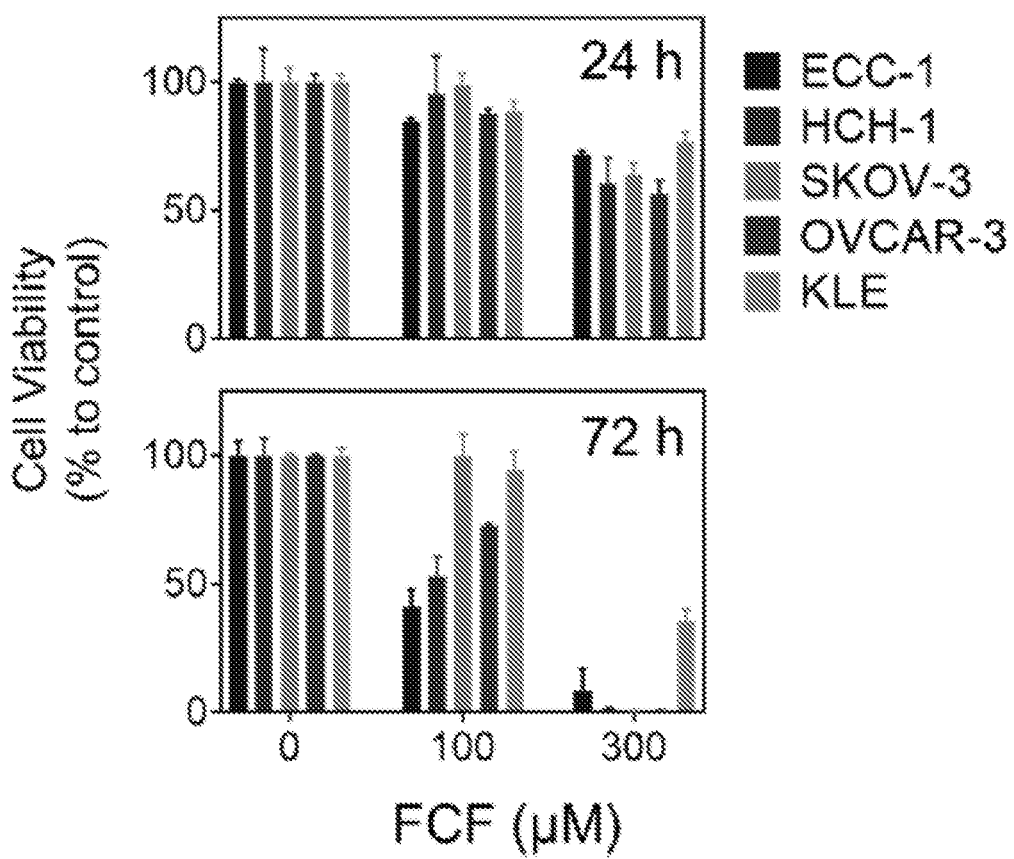
FIG. 1 shows the effect of FCF on the viability of ovarian and endometrial cancer cell lines. Cancer cell lines were treated with FCF (0, 100, 300 µM) for either 24 hours or 72 hours, after which the cell viability was measured by MTS assay.

The present disclosure provides compounds, compositions, and methods to modulate expression or activity of septin proteins such as septin-2. The design, synthesis and screening of novel molecules, e.g., aryl ureas, containing pyridine with various substitutions are disclosed herein. Those exemplary molecules disclosed in Examples disrupt septin-2 assembly in tumor cells robustly and decrease cell proliferation in micro-nano molar range. The compounds, e.g., diaryl ureas, described herein were also capable of reducing pancreatic tumor burden and other tumor models.

Septin-2 is a filament-forming cytoskeletal GTPase that forms a filamentous oligomeric structures with Septin-7, Septin-6, Septin-9, Septin-4, and other septins. Septin-2 mediated filamental structure is essential for the structural integrity and motility of the sperm tail during postmeiotic differentiation (Kuo et al. (2015) *J Cell Sci* 128(5): 923-934). Septin-2 is required for normal organization of the actin cytoskeleton and plays a role in the biogenesis of polarized columnar-shaped epithelium by maintaining polyglutamylated microtubules, thus facilitating efficient vesicle transport, and by impeding MAP4 binding to tubulin. Septin-2 is required for the progression through mitosis. Septin-2 forms a scaffold at the midplane of the mitotic spindle required to maintain localization at kinetochores and chromosome congression. During anaphase, Septin-2 participates in chromosome segregation and spindle elongation. Septin-2 plays a role in ciliogenesis and cell movements. In cilia, septin-2 acts by regulating the assembly of the tectonic-like complex (B9 complex) by localizing TMEM231 protein. Cilia is required for the integrity of the diffusion barrier at the base of the primary cilium that prevents diffusion of transmembrane proteins between the cilia and plasma membranes. Septin-2 plays a role in the internalization of 2 intracellular microbial pathogens such as *Listeria monocytogenes* and *Shigella flexneri*. Septin-2 overexpression promotes serous and clear cell ovarian cancer tumorigenesis (Cantillo et al. (2017) *Gynecologic Oncology* 145: Supplement 1, pp. 123-124).

Septins assemble into heteromeric oligomers to generate higher-order scaffolding structures such as filaments, bundles, and rings within cells. They are cytoskeletal components, similar to actin filaments, microtubules and intermediate filaments. Septins are known to be involved in diverse essential cellular mechanisms including control of diffusion barriers, protein localization, exocytic membrane fusion, autophagosome regulation, lysosomal homeostasis, mitochondrial division and biogenesis of membranous organelles and multi-vesicular bodies (Kartmann and Roth (2001) *J Cell Sci* 114(Pt 5): 839-844, Caudron and Barral (2009) *Dev Cell* 16(4): 493-506, Bridges and Gladfelter (2015) *J Biol Chem* 290(28): 17173-17180, Pagliuso et al. (2016) *EMBO Rep* 17(6): 858-873, Sirianni et al. (2016) *EMBO Rep* 17(7): 1029-1043, Mostowy et al. (2010) *Cell Host Microbe* 8(5): 433-444, Traikov et al. (2014) *PLoS One* 9(11): e109372, and Dolat and Spiliotis (2016) *J Cell Biol* 214(5): 517-527). Septins are structurally related to the RAS oncogenes and their expression levels have been found to be altered in several cancer types including kidney, lung, colorectal, skin, brain, endometrial, ovarian and breast (Cerveira et al. (2011) *Biol Chem* 392(8-9): 713-724, Connolly et al. (2011) *Biol Chem* 392(8-9): 725-738, and Angelis and Spiliotis (2016) *Front Cell Dev Biol* 4: 122). Additionally, aberrant septin expression has been linked to neurodegenerative/neuromuscular disease, blood disorders, infertility, and developmental disabilities (Dolat et al. (2014) *Biol Chem* 395(2): 123-141, and Marttinen et al. (2015) *Mol Neurodegener* 10: 16).

The present disclosure provides compounds to modulate expression or activity of septin proteins, such as septin-2. In some preferred embodiments, such compounds are capable of reducing or inhibiting the expression or activity of septin proteins, such as septin-2.

Disclosed herein is an exemplary compound of formula (I):

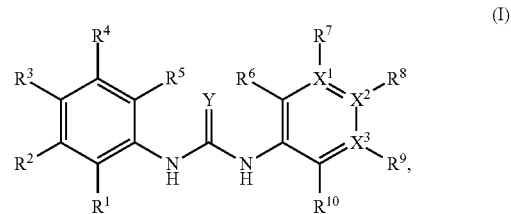

or a pharmaceutically acceptable salt thereof,
wherein:
each of $X^1$, $X^2$, and $X^3$ is independently C or N, wherein at least one of $X^1$, $X^2$, and $X^3$ is N;
Y is O, S, NH, N—OH, N—$OR^{11}$, or $NR^{11}$; Preferably, Y is O or S;
each of $R^1$, $R^2$, $R^3$, $R^4$, $R^5$, $R^6$, and $R^{10}$ is independently selected from: alkyl, alkene, alkenyl, phenyl, pyridyl or naphthyl and wherein chloro, fluoro, bromo, methyl, ethyl, isopropyl, —$OCH_3$, —OH, —$NH_2$/—$CF_3$, —$OCF_3$, —$SCH_3$, —$OCH_3$, —C(O)OH, —C(O)$OCH_3$, —$CH_2NH_2$, —$N(CH_3)_2$, —$CH_2$-pyrrolidine and —CHOH. Each of $R^1$, $R^2$, $R^3$, $R^4$, $R^5$, $R^6$, and $R^{10}$ can be further substituted with phenyl or 5-6 membered aromatic heterocyclic ring system, or a 8-10 membered bicyclic ring system comprising aromatic carbocyclic rings, aromatic heterocyclic rings or a combination of an aromatic carbocyclic ring and an aromatic heterocyclic ring, each of which is independently selected from halo; $C_1$-$C_3$ alkyl optionally substituted with $NR_2$, OR, $CO_2R$ or $CONR_2$; O—($C_1$-$C_3$)-alkyl optionally substituted with $NR_2$, OR, $CO_2R$ or CONR; $NR_2$; $OCF_3$; $CF_3$; $NO_2$; $CO_2R$; CONR; SR; S($O_2$)N(R)$_2$; $SCF_3$; CN; N(R)C(O)R, N(R)C(O)OR, N(R)C(O)C(O)R; N(R)S($O_2$)R; N(R)R; N(R)$_2$; OR; OC(O)R; OP(O)$_3$H2; or N=C—N(R)$_2$. R on the these substitutions are further or optionally substituted with amine, —OH, —SH, halo, —O—, —S—, $C_1$-$C_3$ straight or branched alkyl optionally substituted with $NR_2$, OR, $CO_2R$, S($O_2$)N(R)$_2$, N=C—N(R)$_2$, R, or $CONR_2$; O—($C_1$-$C_3$)-alkyl; O—($C_1$-$C_3$)-alkyl optionally substituted with $NR_2$, OR, $CO_2R$, S($O_2$)N(R)$_2$, N=C—N(R)$_2$, R, or $CONR_2$; $NR_2$; $OCF_3$; $CF_3$; $NO_2$; $CO_2R$; CONR; R; OR; NHR; $NR_2$; SR; C(O)R; C(O)N(R)R; C(O)OR; SR; S($O_2$)N(R)$_2$; $SCF_3$; N=C—N(R)$_2$; or CN. R groups can be further substituted with R. $R^1$ and $R^2$ or may be independently selected from N($R^2$)$SO_2$—N($R^2$)$_2$; N(R)$SO_2$—N($R^2$)($R^3$); N($R^2$)C(O)—$OR^2$; N($R^2$)C(O)—N($R^2$)$_2$; N($R^2$)C(O)—N($R^2$)($R^3$); N($R^2$)C(O)—$R^2$; N($R^2$)$_2$; C(O)—$R^2$; CH(OH)—$R^2$; C(O)—N($R^2$)$_2$; C(O)—$OR^2$; J; or ($C_x$-$C_4$) straight or branched alkyl optionally substituted with N(R')$_2$, OR', $CO_2R'$, CON(R')$_2$, $R^3$, $SO_2N(R)_2$, OC(O)$R^2$, OC(O)R', OC(O)N($R^2$)$_2$, —N($R^4$)($R^5$), —C(O)N($R^5$) ($R^2$), —C(O)$R^5$, —N($R^2$)C(O)N($R^2$)($R^5$), —NC(O)$OR^5$, —OC(O)N($R^2$) ($R^5$), or -J; a 5-6 membered carbocyclic or heterocyclic ring system optionally substituted with N(R'), OR', $CO_2R'$, CON(R')$_2$, or $SO_2N(R^2)_2$; or a 8-10 membered carbocyclic or heterocyclic ring system optionally substituted with N(R')$_2$, OR', $CO_2R'$, CON(R')$_2$, or $SO_2N(R^2)_2$;

In some embodiments, each of $R^1$, $R^2$, $R^3$, $R^4$, $R^5$, $R^6$, and $R^{10}$ is independently H, F, Cl, Br, I, $NO_2$, (C=O)—$R^{11}$, (C=O)—$OR^{11}$, (C=O)—$NHR^{11}$, (C=O)—N($R^{11}$)$_2$, $C_1$-$C_6$ alkyl, $C_2$-$C_6$ alkenyl, $C_2$-$C_6$ alkynyl, $C_6$-$C_{10}$ aryl or 5-10 membered heteroaryl, wherein the $C_1$-$C_6$ alkyl, $C_2$-$C_6$ alkenyl, $C_2$-$C_6$ alkynyl, $C_6$-$C_{10}$ aryl or 5-10 membered heteroaryl optionally comprises one, two, three, or more substitutions with F, Cl, Br, I, (C=O)—$R^{11}$, (C=O)—$OR^{11}$, (C=O)—$NHR^{11}$, (C=O)—$N(R^{11})_2$, $C_1$-$C_6$ alkyl, $C_6$-$C_{10}$ aryl or 5-10 membered heteroaryl;

each of $R^7$, $R^8$, and $R^9$, when present, is independently H, F, Cl, Br, I, $NO_2$, (C=O)—$R^{11}$, (C=O)—$OR^{11}$, (C=O)—$NHR^{11}$, (C=O)—$N(R^{11})_2$, $C_1$-$C_6$ alkyl, $C_2$-$C_6$ alkenyl, $C_2$-$C_6$ alkynyl, $C_6$-$C_{10}$ aryl or 5-10 membered heteroaryl, wherein the $C_1$-$C_6$ alkyl, $C_2$-$C_6$ alkenyl, $C_2$-$C_6$ alkynyl, $C_6$-$C_{10}$ aryl or 5-10 membered heteroaryl optionally comprises one, two, three, or more substitutions with F, Cl, Br, I, (C=O)—$R^{11}$, (C=O)—$OR^{11}$, (C=O)—$NHR^{11}$, (C=O)—$N(R^{11})_2$, $C_1$-$C_6$ alkyl, $C_6$-$C_{10}$ aryl or 5-10 membered heteroaryl; and each $R^{11}$ is independently $C_1$-$C_6$ alkyl, $C_2$-$C_6$ alkenyl, $C_2$-$C_6$ alkynyl, $C_6$-$C_{10}$ aryl or 5-10 membered heteroaryl, wherein the $C_1$-$C_6$ alkyl, $C_2$-$C_6$ alkenyl, $C_2$-$C_6$ alkynyl, $C_6$-$C_{10}$ aryl or 5-10 membered heteroaryl optionally comprises one, two, three, or more substitutions with F, Cl, Br, I, (C=O)—($C_1$-$C_6$ alkyl), (C=O)—O($C_1$-$C_6$ alkyl), (C=O)—NH($C_1$-$C_6$ alkyl), or (C=O)—N($C_1$-$C_6$ alkyl)$_2$.

In some embodiments, $X^2$ in the compound of formula (I) is N. In some embodiments, both $X^1$ and $X^3$ are C. In some embodiments, $X^2$ in the compound of formula (I) is N and both $X^1$ and $X^3$ are C.

In some embodiments, $R^2$ in the compound of formula (I) is not a phenoxy. In some embodiments, $R^3$ in the compound of formula (I) is not an imidazolyl or pyrimidinyl. In some embodiments, $R^2$ in the compound of formula (I) is not a phenoxy and $R^3$ is not an imidazolyl or pyrimidinyl.

In some embodiments, $X^2$ in the compound of formula (I) is N, both $X^1$ and $X^3$ are C, $R^2$ is not a phenoxy, and $R^3$ is not an imidazolyl or pyrimidinyl.

In some embodiments, the compound of formula (I) is forchlorfenuron (FCF), or a pharmaceutically acceptable salt thereof. In some embodiments, the compound of formula (I) is not forchlorfenuron (FCF), or a pharmaceutically acceptable salt thereof.

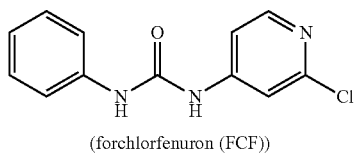 [SMILES: O=C(Nc1ccccc1)Nc1ccnc(Cl)c1]

(forchlorfenuron (FCF))

In some embodiments, the compound of formula (I) has the structure of formula (II):

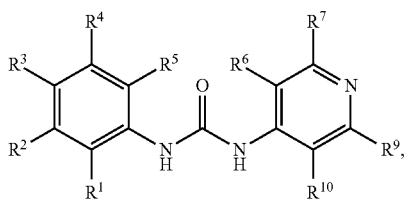

(II)

or a pharmaceutically acceptable salt thereof.

In some embodiments of the compound of formula (I) and/or (II), each of $R^3$, $R^4$, and $R^5$ is independently H, F, Cl, Br, I, $NO_2$, (C=O)—$R^{11}$, (C=O)—$OR^{11}$, (C=O)—$NHR^{11}$, (C=O)—$N(R^{11})_2$, or $C_1$-$C_6$ alkyl, wherein the $C_1$-$C_6$ alkyl optionally comprises one, two, three, or more substitutions with F, Cl, Br, I, or phenyl.

In some embodiments, $R^2$ in the compound of formula (II) is not a phenoxy. In some embodiments, $R^3$ in the compound of formula (II) is not an imidazolyl or pyrimidinyl. In some embodiments, $R^2$ in the compound of formula (II) is not a phenoxy and $R^3$ is not an imidazolyl or pyrimidinyl.

In some embodiments, the compound of formula (II) is forchlorfenuron (FCF), or a pharmaceutically acceptable salt thereof. In some embodiments, the compound of formula (II) is not forchlorfenuron (FCF), or a pharmaceutically acceptable salt thereof.

In some embodiments, the compound of formula (I) has the structure of formula (III):

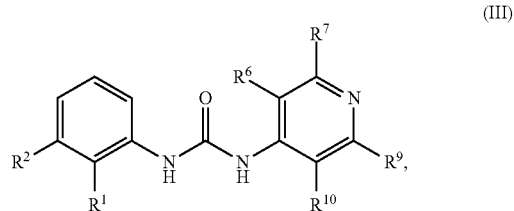

(III)

or a pharmaceutically acceptable salt thereof.

In some embodiments of the compound of formula (I), (II), and/or (III), each of $R^6$, $R^7$, $R^9$ and $R^{10}$ is independently H, F, Cl, Br, I, $NO_2$, (C=O)—$R^{11}$, (C=O)—$OR^{11}$, (C=O)—$NHR^{11}$, (C=O)—$N(R^{11})_2$, or $C_1$-$C_6$ alkyl, wherein the $C_1$-$C_6$ alkyl optionally comprises one, two, three, or more substitutions with F, Cl, Br, I, or phenyl.

In some embodiments, $R^2$ in the compound of formula (III) is not a phenoxy.

In some embodiments, the compound of formula (III) is forchlorfenuron (FCF), or a pharmaceutically acceptable salt thereof. In some embodiments, the compound of formula (III) is not forchlorfenuron (FCF), or a pharmaceutically acceptable salt thereof.

In some embodiments, the compound of formula (I) has the structure of formula (IV):

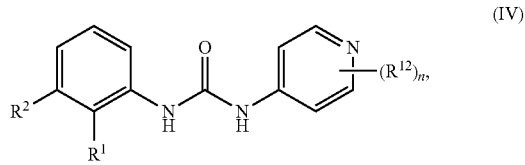

(IV)

or a pharmaceutically acceptable salt thereof,
wherein
each $R^{12}$ is independently F, Cl, Br, I, $NO_2$, (C=O)—$R^{11}$, (C=O)—$OR^{11}$, (C=O)—$NHR^{11}$, (C=O)—$N(R^{11})_2$, $C_1$-$C_6$ alkyl, $C_2$-$C_6$ alkenyl, $C_2$-$C_6$ alkynyl, $C_6$-$C_{10}$ aryl or 5-10 membered heteroaryl, wherein the $C_1$-$C_6$ alkyl, $C_2$-$C_6$ alkenyl, $C_2$-$C_6$ alkynyl, $C_6$-$C_{10}$ aryl or 5-10 membered heteroaryl optionally comprises one, two, three, or more substitutions with F, Cl, Br, I, (C=O)—$R^{11}$, (C=O)—$OR^{11}$, (C=O)—$NHR^{11}$, (C=O)—$N(R^{11})_2$, $C_1$-$C_6$ alkyl, $C_6$-$C_{10}$ aryl or 5-10 membered heteroaryl; and n is 1 or 2.

In some embodiments, $R^2$ in the compound of formula (III) is not a phenoxy.

In some embodiments of the compound of formula (I), (II), (III), and/or (IV), $R^1$ is F, Cl, Br, I, $NO_2$, (C=O)—$R^{11}$, (C=O)—$OR^{11}$, (C=O)—$NHR^{11}$, (C=O)—$N(R^{11})_2$, or $C_1$-$C_6$ alkyl, wherein the $C_1$-$C_6$ alkyl optionally comprises one, two, three, or more substitutions with F, Cl, Br, I, or phenyl. In some embodiments, $R^1$ is F, Cl, Br, or I. For example, $R^1$ can be F.

In some embodiments of the compound of formula (I), (II), (III), and/or (IV), $R^2$ is F, Cl, Br, I, $NO_2$, (C=O)—$R^{11}$, (C=O)—$OR^{11}$, (C=O)—$NHR^{11}$, (C=O)—$N(R^{11})_2$, or $C_1$-$C_6$ alkyl, wherein the $C_1$-$C_6$ alkyl optionally comprises one, two, three, or more substitutions with F, Cl, Br, I, or phenyl. In some embodiments, $R^2$ is $C_1$-$C_6$ alkyl, which optionally comprises one, two, three, or more substitutions with F, Cl, Br, or I. In some embodiments, $R^2$ is $C_1$-$C_3$ alkyl, which optionally comprises one, two, or three substitutions with F or Cl. For example, $R^2$ can be $CF_3$.

In some embodiments of the compound of formula (I), (II), (III), and/or (IV), each of $R^1$ and $R^2$ is independently F, Cl, Br, I, or $C_1$-$C_6$ alkyl, wherein the $C_1$-$C_6$ alkyl optionally comprises one, two, three, or more substitutions with F, Cl, Br, I, or phenyl. In some embodiments, $R^1$ is F, Cl, Br, or I; and $R^2$ is $C_1$-$C_3$ alkyl, which optionally comprises one, two, or three substitutions with F or Cl.

In some embodiments of the compound of formula (IV), each $R^{12}$ is F, Cl, Br, I, or $C_1$-$C_6$ alkyl, wherein the $C_1$-$C_6$ alkyl optionally comprises one, two, three, or more substitutions with F, Cl, Br, or I. In some embodiments, each $R^{12}$ is F, Cl or Br. In some embodiments, each $R^{12}$ is $C_1$. In some embodiments, $R^{12}$ is an ortho substituent.

In some embodiments, the compound of formula (IV) is forchlorfenuron (FCF), or a pharmaceutically acceptable salt thereof. In some embodiments, the compound of formula (IV) is not forchlorfenuron (FCF), or a pharmaceutically acceptable salt thereof.

In some embodiments, the compound described herein comprises an analog of forchlorfenuron (FCF). In some embodiments, the compound described herein comprises the structure of:

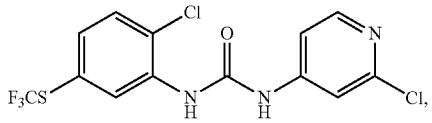
(UR214-1)

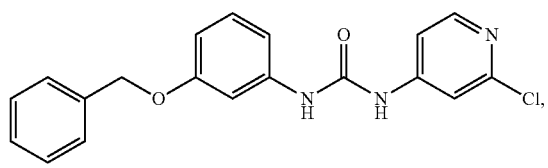
(UR214-2)

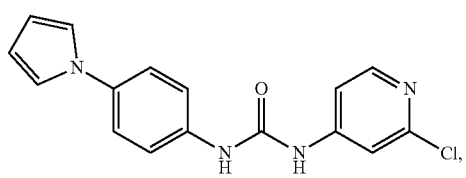
(UR214-3)

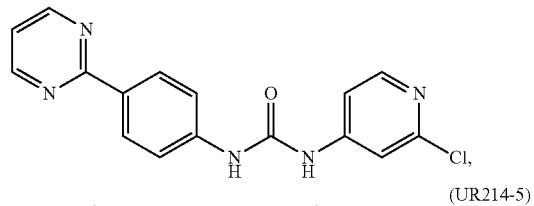
(UR214-4)

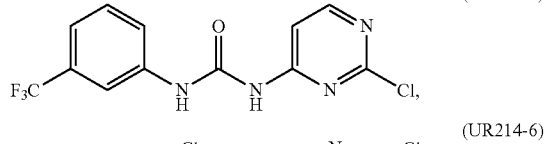
(UR214-5)

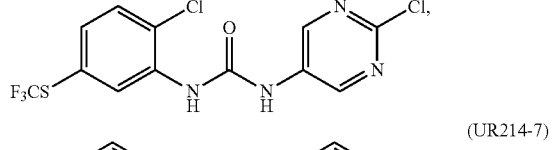
(UR214-6)

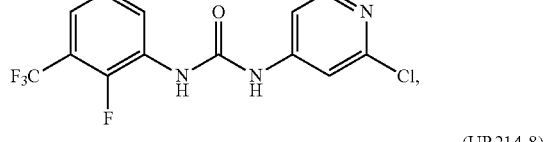
(UR214-7)

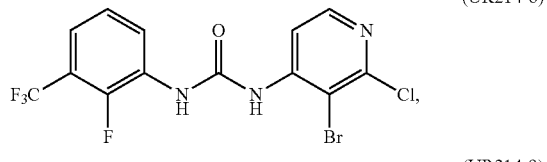
(UR214-8)

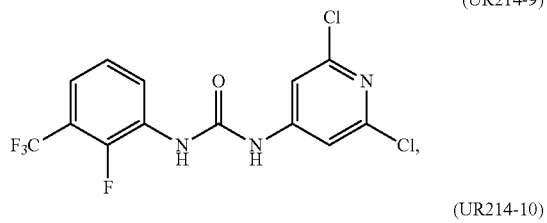
(UR214-9)

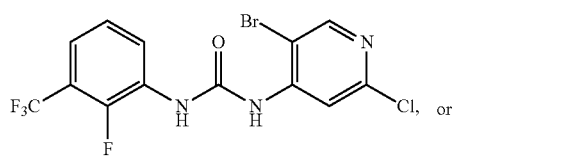
(UR214-10)

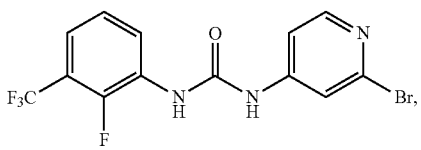
(UR-214-11)

or a pharmaceutically acceptable salt thereof.

In some embodiments, the compound described herein comprises the structure of:

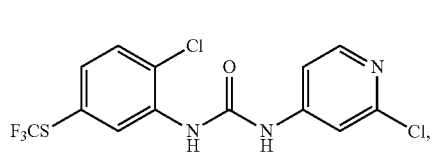
(UR214-1)

-continued

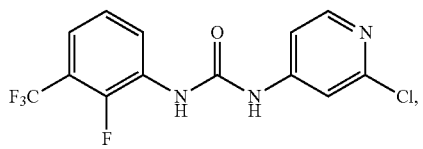
(UR214-7)

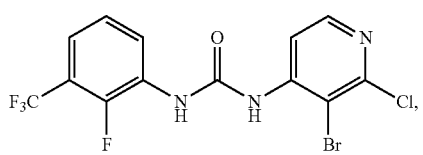
(UR214-8)

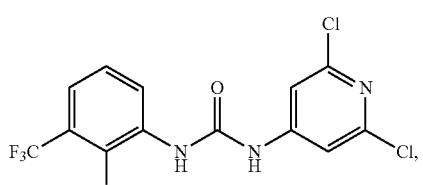
(UR214-9)

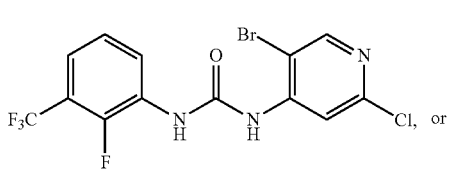
(UR214-10)

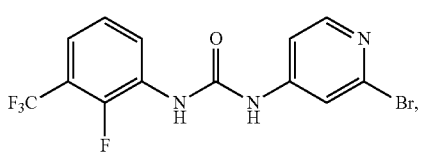
(UR214-11)

or a pharmaceutically acceptable salt thereof.

In some embodiments, the compound described herein comprises the structure of:

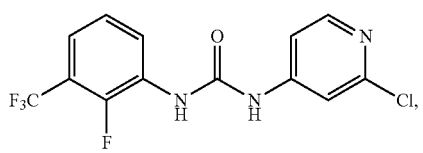
(UR214-7)

or a pharmaceutically acceptable salt thereof.

In some embodiments, the compound described herein comprises the structure of:

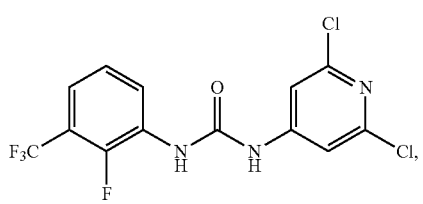
(UR214-9)

or a pharmaceutically acceptable salt thereof.

In certain embodiments, the present disclosure provides a pharmaceutical composition comprising a compound of the present disclosure (e.g. a compound of formula (I), (II), (III), and/or (IV)), or a pharmaceutically acceptable salt thereof, and a pharmaceutically acceptable excipient.

In certain embodiments, the pharmaceutical composition comprises one or more additional therapeutic agents.

Pharmaceutical compositions comprising the compounds disclosed herein, or pharmaceutically acceptable salts thereof, may be prepared with one or more pharmaceutically acceptable excipients which may be selected in accord with ordinary practice. Tablets may contain excipients including glidants, fillers, binders and the like. Aqueous compositions may be prepared in sterile form, and when intended for delivery by other than oral administration generally may be isotonic. All compositions may optionally contain excipients such as those set forth in the Rowe et al, Handbook of Pharmaceutical Excipients, $6^{th}$ edition, American Pharmacists Association, 2009. Excipients can include ascorbic acid and other antioxidants, chelating agents such as EDTA, carbohydrates such as dextrin, hydroxyalkylcellulose, hydroxyalkylmethylcellulose, stearic acid and the like. In certain embodiments, the composition is provided as a solid dosage form, including a solid oral dosage form.

The compositions include those suitable for various administration routes, including oral administration. The compositions may be presented in unit dosage form and may be prepared by any of the methods well known in the art of pharmacy. Such methods include the step of bringing into association the active ingredient (e.g., a compound of the present disclosure or a pharmaceutical salt thereof) with one or more pharmaceutically acceptable excipients. The compositions may be prepared by uniformly and intimately bringing into association the active ingredient with liquid excipients or finely divided solid excipients or both, and then, if necessary, shaping the product. Techniques and formulations generally are found in Remington: The Science and Practice of Pharmacy, $21^{st}$ Edition, Lippincott Williams and Wilkins, Philadelphia, Pa., 2006.

Compositions described herein that are suitable for oral administration may be presented as discrete units (a unit dosage form) including but not limited to capsules, cachets or tablets each containing a predetermined amount of the active ingredient. In one embodiment, the pharmaceutical composition is a tablet.

Pharmaceutical compositions disclosed herein comprise one or more compounds disclosed herein, or a pharmaceutically acceptable salt thereof, together with a pharmaceutically acceptable excipient and optionally other therapeutic agents. Pharmaceutical compositions containing the active ingredient may be in any form suitable for the intended method of administration. When used for oral use for example, tablets, troches, lozenges, aqueous or oil suspensions, dispersible powders or granules, emulsions, hard or soft capsules, syrups or elixirs may be prepared. Compositions intended for oral use may be prepared according to any method known to the art for the manufacture of pharmaceutical compositions and such compositions may contain one or more excipients including sweetening agents, flavoring agents, coloring agents and preserving agents, in order to provide a palatable preparation. Tablets containing the active ingredient in admixture with non-toxic pharmaceutically acceptable excipients which are suitable for manufacture of tablets are acceptable. These excipients may be, for example, inert diluents, such as calcium or sodium carbonate, lactose, lactose monohydrate, croscarmellose sodium, povidone, calcium or sodium phosphate; granulating and disintegrating agents, such as maize starch, or alginic acid; binding agents, such as cellulose, microcrystalline cellulose, starch, gelatin or acacia; and lubricating agents, such as magnesium stearate, stearic acid or talc. Tablets may be uncoated or may be coated by known techniques including microencapsulation to delay disintegration and adsorption in the gastrointestinal tract and thereby provide a sustained action over a longer period. For example, a time delay material such as glyceryl monostearate or glyceryl distearate alone or with a wax may be employed.

The amount of active ingredient that may be combined with the inactive ingredients to produce a dosage form may vary depending upon the intended treatment subject and the particular mode of administration. For example, in some embodiments, a dosage form for oral administration to humans may contain approximately 1 to 1000 mg of active material formulated with an appropriate and convenient amount of a pharmaceutically acceptable excipient. In certain embodiments, the pharmaceutically acceptable excipient varies from about 5 to about 95% of the total compositions (weight:weight).

In certain embodiments, a composition comprising a compound of the present disclosure or a pharmaceutically acceptable salt thereof in one variation does not contain an agent that affects the rate at which the active ingredient is metabolized. Thus, it is understood that compositions comprising a compound of the present disclosure in one aspect do not comprise an agent that would affect (e.g., slow, hinder or retard) the metabolism of a compound of the present disclosure or any other active ingredient administered separately, sequentially or simultaneously with a compound of the present disclosure. It is also understood that any of the methods, kits, articles of manufacture and the like detailed herein in one aspect do not comprise an agent that would affect (e.g., slow, hinder or retard) the metabolism of a compound of the present disclosure or any other active ingredient administered separately, sequentially or simultaneously with a compound of the present disclosure.

The disclosure further includes a compound of the present disclosure for administration as a single active ingredient of a pharmaceutically acceptable composition which can be prepared by conventional methods known in the art, for example by binding the active ingredient to a pharmaceutically acceptable, therapeutically inert organic and/or inorganic carrier or excipient, or by mixing therewith.

Another possibility is the use of a compound of the present disclosure as a second or other active ingredient having a synergistic effect with other active ingredients in known drugs, or administration of the compound of the present disclosure together with such drugs.

The compound of the present disclosure may also be used in the form of a prodrug or other suitably modified form which releases the active ingredient in vivo.

The present disclosure provides methods of using the compounds of the present disclosure or a pharmaceutically acceptable salt thereof.

For example, in some embodiments, a method of reducing or inhibiting activity of a septin protein comprises contacting the septin protein with a compound or a composition of the present disclosure, or a pharmaceutically acceptable salt thereof. The septin protein can be any one or a combination of septin proteins known in the art, e.g., septin-1, septin-2, septin-3, septin-4, septin-5, septin-6, septin-7, septin-8, septin-9, septin-10, septin-11, septin-12, and/or septin-14. In some embodiments, the septin protein is septin-2, septin-4, septin-9, and/or septin-14. In some embodiments, the septin protein is septin-2 or septin-9. In some embodiments, the septin protein is septin-2.

In some embodiments, the present disclosure provides a method of inhibiting cellular viability and/or proliferation comprising contacting a cell with a compound or composition of the present disclosure, or a pharmaceutically acceptable salt thereof.

Further disclosed herein is a method of treating a disease or disorder comprising administering to a subject in need thereof a therapeutically effective amount of a compound or composition of the present disclosure, or pharmaceutically acceptable salt thereof. In some embodiments, the disease or disorder is a cancer.

Generally, the cancer that can be treated with a compound of the present disclosure, or a pharmaceutically acceptable salt thereof, is a cancer having an aberrant expression or activity of a septin protein as described above. In some embodiments, the cancer comprises a lung cancer, ovarian cancer, renal cancer, urothelial cancer, endometrial cancer, colorectal cancer, skin cancer, brain cancer, breast cancer, liver cancer, pancreatic cancer, or any combination thereof. In some embodiments, the cancer comprise a lung cancer, ovarian cancer, renal cancer, endometrial cancer, liver cancer, pancreatic cancer, or any combination thereof. In some embodiments, the cancer comprises an ovarian cancer, endometrial cancer, pancreatic cancer, or any combination thereof. In some embodiments, the cancer comprises an ovarian cancer, such as ovarian clear cell carcinoma.

The present disclosure provides a kit comprising a compound or composition of the present disclosure or a pharmaceutically acceptable salt thereof. Optionally, the kit further comprises instructions for use, e.g., for use in treating a cancer. The instructions for use are generally written instructions, although electronic storage media (e.g., magnetic diskette or optical disk) containing instructions are also acceptable.

The present disclosure also provides a pharmaceutical kit comprising one or more containers comprising a compound of the present disclosure or a pharmaceutically acceptable salt thereof. Optionally associated with such container(s) can be a notice in the form prescribed by a governmental agency regulating the manufacture, use or sale of pharmaceuticals, which notice reflects approval by the agency for the manufacture, use or sale for human administration. Each component (if there is more than one component) can be packaged in separate containers or some components can be combined in one container where cross-reactivity and shelf life permit. The kits can be in unit dosage forms, bulk packages (e.g., multi-dose packages) or sub-unit doses. Optionally, kits also include multiple unit doses of the compounds and instructions for use and be packaged in quantities sufficient for storage and use in pharmacies (e.g., hospital pharmacies and compounding pharmacies).

Also provided are articles of manufacture comprising a unit dosage of a compound of the present disclosure or a pharmaceutically acceptable salt thereof, in suitable packaging for use in the methods described herein. Suitable packaging is known in the art and includes, for example, vials, vessels, ampules, bottles, jars, flexible packaging and the like. Optionally, an article of manufacture is further sterilized and/or sealed.

Unless defined otherwise, all technical and scientific terms used herein have the same meaning as commonly understood by one of ordinary skill in the art. A dash at the front or end of a chemical group is a matter of convenience to indicate the point of attachment to a parent moiety; chemical groups may be depicted with or without one or more dashes without losing their ordinary meaning. A prefix such as "$C_{u\_v}$" or "$C_u\text{-}C_v$" indicates that the following group has from u to v carbon atoms, where u and v are integers. For example, "$C_{1-6}$ alkyl" or "$C_1$-$C_6$ alkyl" indicates that the alkyl group has from 1 to 6 carbon atoms.

"Alkyl" is a linear or branched saturated monovalent hydrocarbon. For example, an alkyl group can have 1 to 10 carbon atoms (i.e., $C_{1-10}$ alkyl) or 1 to 8 carbon atoms (i.e., $C_{1-8}$ alkyl) or 1 to 6 carbon atoms (i.e., $C_{1-6}$ alkyl) or 1 to 4 carbon atoms (i.e., $C_{1-4}$ alkyl). Examples of alkyl groups include, but are not limited to, methyl (Me, —CH$_3$), ethyl (Et, —CH$_2$CH$_3$), 1-propyl (n-Pr, n-propyl, —CH$_2$CH$_2$CH$_3$), 2-propyl (i-Pr, i-propyl, —CH(CH$_3$)$_2$), 1-butyl (n-Bu, n-butyl, —CH$_2$CH$_2$CH$_2$CH$_3$), 2-methyl-1-propyl (i-Bu, i-butyl, —CH$_2$CH(CH$_3$)$_2$), 2-butyl (s-Bu, s-butyl, —CH(CH$_3$)CH$_2$CH$_3$), 2-methyl-2-propyl (t-Bu, t-butyl, —C(CH$_3$)$_3$), 1-pentyl (n-pentyl, —CH$_2$CH$_2$CH$_2$CH$_2$CH$_3$), 2-pentyl (—CH(CH$_3$)CH$_2$CH$_2$CH$_3$), 3-pentyl (—CH(CH$_2$CH$_3$)$_2$), 2-methyl-2-butyl (—C(CH$_3$)$_2$CH$_2$CH$_3$), 3-methyl-2-butyl (—CH(CH$_3$)CH(CH$_3$)$_2$), 3-methyl-1-butyl (—CH$_2$CH$_2$CH(CH$_3$)$_2$), 2-methyl-1-butyl (—CH$_2$CH(CH$_3$)CH$_2$CH$_3$), 1-hexyl (—CH$_2$CH$_2$CH$_2$CH$_2$CH$_2$CH$_3$), 2-hexyl (—CH(CH$_3$)CH$_2$CH$_2$CH$_2$CH$_3$), 3-hexyl (—CH(CH$_2$CH$_3$)(CH$_2$CH$_2$CH$_3$)), 2-methyl-2-pentyl (—C(CH$_3$)$_2$CH$_2$CH$_2$CH$_3$), 3-methyl-2-pentyl (—CH(CH$_3$)CH(CH$_3$)CH$_2$CH$_3$), 4-methyl-2-pentyl (—CH(CH$_3$)CH$_2$CH(CH$_3$)$_2$), 3-methyl-3-pentyl (—C(CH$_3$)(CH$_2$CH$_3$)$_2$), 2-methyl-3-pentyl (—CH(CH$_2$CH$_3$)CH(CH$_3$)$_2$), 2,3-dimethyl-2-butyl (—C(CH$_3$)$_2$CH(CH$_3$)$_2$), 3,3-dimethyl-2-butyl (—CH(CH$_3$)C(CH$_3$)$_3$, and octyl (—(CH$_2$)$_7$CH$_3$).

"Alkenyl" is a linear or branched monovalent hydrocarbon radical with at least one carbon-carbon double bond. For example, an alkenyl group can have 2 to 8 carbon atoms (i.e., $C_{2-8}$ alkenyl) or 2 to 6 carbon atoms (i.e., $C_{2-6}$ alkenyl) or 2 to 4 carbon atoms (i.e., $C_{2-4}$ alkenyl). Examples of alkenyl groups include, but are not limited to, ethenyl (—CH=CH$_2$), allyl (—CH$_2$CH=CH$_2$), and —CH$_2$—CH=CH—CH$_3$.

"Alkynyl" is a linear or branched monovalent hydrocarbon radical with at least one carbon-carbon triple bond. For example, an alkynyl group can have 2 to 8 carbon atoms (i.e., $C_{2-8}$ alkynyl) or 2 to 6 carbon atoms (i.e., $C_{2-6}$ alkynyl) or 2 to 4 carbon atoms (i.e., $C_{2-4}$ alkynyl). Examples of alkynyl groups include, but are not limited to, acetylenyl (—C≡CH), propargyl (—CH$_2$C≡CH), and —CH$_2$—C≡C—CH$_3$.

"Halo" or "halogen" as used herein refers to fluoro (—F), chloro (—Cl), bromo (—Br) and iodo (—I).

"Aryl" as used herein refers to a single all carbon aromatic ring or a multiple condensed all carbon ring system wherein at least one of the rings is aromatic. For example, in certain embodiments, an aryl group has 6 to 20 carbon atoms, 6 to 14 carbon atoms, or 6 to 12 carbon atoms. Aryl includes a phenyl radical. Aryl also includes multiple condensed ring systems (e.g., ring systems comprising 2, 3 or 4 rings) having about 9 to 20 carbon atoms in which at least one ring is aromatic and wherein the other rings are aromatic or not aromatic (i.e., carbocycle). Such multiple condensed ring systems are optionally substituted with one or more (e.g., 1, 2 or 3) oxo groups on any carbocycle portion of the multiple condensed ring system. The rings of the multiple condensed ring system can be connected to each other via fused, spiro and bridged bonds when allowed by valency requirements. It is also to be understood that when reference is made to a certain atom-range membered aryl (e.g., 6-10 membered aryl), the atom range is for the total ring atoms of the aryl. For example, a 6-membered aryl would include phenyl and a 10-membered aryl would include naphthyl and 1,2,3,4-tetrahydronaphthyl. Non-limiting examples of aryl groups include, but are not limited to, phenyl, indenyl, naphthyl, 1,2,3,4-tetrahydronaphthyl, anthracenyl, and the like.

"Heteroaryl" as used herein refers to a single aromatic ring that has at least one atom other than carbon in the ring, wherein the atom is selected from the group consisting of oxygen, nitrogen and sulfur; "heteroaryl" also includes multiple condensed ring systems that have at least one such aromatic ring, which multiple condensed ring systems are further described below. Thus, "heteroaryl" includes single aromatic rings of from about 1 to 6 carbon atoms and about 1-4 heteroatoms selected from the group consisting of oxygen, nitrogen and sulfur. Optionally, the sulfur and nitrogen atoms are also present in an oxidized form provided the ring is aromatic. Exemplary heteroaryl ring systems include but are not limited to pyridyl, pyrimidinyl, oxazolyl or furyl. "Heteroaryl" also includes multiple condensed ring systems (e.g., ring systems comprising 2 rings) wherein a heteroaryl group, as defined above, is condensed with one or more rings selected from heteroaryls (to form for example 1,8-naphthyridinyl), heterocycles, (to form for example 1,2,3,4-tetrahydro-1,8-naphthyridinyl), carbocycles (to form for example 5,6,7,8-tetrahydroquinolyl) and aryls (to form for example indazolyl) to form the multiple condensed ring system. Thus, a heteroaryl (a single aromatic ring or multiple condensed ring system) has about 1-9 carbon atoms and about 1-6 heteroatoms within the heteroaryl ring. Such multiple condensed ring systems are optionally substituted with one or more (e.g., 1, 2, 3 or 4) oxo groups on the carbocycle or heterocycle portions of the condensed ring. The rings of the multiple condensed ring system can be connected to each other via fused, spiro and bridged bonds when allowed by valency requirements. It is to be understood that the individual rings of the multiple condensed ring system are optionally connected in any order relative to one another. It is to be understood that the point of attachment for a heteroaryl or heteroaryl multiple condensed ring system can be at any suitable atom of the heteroaryl or heteroaryl multiple condensed ring system including a carbon atom and a heteroatom (e.g., a nitrogen). It also to be understood that when a reference is made to a certain atom-range membered heteroaryl (e.g., a 5 to 10 membered heteroaryl), the atom range is for the total ring atoms of the heteroaryl and includes carbon atoms and heteroatoms. For example, a 5-membered heteroaryl would include a thiazolyl and a 10-membered heteroaryl would include a quinolinyl. Exemplary heteroaryls include but are not limited to pyridyl, pyrrolyl, pyrazinyl, pyrimidinyl, pyridazinyl, pyrazolyl, thienyl, indolyl, imidazolyl, oxazolyl, isoxazolyl, thiazolyl, furyl, oxadiazolyl, thiadiazolyl, quinolyl, isoquinolyl, benzothiazolyl, benzoxazolyl, indazolyl, quinoxalyl, quinazolyl, 5,6,7,8-tetrahydroisoquinolinyl benzofuranyl, benzimidazolyl, thionaphthenyl, pyrrolo[2,3-b]pyridinyl, quinazolinyl-4(3H)-one, and triazolyl.

A "compound of the present disclosure" includes compounds disclosed herein, for example a compound of the present disclosure includes compounds of formula (I), (II), (III) and (IV), including the compounds of the Examples.

"Treatment" or "treat" or "treating" as used herein refers to an approach for obtaining beneficial or desired results. For purposes of the present disclosure, beneficial or desired results include, but are not limited to, alleviation of a symptom and/or diminishment of the extent of a symptom and/or preventing a worsening of a symptom associated with a disease or condition. In one embodiment, "treatment" or "treating" includes one or more of the following: a) inhibiting the disease or condition (e.g., decreasing one or more symptoms resulting from the disease or condition, and/or diminishing the extent of the disease or condition); b) slowing or arresting the development of one or more symptoms associated with the disease or condition (e.g., stabilizing the disease or condition, delaying the worsening or progression of the disease or condition); and c) relieving the disease or condition, e.g., causing the regression of clinical symptoms, ameliorating the disease state, delaying the progression of the disease, increasing the quality of life, and/or prolonging survival.

"Delaying" as used herein refers to development of a disease or condition means to defer, hinder, slow, retard, stabilize and/or postpone development of the disease or condition. This delay can be of varying lengths of time, depending on the history of the disease and/or individual being treated. As is evident to one skilled in the art, a sufficient or significant delay can, in effect, encompass prevention, in that the individual does not develop the disease or condition.

"Prevent" or "prevention" or "preventing" as used herein refers to a regimen that protects against the onset of the disease or disorder such that the clinical symptoms of the disease do not develop. Thus, "prevention" relates to administration of a therapy (e.g., administration of a therapeutic substance) to a subject before signs of the disease are detectable in the subject. The subject may be an individual at risk of developing the disease or disorder, such as an individual who has one or more risk factors known to be associated with development or onset of the disease or disorder. It is also understood that prevention does not require a 100% success rate.

"Modulation" or "modulating" the activity of a protein, e.g., a septin protein, as used herein refers to alteration of the activity such that the activity increases or decreases. In some embodiments, the modulation decreases the activity.

"Reduce" or "reduction" or "Reducing" as used herein refers to the effect of decreasing a certain level (e.g., protein and/or mRNA expression levels and/or activities or functions). The resulting reduced levels are about 99%, 98%, 95%, 90%, 85%, 80%, 75%, 70%, 65%, 60%, 55%, 50%, 45%, 40%, 35%, 30%, 25%, 20%, 15%, 10%, 5%, 3%, 1%, or lower, or at any percentage smaller than 100% and not listed above, of the previous levels. Specifically, the resulting reduced levels may be zero, which means experimentally undetectable (e.g., for expression levels and/or activities or functions). The term "reduce" or the like as used herein is interchangeable with the term "inhibit" or the like.

A "subject" as used herein refers to a mammal, for example, an animal within the Phylum Chordata, including, but not limited to, primates (such as human, other great apes (hominids), gibbons (hylobatids), Old World monkeys (cercopithecids), New World monkeys (platyrrhines, including at least Callitrichids, Cebids, Aotids, Pitheciids, and Atelids), tarsiers, and Strepsirrhines (including at least Lemur- and loris-like primates)), Glires (such as pikas, rabbits, hares, and rodents (including at least mouse-like rodents, anomalure-like rodents, beaver-like rodents, porcupine-like rodents, and squirrel-like rodents)), cat-like carnivorans (feliforms, including at least cats, Asiatic linsangs, African palm civet, Viverroid, hyenas, and mongooses), dog-like carnivorans (caniforms, including at least dogs, bears, red panda, skunks, weasels, minks, wolverines, raccoons, walrus, sea lions, and seals), hedgehogs, shrews, moles, camelids (including at least camels and llamas), swine (including at least pigs and peccaries), hippos, whales, dolphins, bats, horses, Marsupials, etc. In some embodiments, the subject described herein is a domestic animal such as a pig, a cow, a horse, a Camelid, a dog, a cat, a rat, a mouse, a non-human primate such as a cynomolgus monkey or chimpanzee; or a human. In some embodiments, the subject is a human. In some embodiments, the subject is an animal including, but not limited to, a mouse, a rat, a hamster, a guinea pig, a monkey, an ape, a rabbit, a cat, a dog, a horse, a pig, a lion, a tiger, a wolf, etc.

"At risk individual" as used herein refers to an individual who is at risk of developing a condition to be treated. An individual "at risk" may or may not have detectable disease or condition, and may or may not have displayed detectable disease prior to the treatment of methods described herein. "At risk" denotes that an individual has one or more so-called risk factors, which are measurable parameters that correlate with development of a disease or condition and are known in the art. An individual having one or more of these risk factors has a higher probability of developing the disease or condition than an individual without these risk factor(s).

"Therapeutically effective amount" or "effective amount" as used herein refers to an amount that is effective to elicit the desired biological or medical response, including the amount of a compound that, when administered to a subject for treating a disease, is sufficient to effect such treatment for the disease. The effective amount will vary depending on the compound, the disease, and its severity and the age, weight, etc., of the subject to be treated. The effective amount can include a range of amounts. As is understood in the art, an effective amount may be in one or more doses, i.e., a single dose or multiple doses may be required to achieve the desired treatment endpoint. An effective amount may be considered in the context of administering one or more therapeutic agents, and a single agent may be considered to be given in an effective amount if, in conjunction with one or more other agents, a desirable or beneficial result may be or is achieved. Suitable doses of any co-administered compounds may optionally be lowered due to the combined action (e.g., additive or synergistic effects) of the compounds.

"Pharmaceutically acceptable excipient" includes without limitation any adjuvant, carrier, excipient, glidant, sweetening agent, diluent, preservative, dye/colorant, flavor enhancer, surfactant, wetting agent, dispersing agent, suspending agent, stabilizer, isotonic agent, solvent, or emulsifier which has been approved by the United States Food and Drug Administration as being acceptable for use in humans or domestic animals.

Provided are also pharmaceutically acceptable salts, hydrates, solvates, tautomeric forms, polymorphs, and prodrugs of the compounds described herein. "Pharmaceutically acceptable" or "physiologically acceptable" refer to compounds, salts, compositions, dosage forms and other materials which are useful in preparing a pharmaceutical composition that is suitable for veterinary or human pharmaceutical use.

The compounds described herein may be prepared and/or formulated as pharmaceutically acceptable salts or when appropriate as a free base. Pharmaceutically acceptable salts are non-toxic salts of a free base form of a compound that possesses the desired pharmacological activity of the free base. These salts may be derived from inorganic or organic acids or bases. For example, a compound that contains a basic nitrogen may be prepared as a pharmaceutically acceptable salt by contacting the compound with an inorganic or organic acid. Non-limiting examples of pharmaceutically acceptable salts include sulfates, pyrosulfates, bisulfates, sulfites, bisulfites, phosphates, monohydrogenphosphates, dihydrogenphosphates, metaphosphates, pyrophosphates, chlorides, bromides, iodides, acetates, propionates, decanoates, caprylates, acrylates, formates, isobutyrates, caproates, heptanoates, propiolates, oxalates, malonates, succinates, suberates, sebacates, fumarates, maleates, butyne-1,4-dioates, hexyne-1,6-dioates, benzoates, chlorobenzoates, methylbenzoates, dinitrobenzoates, hydroxybenzoates, methoxybenzoates, phthalates, sulfonates, methylsulfonates, propylsulfonates, besylates, xylenesulfonates, naphthalene-1-sulfonates, naphthalene-2-sulfonates, phenylacetates, phenylpropionates, phenylbutyrates, citrates, lactates, γ-hydroxybutyrates, glycolates, tartrates, and mandelates. Lists of other suitable pharmaceutically acceptable salts are found in Remington: The Science and Practice of Pharmacy, 21$^{st}$ Edition, Lippincott Wiliams and Wilkins, Philadelphia, Pa., 2006.

Examples of "pharmaceutically acceptable salts" of the compounds disclosed herein also include salts derived from an appropriate base, such as an alkali metal (for example, sodium, potassium), an alkaline earth metal (for example, magnesium), ammonium and $NX_4^+$ (wherein X is $C_1$-$C_4$ alkyl). Also included are base addition salts, such as sodium or potassium salts.

The term "cancer" as used herein refers to an uncontrolled growth of cells of any organ which interferes with the normal functioning of the bodily organs and systems. Cancer cells which migrate from their original location and seed vital organs can eventually lead to the death of the subject through the functional deterioration of the affected organs. A cancer cell is a cell that divides and reproduces abnormally. In some instances, it is possible to distinguish cancer cells from their normal counterparts based on profiles of expressed genes and proteins, as well as to the level of their expression. Genes commonly affected in cancer cells include oncogenes. Cancer-related mutations lead to a decrease in their expression or a complete deletion. In others, mutations cause an increase in expression or the expression of an activated variant of the normal counterpart.

The term "tumor" is usually equated with neoplasm, which literally means "new growth" and is used interchangeably with "cancer." A "neoplastic disorder" is any disorder associated with cell proliferation, specifically with a neoplasm. A "neoplasm" is an abnormal mass of tissue that persists and proliferates after withdrawal of the carcinogenic factor that initiated its appearance. There are two types of neoplasms, benign and malignant. Nearly all benign tumors are encapsulated and are noninvasive; in contrast, malignant tumors are almost never encapsulated but invade adjacent tissue by infiltrative destructive growth. This infiltrative growth can be followed by tumor cells implanting at sites discontinuous with the original tumor.

A metastasis is a region of cancer cells, distinct from the primary tumor location resulting from the dissemination of cancer cells from the primary tumor to other parts of the body. At the time of diagnosis of the primary tumor mass, the subject may be monitored for the presence of metastases. Metastases are most often detected through the sole or combined use of magnetic resonance imaging (MRI) scans, computed tomography (CT) scans, blood and platelet counts, liver function studies, chest X-rays and bone scans in addition to the monitoring of specific symptoms.

The compounds and compositions of the invention can be used to treat cancer in a subject. In some embodiments, the cancer comprises a gynecologic cancer (such as ovarian cancer), pancreatic cancer, endometrial cancer, liver cancer, renal cancer, hematologic cancers, central nervous system (CNS) cancer, or any combination thereof. Examples of some important CNS cancers include, but are not limited to, neuroblastoma, medulloblastoma, peripheral malignant nerve sheath tumor, ependymoma, chraniopharyngioma, astrocytoma, meningioma, germinoma, glioma, mixed glioma, choroid plexus tumor, oligodendroglioma, peripheral neuroectodermal tumor, primitive neuroectodermal tumor (PNET), CNS lymphoma, pituitary adenoma, and Schwannoma. In some embodiments, the astrocytoma is Grade I, Grade II, Grade III, or Grade IV. The astrocytoma may be a low-grade or a high-grade. The astrocytoma may be juvenile pilocytic astrocytoma, subependymal giant cell astrocytoma, pleimorphic xanthoastrocytoma, anaplastic astrocytoma, or gliomatosis cerebri. In some embodiments, the oligodendroglioma is a mixed glioma (oligoastrocytoma) or an anaplastic oligodendroglioma. In one preferred embodiment, the cancer comprises neuroblastoma.

Cancers that can be treated by the compounds and compositions of the invention also include, but are not limited to, basal cell carcinoma, biliary tract cancer, bladder cancer, bone cancer, brain and CNS cancer, breast cancer, cervical cancer, choriocarcinoma, colon and rectum cancer, connective tissue cancer, cancer of the digestive system, endometrial cancer, esophageal cancer, eye cancer, fibroma, cancer of the head and neck, gastric cancer, intra-epithelial neoplasm, kidney cancer, larynx cancer, leukemia including acute myeloid leukemia, acute lymphoid leukemia, chronic myeloid leukemia, chronic lymphoid leukemia, liver cancer, lung cancer (e.g. small cell and non-small cell), lymphoma including Hodgkin's and Non-Hodgkin's lymphoma, melanoma, oral cavity cancer (e.g., lip, tongue, mouth, and pharynx), prostate cancer, retinoblastoma, rhabdomyosarcoma, rectal cancer, cancer of the respiratory system, sarcoma, skin cancer, stomach cancer, testicular cancer, thyroid cancer, uterine cancer, cancer of the urinary system, as well as other carcinomas and sarcomas.

Exemplary carcinomas that are intended for treatment with the compounds and compositions of the invention include, but are not limited to, acinar carcinoma, acinous carcinoma, alveolar adenocarcinoma (also called adenocystic carcinoma, adenomyoepithelioma, cribriform carcinoma and cylindroma), carcinoma adenomatosum, adenocarcinoma, carcinoma of adrenal cortex, alveolar carcinoma, alveolar cell carcinoma (also called bronchiolar carcinoma, alveolar cell tumor and pulmonary adenomatosis), basal cell carcinoma, carcinoma basocellulare (also called basaloma, or basiloma, and hair matrix carcinoma), basaloid carcinoma, basosquamous cell carcinoma, breast carcinoma, bronchioalveolar carcinoma, bronchiolar carcinoma, bronchogenic carcinoma, cerebriform carcinoma, cholangiocellular carcinoma (also called cholangioma and cholangiocarcinoma), chorionic carcinoma, colloid carcinoma, comedo carcinoma, corpus carcinoma, cribriform carcinoma, carcinoma en cuirasse, carcinoma cutaneum, cylindrical carcinoma, cylindrical cell carcinoma, duct carcinoma, carcinoma durum, embryonal carcinoma, encephaloid carcinoma, epibulbar carcinoma, epidermoid carcinoma, carcinoma epitheliale adenoides, carcinoma exulcere, carcinoma fibrosum, gelatiniform carcinoma, gelatinous carcinoma, giant cell carcinoma, gigantocellulare, glandular carcinoma, granulosa cell carcinoma, hair-matrix carcinoma, hematoid carcinoma, hepatocellular carcinoma (also called hepatoma, malignant hepatoma and hepatocarcinoma), Htirthle cell carcinoma, hyaline carcinoma, hypernephroid carcinoma, infantile embryonal carcinoma, carcinoma in situ, intraepidermal carcinoma, intraepithelial carcinoma, Krompecher's carcinoma, Kulchitzky-cell carcinoma, lenticular carcinoma, carcinoma lenticulare, lipomatous carcinoma, lymphoepithelial carcinoma, carcinoma mastitoides, carcinoma medullare, medullary carcinoma, carcinoma melanodes, melanotic carcinoma, mucinous carcinoma, carcinoma muciparum, carcinoma mucocellulare, mucoepidermoid carcinoma, carcinoma mucosum, mucous carcinoma, carcinoma myxomatodes, nasopharyngeal carcinoma, carcinoma nigrum, oat cell carcinoma, carcinoma ossificans, osteoid carcinoma, ovarian carcinoma, papillary carcinoma, periportal carcinoma, preinvasive carcinoma, prostate carcinoma, renal cell carcinoma of kidney (also called adenocarcinoma of kidney and hypernephoroid carcinoma), reserve cell carcinoma, carcinoma sarcomatodes, scheinderian carcinoma, scirrhous carcinoma, carcinoma scroti, signet-ring cell carcinoma, carcinoma simplex, small-cell carcinoma, solanoid carcinoma, spheroidal cell carcinoma, spindle cell carcinoma, carcinoma spongiosum, squamous carcinoma, squamous cell carcinoma, string carcinoma, carcinoma telangiectaticum, carcinoma telangiectodes, transitional cell carcinoma, carcinoma tuberosum, tuberous carcinoma, verrucous carcinoma, carcinoma vilosum.

Exemplary sarcomas are rare mesenchymal neoplasms that arise in bone and soft tissues. Different types of sarcomas are recognized and these include: e.g., liposarcomas (including myxoid liposarcomas and pleiomorphic liposarcomas), leiomyosarcomas, rhabdomyosarcomas, malignant peripheral nerve sheath tumors (also called malignant schwannomas, neurofibrosarcomas, or neurogenic sarcomas), Ewing's tumors (including Ewing's sarcoma of bone, extraskeletal (i.e., non-bone) Ewing's sarcoma, and primitive neuroectodermal tumor [PNET]), synovial sarcoma, angiosarcomas, hemangiosarcomas, lymphangiosarcomas, Kaposi's sarcoma, hemangioendothelioma, fibrosarcoma, desmoid tumor (also called aggressive fibromatosis), dermatofibrosarcoma protuberans (DFSP), malignant fibrous histiocytoma (MFH), hemangiopericytoma, malignant mesenchymoma, alveolar soft-part sarcoma, epithelioid sarcoma, clear cell sarcoma, desmoplastic small cell tumor, gastrointestinal stromal tumor (GIST) (also known as GI stromal sarcoma), osteosarcoma (also known as osteogenic sarcoma)-skeletal and extraskeletal, and chondrosarcoma.

The compounds and compositions of the invention can also be used to treat refractory cancers. A refractory cancer is a cancer that is resistant to the ordinary standard of care prescribed. Subjects being treated according to the invention for a refractory cancer therefore may have already been exposed to another treatment for their cancer. Alternatively, if the cancer is likely to be refractory (e.g., given an analysis of the cancer cells or history of the subject), then the subject may not have already been exposed to another treatment. Examples of refractory cancers include but are not limited to leukemias, melanomas, renal cell carcinomas, colon cancer, liver (hepatic) cancers, pancreatic cancer, Non-Hodgkin's lymphoma, and lung cancer.

The compounds and compositions of the invention can also be used to treat immunogenic cancers. Cancers that are immunogenic are cancers can express immunogens on their surface or upon cell death. These immunogens are in vivo endogenous sources of cancer antigens and their release can be exploited by the methods of the invention in order to treat the cancer. Exemplary immunogenic cancers include malignant melanoma and renal cell cancer, Mantel Cell Lymphoma, follicular lymphoma, diffuse large B-cell lymphoma, T-cell acute lymphoblastic leukemia, Burkitt lymphoma, myeloma, immunocytoma, acute promyelocytic leukemia, chronic myeloid/acute lymphoblastic leukemia, acute leukemia, B-cell acute lymphoblastic leukemia, anaplastic large cell leukemia, myelodysplastic syndrome/ acute myeloid leukemia, Non-Hodgkin's lymphoma, chronic lymphocytic leukemia (CLL), acute lymphoblastic leukemia (ALL), acute myelogenous leukemia (AML), Common (pre-B) acute lymphocytic leukemia, malignant melanoma, T-cell lymphoma, leukemia, B-cell lymphoma, epithelial malignancies, lymphoid malignancies, gynecological carcinomas, biliary adenocarcinomas, and ductal adenocarcinomas of the pancreas.

The compounds and compositions of the invention can also be used to treat angiogenesis. Angiogenesis is an abnormal rapid proliferation of endothelial cells resulting in persistent and unabated formation of abnormal new blood vessels. Angiogenesis that continues for months or years can support the growth and progression of cancer and may result in damage to various organs and tissues such as, for example, the eye, skin, heart, blood vessels, lung, gastrointestinal tract, and the genitourinary tract.

As used herein the term "inhibits angiogenesis" refers to the reduction of the number or density of the abnormal microvessels upon treatment with compounds described in this invention or via targeting septin-2 or other septin family of proteins individually or collectively. The most widely used method in clinical settings relies on histochemical or immunohistochemical staining of blood vessels (microvessels) in biopsies (open or needle) or specimens. Features of angiogenesis that may be examined include, for example, blood vessel density and/or the morphology and/or thickness of the perivascular cuff. Areas of microvessel density in a histologic biopsy or specimen are quantified. Areas of high microvessel density ("hot spots") may, for example, contain the most tumor cells and/or have the highest chance of metastasizing. One technique of determining microvessel density is by measuring intercapillary distance. Another method of assessing angiogenesis is measuring perivascular cuff thickness. An increase in the thickness of the perivascular cuff is associated with progression of the angiogenesis and may be indicative of disease worsening.

Inhibition of the angiogenesis, an aspect of this invention, may be assessed by measuring blood, serum, plasma, or tissue levels of angiogenesis (angiogenic) factors or the levels of angiogenic factors, which serve as a surrogate marker of angiogenesis. Exemplary Angiogenic factors that can serve as surrogate markers of angiogenesis include, but are not limited to, Angiogenin, Angiopoietin-1, Del-1, Fibroblast growth factors: acidic (aFGF) and basic (bFGF), Follistatin, Granulocyte colony-stimulating factor (G-CSF), Hepatocyte growth factor (HGF)/scatter factor (SF), Interleukin-8 (IL-8), Leptin, Midkine, Placental growth factor, Platelet-derived endothelial cell growth factor (PD-ECGF), Platelet-derived growth factor-BB (PDGF-BB), Pleiotrophin (PTN), Progranulin, Proliferin, Transforming growth factor-alpha (TGF-alpha), Transforming growth factor-beta (TGF-beta), Tumor necrosis factor-alpha (TNF-alpha), and Vascular endothelial growth factor (VEGF)/vascular permeability factor (VPF). Imaging techniques are also useful for the assessment of angiogenesis. Suitable imaging techniques or devices include non-invasive devices such as CT, rotational CT, micro-CT, multiple energy computed tomography (MECT), single detector CT (SDCT), multi-detector CT (MDCT), volumetric CT (VCT), MRI, micro-MR, X-ray, rotational X-ray, PET, near infrared/optical and other non-invasive scanning techniques and devices that may be used outside a subject's body or inserted non-invasively into a body cavity. Angiogenesis may also be imaged by CT angiography (CTA), tomosynthesis, X-ray micro-angiography, and by other techniques. One angiogenesis imaging technique involves the use microbubble-based contrast agents (SonoVue) combined with ultrasound and contrast specific imaging modalities to detect perfusion changes on tumor microvascular perfusion. Other angiogenesis imaging techniques include color Doppler and mammography. Color Doppler imaging can demonstrate angiogenesis in tumors such as breast cancer. Mammography may reveal the vascularized rim of a breast tumor. A wide range of imaging or radiologic signs may be enhanced by dyes.

Angiogenesis can also be assessed in a subject by a process that involves introducing at least one contrast agent into a body region of interest. For example, a contrast agent for detecting blood vessels may be injected into a blood vessel. A small amount of contrast agent may be introduced locally to enhance the detection of blood vessels in a particular body region of interest. Alternatively, a contrast agent may be provided in an amount sufficient to enhance the detection of blood vessels in a large body region or in the entire subject body. Structure data may be obtained for the body of the subject, or may be obtained for one or more target organs e.g., a lung, heart, breast, colon, etc., portion of an organ, or another target volume of the subject's body. A target volume can be any portion of the subject's body. e.g., a limb, the abdomen, the torso, the neck, the head, or any portion thereof. Other methods or techniques to assess angiogenesis not described herein may be used for the purpose of this invention. Methods and techniques to assess angiogenesis are known to those of ordinary skill in the art.

The uses of the compounds and compositions described in the invention can be combined with other therapies, such as radiation therapy, surgery, conventional chemotherapy, or with a combination of one or more additional therapies.

The compounds and compositions described in the invention are administered alone in a pharmaceutical composition, or combined with therapeutically effective and physiologically acceptable amounts of one or more other active ingredients or agents. Such other active ingredients include, but are not limited to, glutathione antagonists, angiogenesis inhibitors, chemotherapeutic agent(s), and antibodies (e.g., cancer antibodies). The compounds and compositions described in the invention and the other active ingredients or agents are administered simultaneously or sequentially. When the compounds and compositions described in the invention are administered simultaneously with another active agent or combined with another active ingredient, the compounds and compositions and the other active ingredient are administered in the same or separate formulations, but are administered at the same time. The other active agents are administered sequentially with one another and with the compounds and compositions of the invention when the administration of the other active agent and the septin targeting compounds is temporally separated. The separation in time between administrations is a matter of minutes, hour, days, or any time longer.

Examples of glutathione antagonists include but are not limited to buthionine sulfoximine, cyclophosphamide, ifosphamide, actinomycin D, and N-(4-hydroxyphenyl)retinamide (4-HPR).

Examples of angiogenesis inhibitors include but are not limited to 2-methoxyestradiol (2-ME), AG3340, Angiostatin, Antithrombin III, Anti-VEGF antibody, Batimastat, bevacizumab (avastatin), BMS-275291, CAI, Canstatin, Captopril, Cartilage Derived Inhibitor (CDI), CC-5013, Celecoxib (CELEBREX®), COL-3, Combretastatin, Combretastatin A4 Phosphate, Dalteparin (FRAGIN®), EMD 121974 (Cilengitide), Endostatin, Erlotinib (TARCEVA®), gefitinib (Iressa), Genistein, Halofuginone Hydrobromide (TEMPOSTATIN™), Id1, Id3, IM862, imatinib mesylate, Inducible protein 10, Interferon-alpha, Interleukin 12, Lavendustin A, LY317615 or AE-941 (NEOVASTAT™), Marimastat, Maspin, Medroxpregesterone Acetate, Meth-1, Meth-2, Neovastat, Osteopontin cleaved product, PEX, Pigment epithelium growth factor (PEGF), Platelet factor 4, Prolactin fragment, Proliferin-related protein (PRP), PTK787/ZK 222584, Recombinant human platelet factor 4 (rPF4), Restin, Squalamine, SU5416, SU6668, Suramin, Taxol, Tecogalan, Thalidomide, Thrombospondin, TNP-470, Troponin I, Vasostatin, VEG1, VEGF-Trap, and ZD6474. In some embodiments the angiogenesis inhibitor is a VEGF antagonist. The VEGF antagonist may be a VEGF binding molecule. VEGF binding molecules include VEGF antibodies or antigen binding fragment(s) thereof. One example of a VEGF antagonist is NeXstar.

Chemotherapeutic agents can be used as an additional active ingredient to the compounds and compositions of the invention. Such chemotherapeutic agents include, but are not limited to, DNA damaging agents and these include topoisomerase inhibitors (e.g., etoposide, ramptothecin, topotecan, teniposide, mitoxantrone), anti-microtubule agents (e.g., vincristine; vinblastine), anti-metabolic agents (e.g., cytarabine, methotrexate, hydroxyurea, 5-fluorouracil, floxuridine, 6-thioguanine, 6-mercaptopurine, fludarabine, pentostatin, chlorodeoxyadenosine), DNA alkylating agents (e.g., cisplatin, mechlorethamine, cyclophosphamide, ifosfamide, melphalan, chorambucil, busulfan, thiotepa, carmustine, lomustine, carboplatin, dacarbazine, procarbazine), and DNA strand break inducing agents (e.g., bleomycin, doxorubicin, daunorubicin, idarubicin, mitomycin C). Chemotherapeutic agents include synthetic; semisynethetic and naturally derived agents. Important chemotherapeutic agents include but are not limited to Acivicin, Aclarubicin, Acodazole Hydrochloride, Acronine, Adozelesin, Adriamycin, Aldesleukin, Alitretinoin, Allopurinol Sodium, Altretamine, Ambomycin, Ametantrone Acetate, Aminoglutethimide, Amsacrine, Anastrozole, Annonaceous Acetogenins, Anthramycin, Asimicin, Asparaginase, Asperlin, Azacitidine, Azetepa, Azotomycin, Batimastat, Benzodepa, Bexarotene, Bicalutamide, Bisantrene Hydrochloride, Bisnafide Dimesylate, Bizelesin, Bleomycin Sulfate, Brequinar Sodium, Bropirimine, Bullatacin, Busulfan, Cabergoline, Cactinomycin, Calusterone, Caracemide, Carbetimer, Carboplatin, Carmustine, Carubicin Hydrochloride, Carzelesin, Cedefingol, Celecoxib, Chlorambucil, Cirolemycin, Cisplatin, Cladribine, Crisnatol Mesylate, Cyclophosphamide, Cytarabine, Dacarbazine, DACA (N-[2-(Dimethyl-amino)ethyl]acridine-4-carboxamide), Dactinomycin, Daunorubicin Hydrochloride, Daunomycin, Decitabine, Denileukin Diftitox, Dexormaplatin, Dezaguanine, Dezaguanine Mesylate, Diaziquone, Docetaxel, Doxorubicin, Doxorubicin Hydrochloride, Droloxifene, Droloxifene Citrate, Dromostanolone Propionate, Duazomycin, Edatrexate, Eflornithine Hydrochloride, Elsamitrucin, Enloplatin, Enpromate, Epipropidine, Epirubicin Hydrochloride, Erbulozole, Esorubicin Hydrochloride, Estramustine, Estramustine Phosphate Sodium, Etanidazole, Ethiodized Oil I 131, Etoposide, Etoposide Phosphate, Etoprine, Fadrozole Hydrochloride, Fazarabine, Fenretinide, Floxuridine, Fludarabine Phosphate, Fluorouracil, 5-FdUMP, Fluorocitabine, Fosquidone, Fostriecin Sodium, FK-317, FK-973, FR-66979, FR-900482, Gemcitabine, Gemcitabine Hydrochloride, Gemtuzumab Ozogamicin, Gold Au 198, Goserelin Acetate, Guanacone, Hydroxyurea, Idarubicin Hydrochloride, Ifosfamide, Ilmofosine, Interferon Alfa-2a, Interferon Alfa-2b, Interferon Alfa-n1, Interferon Alfa-n3, Interferon Beta-I a, Interferon Gamma-I b, Iproplatin, Irinotecan Hydrochloride, Lanreotide Acetate, Letrozole, Leuprolide Acetate, Liarozole Hydrochloride, Lometrexol Sodium, Lomustine, Losoxantrone Hydrochloride, Masoprocol, Maytansine, Mechlorethamine Hydrochloride, Megestrol Acetate, Melengestrol Acetate, Melphalan, Menogaril, Mercaptopurine, Methotrexate, Methotrexate Sodium, Methoxsalen, Metoprine, Meturedepa, Mitindomide, Mitocarcin, Mitocromin, Mitogillin, Mitomalcin, Mitomycin, Mytomycin C, Mitosper, Mitotane, Mitoxantrone Hydrochloride, Mycophenolic Acid, Nocodazole, Nogalamycin, Oprelvekin, Ormaplatin, Oxisuran, Paclitaxel, Pamidronate Disodium, Pegaspargase, Peliomycin, Pentamustine, Peplomycin Sulfate, Perfosfamide, Pipobroman, Piposulfan, Piroxantrone Hydrochloride, Plicamycin, Plomestane, Porfimer Sodium, Porfiromycin, Prednimustine, Procarbazine Hydrochloride, Puromycin, Puromycin Hydrochloride, Pyrazofurin, Riboprine, Rituximab, Rogletimide, Rolliniastatin, Safingol, Safingol Hydrochloride, Samarium/Lexidronam, Semustine, Simtrazene, Sparfosate Sodium, Sparsomycin, Spirogermanium Hydrochloride, Spiromustine, Spiroplatin, Squamocin, Squamotacin, Streptonigrin, Streptozocin, Strontium Chloride Sr 89, Sulofenur, Talisomycin, Taxane, Taxoid, Tecogalan Sodium, Tegafur, Teloxantrone Hydrochloride, Temoporfin, Teniposide, Teroxirone, Testolactone, Thiamiprine, Thioguanine, Thiotepa, Thymitaq, Tiazofurin, Tirapazamine, Tomudex, TOP-53, Topotecan Hydrochloride, Toremifene Citrate, Trastuzumab, Trestolone Acetate, Triciribine Phosphate, Trimetrexate, Trimetrexate Glucuronate, Triptorelin, Tubulozole Hydrochloride, Uracil Mustard, Uredepa, Valrubicin, Vapreotide, Verteporfin, Vinblastine, Vinblastine Sulfate, Vincristine, Vincristine Sulfate, Vindesine, Vindesine Sulfate, Vinepidine Sulfate, Vinglycinate Sulfate, Vinleurosine Sulfate, Vinorelbine Tartrate, Vinrosidine Sulfate, Vinzolidine Sulfate, Vorozole, Zeniplatin, Zinostatin, Zorubicin Hydrochloride, 2-Chlorodeoxyadenosine, 2'-Deoxyformycin, 9-aminocamptothecin, raltitrexed, N-propargyl-5,8-dideazafolic acid, 2-chloro-2'-arabino-fluoro-2'-deoxyadenosine, 2-chloro-2'-deoxyadenosine, anisomycin, trichostatin A, hPRL-G129R, CEP-751, linomide, sulfur mustard, nitrogen mustard (mechlor ethamine), cyclophosphamide, melphalan, chlorambucil, ifosfamide, busulfan, N-methyl-N-nitrosourea (MNU), N,N'-Bis(2-chloroethyl)-N-nitrosourea (BCNU), N-(2-chloroethyl)-N'-cyclohexyl-N-nitrosourea (CCNU), N-(2-chloroethyl)-N'-(trans-4-methylcyclohexyl-N-nitrosourea (MeCCNU), N-(2-chloroethyl)-N'-(diethyl) ethylphosphonate-N-nitrosourea (fotemustine), streptozotocin, diacarbazine (DTIC), mitozolomide, temozolomide, thiotepa, mitomycin C, AZQ, adozelesin, Cisplatin, Carboplatin, Ormaplatin, Oxaliplatin, C1-973, DWA 2114R, JM216, JM335, Bis (platinum), tomudex, azacitidine, cytarabine, gemcitabine, 6-Mercaptopurine, 6-Thioguanine, Hypoxanthine, teniposide, 9-amino camptothecin, Topotecan, CPT-11, Doxorubicin, Daunomycin, Epirubicin, darubicin, mitoxantrone, losoxantrone, Dactinomycin (Actinomycin D), amsacrine, pyrazoloacridine, all-trans retinol, 14-hydroxy-retro-retinol, all-trans retinoic acid, N-(4-Hydroxyphenyl)retinamide, 13-cis retinoic acid, 3-Methyl TTNEB, 9-cis retinoic acid, fludarabine (2-F-ara-AMP), and 2-chlorodeoxyadenosine (2-Cda).

Other chemotherapeutic agents intended to be combined with the compounds and compositions of the invention include, but not limited to, 20-epi-1,25 dihydroxyvitamin D3, 5-ethynyluracil, abiraterone, aclarubicin, acylfulvene, adecypenol, adozelesin, aldesleukin, ALL-TK antagonists, altretamine, ambamustine, amidox, amifostine, aminolevulinic acid, amrubicin, amsacrine, anagrelide, anastrozole, andrographolide, angiogenesis inhibitors, antagonist D, antagonist G, antarelix, anti-dorsalizing morphogenetic protein-1, antiandrogen, prostatic carcinoma, antiestrogen, antineoplaston, antisense oligonucleotides, aphidicolin glycinate, apoptosis gene modulators, apoptosis regulators, apurinic acid, ara-CDP-DL-PTBA, arginine deaminase, asulacrine, atamestane, atrimustine, axinastatin 1, axinastatin 2, axinastatin 3, azasetron, azatoxin, azatyrosine, baccatin III derivatives, balanol, batimastat, BCR/ABL antagonists, benzochlorins, benzoylstaurosporine, beta lactam derivatives, beta-alethine, betaclamycin B, betulinic acid, bFGF inhibitor, bicalutamide, bisantrene, bisaziridinylspermine, bisnafide, bistratene A, bizelesin, breflate, bleomycin A2, bleomycin B2, bropirimine, budotitane, buthionine sulfoximine, calcipotriol, calphostin C, camptothecin derivatives (e.g., 10-hydroxy-camptothecin), canarypox IL-2; capecitabine, carboxamide-amino-triazole, carboxyamidotriazole, CaRest M3, CARN 700, cartilage derived inhibitor, carzelesin, casein kinase inhibitors (ICOS), castanospermine, cecropin B, cetrorelix, chlorins, chloroquinoxaline sulfonamide, cicaprost, cis-porphyrin, cladribine, clomifene analogues, clotrimazole, collismycin A, collismycin B, combretastatin A4, combretastatin analogue, conagenin, crambescidin 816, crisnatol, cryptophycin 8, cryptophycin A derivatives, curacin A, cyclopentanthraquinones, cycloplatam, cypemycin, cytarabine ocfosfate, cytolytic factor, cytostatin, dacliximab, decitabine, dehydrodidemnin B, 2' deoxycoformycin (DCF), deslorelin, dexifosfamide, dexrazoxane, dexverapamil, diaziquone, didemnin B, didox, diethylnorspermine, dihydro-5-azacytidine, dihydrotaxol, dioxamycin, diphenyl spiromustine, discodermolide, docosanol, dolasetron, doxifluridine, droloxifene, dronabinol, duocarmycin SA, ebselen, ecomustine, edelfosine, edrecolomab, eflornithine, elemene, emitefur, epirubicin, epothilones (A, R=H, B, R=Me), epithilones, epristeride, estramustine analogue, estrogen agonists, estrogen antagonists, etanidazole, etoposide, etoposide 4'-phosphate (etopofos), exemestane, fadrozole, fazarabine, fenretinide, filgrastim, finasteride, flavopiridol, flezelastine, fluasterone, fludarabine, fluorodaunorunicin hydrochloride, forfenimex, formestane, fostriecin, fotemustine, gadolinium texaphyrin, gallium nitrate, galocitabine, ganirelix, gelatinase inhibitors, gemcitabine, glutathione inhibitors, hepsulfam, heregulin, hexamethylene bisacetamide, homoharringtonine (HHT), hypericin, ibandronic acid idarubicin, idoxifene, idramantone, ilmofosine, ilomastat, imidazoacridones, imiquimod, immunostimulant peptides, insulin-like growth factor-1 receptor inhibitor, interferon agonists, interferons, interleukins, iobenguane, iododoxorubicin, ipomeanol, 4-, irinotecan, iroplact, irsogladine, isobengazole, isohomohalicondrin B, itasetron, jasplakinolide, kahalalide F, lamellarin-N triacetate, lanreotide, leinamycin, lenograstim, lentinan sulfate, leptolstatin, letrozole, leukemia inhibiting factor, leukocyte alpha interferon, leuprolide+estrogen+progesterone, leuprorelin, levamisole, liarozole, linear polyamine analogue, lipophilic disaccharide peptide, lipophilic platinum compounds, lissoclinamide 7, lobaplatin, lombricine, lometrexol, lonidamine, losoxantrone, lovastatin, loxoribine, lurtotecan, lutetium texaphyrin, lysofylline, lytic peptides, maitansine, mannostatin A, marimastat, masoprocol, maspin, matrilysin inhibitors, matrix metalloproteinase inhibitors, menogaril, merbarone, meterelin, methioninase, metoclopramide, MIF inhibitor, mifepristone, miltefosine, mirimostim, mismatched double stranded RNA, mithracin, mitoguazone, mitolactol, mitomycin analogues, mitonafide, mitotoxin fibroblast growth factor-saporin, mitoxantrone, mofarotene, molgramostim, monoclonal antibody, human chorionic gonadotrophin, mopidamol, multiple drug resistance gene inhibitor, multiple tumor suppressor 1-based therapy, mustard anticancer agent, mycaperoxide B, mycobacterial cell wall extract, myriaporone, N-acetyldinaline, N-substituted benzamides, nafarelin, nagrestip, naloxone+pentazocine, napavin, naphterpin, nartograstim, nedaplatin, nemorubicin, neridronic acid, neutral endopeptidase, nilutamide, nisamycin, nitric oxide modulators, nitroxide antioxidant, nitrullyn, 06-benzylguanine, octreotide, okicenone, oligonucleotides, onapristone, ondansetron, ondansetron, oracin, oral cytokine inducer, ormaplatin, osaterone, oxaliplatin, oxaunomycin, paclitaxel analogues, paclitaxel derivatives, palauamine, palmitoylrhizoxin, pamidronic acid, panaxytriol, panomifene, parabactin, pazelliptine, pegaspargase, peldesine, pentosan polysulfate sodium, pentostatin, pentrozole, perflubron, perfosfamide, perillyl alcohol, phenazinomycin, phenylacetate, phosphatase inhibitors, picibanil, pilocarpine hydrochloride, pirarubicin, piritrexim, placetin A, placetin B, plasminogen activator inhibitor, platinum complex, platinum compounds, platinum-triamine complex, podophyllotoxin, porfimer sodium, porfiromycin, propyl bis-acridone, prostaglandin J2, proteasome inhibitors, protein A-based immune modulator, protein kinase C inhibitor, protein kinase C inhibitors, microalgal, protein tyrosine phosphatase inhibitors, purine nucleoside phosphorylase inhibitors, purpurins, pyrazoloacridine, pyridoxylated hemoglobin polyoxyethylene conjugate, raf antagonists, raltitrexed, ramosetron, ras farnesyl protein transferase inhibitors, ras inhibitors, ras-GAP inhibitor, retelliptine demethylated, rhenium Re 186 etidronate, rhizoxin, ribozymes, RH retinamide, rogletimide, rohitukine, romurtide, roquinimex, rubiginone B1, ruboxyl, safingol, saintopin, SarCNU, sarcophytol A, sargramostim, Sdi 1 mimetics, semustine, senescence derived inhibitor 1, sense oligonucleotides, signal transduction inhibitors, signal transduction modulators, single chain antigen binding protein, sizofiran, sobuzoxane, sodium borocaptate, sodium phenylacetate, solverol, somatomedin binding protein, sonermin, sparfosic acid, spicamycin D, spiromustine, splenopentin, spongistatin 1, squalamine, stem cell inhibitor, stem-cell division inhibitors, stipiamide, stromelysin inhibitors, sulfinosine, superactive vasoactive intestinal peptide antagonist, suradista, suramin, swainsonine, synthetic glycosaminoglycans, tallimustine, tamoxifen methiodide, tauromustine, tazarotene, tecogalan sodium, tegafur, tellurapyrylium, telomerase inhibitors, temoporfin, temozolomide, teniposide, tetrachlorodecaoxide, tetrazomine, thaliblastine, thalidomide, thiocoraline, thrombopoietin, thrombopoietin mimetic, thymalfasin, thymopoietin receptor agonist, thymotrinan, thyroid stimulating hormone, tin ethyl etiopurpurin, tirapazamine, titanocene dichloride, topotecan, topsentin, toremifene, totipotent stem cell factor, translation inhibitors, tretinoin, triacetyluridine, triciribine, trimetrexate, triptorelin, tropisetron, turosteride, tyrosine kinase inhibitors, tyrphostins, UBC inhibitors, ubenimex, urogenital sinus-derived growth inhibitory factor, urokinase receptor antagonists, vapreotide, variolin B, vector system, erythrocyte gene therapy, velaresol, veramine, verdins, verteporfin, vinorelbine, vinxaltine, vitaxin, vorozole, zanoterone, zeniplatin, zilascorb, and zinostatin stimalamer.

Other chemotherapeutic agents intended to be combined with the compounds and compositions of the invention include, but not limited to, Antiproliferative agents (e.g., Piritrexim Isothionate), Antiprostatic hypertrophy agent (e.g., Sitogluside), Benign prostatic hyperplasia therapy agents (e.g., Tamsulosin Hydrochloride), Prostate growth inhibitor agents (e.g., Pentomone), and Radioactive agents: Fibrinogen I 125, Fludeoxyglucose F 18, Fluorodopa F 18, Insulin I 125, Insulin I 131, Iobenguane I 123, Iodipamide Sodium I 131, Iodoantipyrine I 131, Iodocholesterol I 131, Iodohippurate Sodium I 123, Iodohippurate Sodium I 125, Iodohippurate Sodium I 131, Iodopyracet I 125, Iodopyracet I 131, Iofetamine Hydrochloride I 1123, Iomethin I 125, Iomethin I 131, Iothalamate Sodium I 125, Iothalamate Sodium I 131, Iotyrosine I 131, Liothyronine I 125, Liothyronine I 131, Merisoprol Acetate Hg 197, Merisoprol Acetate Hg 203, Merisoprol Hg 197, Methyl Iodobenzo Guanine (MIBG-I131 or MIBG-I123), Selenomethionine Se 75, Technetium Tc 99m Antimony Trisulfide Colloid, Technetium Tc 99m Bicisate, Technetium Tc 99m Disofenin, Technetium Tc 99m Etidronate, Technetium Tc 99m Exametazine, Technetium Tc 99m Furifosmin, Technetium Tc 99m Gluceptate, Technetium TC 99m Lidofenin, Technetium Tc 99m Mebrofenin, Technetium Tc 99m Medronate, Technetium Tc 99m Medronate Disodium, Technetium Tc 99m Mertiatide, Technetium Tc 99m Oxidronate, Technetium Tc 99m Pentetate, Technetium Tc 99m Pentetate Calcium Trisodium, Technetium Tc 99m Sestamibi, Technetium Tc 99m Siboroxime, Technetium Tc 99m Succimer, Technetium Tc 99m Sulfur Colloid, Technetium Tc 99m Teboroxime, Technetium Tc 99m Tetrofosmin, Technetium Tc 99m Tiatide, Thyroxine I 125, Thyroxine I 131, Tolpovidone I 131, Triolein I 125, and Triolein I 131. MIBG-I131 and MIBG-I123 are especially preferred chemotherapeutic agents for co-administration with the compounds and compositions of the invention.

Another category of chemotherapeutic agents intended to be combined with the compounds and compositions of the invention include, but not limited to, one or more anti-cancer supplementary potentiating agents, such as Tricyclic anti-depressant drugs (e.g., imipramine, desipramine, amitryptyline, clomipramine, trimipramine, doxepin, nortriptyline, protriptyline, amoxapine and maprotiline), non-tricyclic anti-depressant drugs (e.g., sertraline, trazodone and citalopram), $Ca^{++}$ antagonists (e.g., verapamil, nifedipine, nitrendipine and caroverine), Calmodulin inhibitors (e.g., prenylamine, trifluoroperazine and clomipramine), Amphotericin B, Triparanol analogues (e.g., tamoxifen), antiarrhythmic drugs (e.g., quinidine), antihypertensive drugs (e.g., reserpine), Thiol depleters (e.g., buthionine and sulfoximine) and Multiple Drug Resistance reducing agents such as Cremaphor EL. Other chemotherapeutic agents that can be combined with the agents described in this invention include: annonaceous acetogenins, asimicin, rolliniastatin, guanacone, squamocin, bullatacin, squamotacin, taxanes, paclitaxel, gemcitabine, methotrexate FR-900482, FK-973, FR-66979, FK-317, 5-FU, FUDR, FdUMP, Hydroxyurea, Docetaxel, discodermolide, epothilones, vincristine, vinblastine, vinorelbine, meta-pac, irinotecan, SN-38, 10-OH campto, topotecan, etoposide, adriamycin, flavopiridol, Cis-Pt, carbo-Pt, bleomycin, mitomycin C, mithramycin, capecitabine, cytarabine, 2-Cl-2' deoxyadenosine, Fludarabine-PO4, mitoxantrone, mitozolomide, Pentostatin, and Tomudex.

One important class of chemotherapeutic agents that intended to be combined with the compounds and compositions of the invention are taxanes (e.g., paclitaxel and docetaxel). For example, tamoxifen or aromatase inhibitor arimidex (i.e., anastrozole), combined with the compounds and compositions of the invention, are particularly useful for breast and gynecological cancers (such as ovarian cancers).

As an important aspect of this invention, the compounds and compositions of the invention are administered in combination with antibodies. Examples of antibodies that can be used as other active ingredients according to the invention include, but are not limited to, anti-CD20 antibodies (including monoclonal antibody, or mAb), rituximab, Rituxan™, tositumomab Bexxar, anti-HER2 antibodies, trastuzumab, Herceptin™, MDX-210, anti-CA125 mAb, oregovomab, B43.13, Ovarex™, Breva-Rex, AR54, GivaRex, ProstaRex, anti-EGF receptor mAb, IMC-C225, Erbitux™, anti-EGF receptor mAb, MDX-447, gemtuzumab ozogamicin, Mylotarg, CMA-676, anti-CD33 (Wyeth Pharmaceuticals), anti-tissue factor protein (TF), ior-c5, anti-c5 antibodies, anti-EGF receptor mAb, MDX-447, anti-17-1A mAb, edrecolomab, Panorex, anti-CD20 mAb (Y-90 labeled), ibritumomab tiuxetan (IDEC-Y2B8), Zevalin, anti-idiotypic mAb mimic of ganglioside GD3 epitope, BEC2, anti-HLA-Dr10 mAb (131 I LYM-1), Oncolym™, anti-CD33 humanized mAb (SMART M195), Zamyl™, anti-CD52 humAb (LDP-03), CAMPATH, anti-CD1 mAb, anti-t6 antibodies, anti-CAR (complement activating receptor) mAb, MDX-11, humanized bispecific mAb conjugates (complement cascade activators), MDX-22, OV103 (Y-90 labeled antibody), celogovab, OncoScint™, anti-17-1A mAb, 3622W94, anti-VEGF (RhumAb-VEGF), bevacizumab, Avastin™, anti-TAC (IL-2 receptor) humanized Ab (SMART), daclizumab, Zenapax, anti-TAG-72 partially humanized bispecific Ab, MDX-220, anti-idiotypic mAb mimic of high molecular weight proteoglycan (I-Mel-1), MELIMMUNE-1, anti-idiotypic mAb mimic of high molecular weight proteoglycan (I-Mel-2), MELIMMUNE-2, anti-CEA Ab (hMN14), CEACide™, Pretarget™ radioactive targeting agents, hmAbH11 scFv fragment (NovomAb-G2), HI1 scFv, anti-DNA or DNA-associated proteins (histones) mAb and conjugates, TNT (e.g. Cotara™), Gliomab-H mAb, GNI-250 mAb, anti-EGF receptor mAb, EMD-72000, anti-CD22 humanized Ab, LymphoCide, Non-Hodgkin's anti-CD33 mAb conjugate with calicheamicin (CMA 676), gemtuzumab ozogamicin, Mylotarg™, Monopharm-C, colon, anti-idiotypic human mAb to GD2 ganglioside, 4B5, melanoma, anti-EGF receptor humanized Ab, ior egf/r3, anti-ior c2 glycoprotein mAb, BABS (biosynthetic antibody binding site) proteins, anti-FLK-2/FLT-3 mAb, mAb/small-molecule conjugate, TAP (tumor-activated prodrug), anti-GD-2 bispecific mAb, MDX-260, antinuclear autoantibodies (binds nucleosomes), ANA Ab, anti-HLA-DR Ab (SMART 1D10 Ab), Remitogen™, SMART ABL 364 Ab, anti-CEA I131-labeled mAb, and ImmuRAIT-CEA.

Other antibodies for combinations with the compounds and compositions of the invention include, but not limited to, anti-TNFα antibody such as infliximab (Remicade) and etanercept (Enbrel) for rheumatoid arthritis and Crohn's disease, palivizuma, anti-RSV antibody for pediatric subjects, bevacizumab, alemtuzumab, Campath-1H, BLyS-mAb, fSLE, anti-VEGF2, anti-Trail receptor, B3 mAb, m170 mAb, mAB BR96, and Abx-Cbl mAb. The invention embraces a number of classes of antibodies and fragments thereof including but not limited to antibodies directed to cancer antigens (as described herein), cell surface molecule, stromal cell molecules, extracellular matrix molecules, and tumor vasculature associated molecules.

A cell surface molecule is a molecule that is expressed at the surface of a cell. In addition to an extracellular domain, it may further comprise a transmembrane domain and a cytoplasmic domain. Examples include HER 2, CD20, CD33, EGF receptor, HLA markers such as HLA-DR, CD52, CD1, CEA, CD22, GD2 ganglioside, FLK2/FLT3, VEGF, VEGFR, and the like.

A stromal cell molecule is a molecule expressed by a stromal cell. Examples include but are not limited to FAP and CD26.

An extracellular matrix molecule is a molecule found in the extracellular matrix. Examples include but are not limited to collagen, glycosaminoglycans (GAGs), proteoglycans, elastin, fibronectin and laminin.

A tumor vasculature associated molecule is a molecule expressed by vasculature of a tumor (i.e., a solid cancer rather than a systemic cancer such as leukemia). As with a cancer antigen, a tumor vasculature associated molecule may be expressed by normal vasculature however its presence on vasculature of a tumor makes it a suitable target for anti-cancer therapy. In some instances, the tumor vasculature associated molecule is expressed at a higher level in tumor vasculature than it is in normal vasculature. Examples include but are not limited to endoglin (see U.S. Pat. No. 5,660,827), ELAM-1, VCAM-1, ICAM-1, ligand reactive with LAM-1, MHC class II antigens, aminophospholipids such as phosphatidylserine and phosphatidylethanolamine (as described in U.S. Pat. No. 6,312,694), VEGFR1 (Flt-1) and VEGFR2 (KDR/Flk-1), and other tumor vasculature associated antigens such as those described in U.S. Pat. No. 5,776,427. Antibodies to endoglin are described in U.S. Pat. No. 5,660,827 and include TEC-4 and TEC-11, and antibodies that recognize identical epitopes to these antibodies. Antibodies to aminophospholipids are described in U.S. Pat. No. 6,312,694. Antibodies that inhibit VEGF are described in U.S. Pat. No. 6,342,219 and include $2C_3$ (ATCC PTA 1595). Other antibodies that are specific for tumor vasculature include antibodies that react to a complex of a growth factor and its receptor such as a complex of FGF and the FGFR or a complex of TGFβ and the TGFβR. Antibodies of this latter class are described in U.S. Pat. No. 5,965,132, and include GV39 and GV97.

It is to be understood that the antibodies embraced by the invention include those recited explicitly herein and also those that bind to the same epitope as those recited herein.

The compounds and compositions described in the invention can be combined with apoptosis antibodies to achieve superior outcome. Exemplary apoptosis antibodies include, but not limited to, anti-BAX antibodies (which antagonize human, murine, and/or those Bax antigens from different animal sources), anti-flax antibodies, anti-Fas/Fas Ligand antibodies, anti-Granzyme antibodies (e.g., anti-Granzyme B antibodies), anti-BCL antibodies, anti-Cytochrome C antibodies, antibodies antagonizing TRADD, TRAIL, TRAFF, and/or DR3, anti-BIM Aantibodies, anti-PARP antibodies, anti-caspase antibodies, anti-CD29, PL18-5 PanVera, anti-CD29, PL4-3 PanVera, anti-CD41a, PT25-2 PanVera, anti-CD42b, PL52-4 PanVera, anti-CD42b, GUR20-5 PanVera, anti-CD42b, WGA-3 PanVera, anti-CD43, 1D4 PanVera, anti-CD46, MCP75-6 PanVera, anti-CD61, PL11-7 PanVera, anti-CD61, PL8-5 PanVera, anti-CD62/P-slctn, PL7-6 PanVera, anti-CD62/P-slctn, WGA-1 PanVera, anti-CD154, 5F3 PanVera; and anti-CD1, anti-CD2, anti-CD3, anti-CD4, anti-CD5, anti-CD6, anti-CD7, anti-CD8, anti-CD9, anti-CD10, anti-CD11, anti-CD12, anti-CD13, anti-CD14, anti-CD15, anti-CD16, anti-CD17, anti-CD18, anti-CD19, anti-CD20, anti-CD21, anti-CD22, anti-CD23, anti-CD24, anti-CD25, anti-CD26, anti-CD27, anti-CD28, anti-CD29, anti-CD30, anti-CD31, anti-CD32, anti-CD33, anti-CD34, anti-CD35, anti-CD36, anti-CD37, anti-CD38, anti-CD39, anti-CD40 anti-CD41, anti-CD42, anti-CD43, anti-CD44, anti-CD45, anti-CD46, anti-CD47, anti-CD48, anti-CD49, anti-CD50, anti-CD51, anti-CD52, anti-CD53, anti-CD54, anti-CD55, anti-CD56, anti-CD57, anti-CD58, anti-CD59, anti-CD60, anti-CD61, anti-CD62, anti-CD63, anti-CD64, anti-CD65, anti-CD66, anti-CD67, anti-CD68, anti-CD69, anti-CD70, anti-CD71, anti-CD72, anti-CD73, anti-CD74, anti- CD75, anti-CD76, anti-CD77, anti-CD78, anti-CD79, anti-CD80, anti-CD81, anti-CD82, anti-CD83, anti-CD84, anti-CD85, anti-CD86, anti-CD87, anti-CD88, anti-CD89, anti-CD90, anti-CD91, anti-CD92, anti-CD93, anti-CD94, anti-CD95, anti-CD96, anti-CD97, anti-CD98, anti-CD99, anti-CD 100, anti-CD 101, anti-CD 102, anti-CD 103, anti-CD104, anti-CD105, anti-CD106, anti-CD 107, anti-CD108, anti-CD109, anti-CD 110, anti-CD 111, anti-CD 112, anti-CD 113, anti-CD 114, anti-CD 115, anti-CD 116, anti-CD 117, anti-CD118, anti-CD119, anti-CD120, anti-CD121, anti-CD122, anti-CD123, anti-CD124, anti-CD125, anti-CD126, anti-CD127, anti-CD128, anti-CD129, anti-CD130, anti-CD131, anti-CD132, anti-CD133, anti-CD134, anti-CD135, anti-CD136, anti-CD137, anti-CD138, anti-CD 139, anti-CD 140, anti-CD 141, anti-CD 142, anti-CD 143, anti-CD 144, anti-CD 145, anti-CD 146, anti-CD 147, anti-CD 148, anti-CD 149, anti-CD 150, anti-CD 151, anti-CD 152, anti-CD 153, anti-CD154, anti-CD155, anti-CD156, anti-CD157, anti-CD158, anti-CD159, anti-CD 160, anti-CD161, anti-CD162, anti-CD163, anti-CD164, anti-CD165, anti-CD166, anti-CD167, anti-CD 168, anti-CD169, anti-CD170, anti-CD171, anti-CD172, anti-CD173, anti-CD174, anti-CD175, anti-CD176, anti-CD177, anti-CD178, anti-CD179, anti-CD180, anti-CD 181, anti-CD182, anti-CD183, anti-CD184, anti-CD185, anti-CD186, anti-CD187, anti-CD188, anti-CD189, anti-CD190, anti-CD191, anti-CD192, anti-CD193, anti-CD194, anti-CD195, anti-CD196, anti-CD197, anti-CD198, anti-CD199, anti-CD200, anti-CD201, anti-CD202, anti-CD203, anti-CD204, anti-CD205, anti-CD206, anti-CD207, anti-CD208, anti-CD209, anti-CD210, anti-CD211, anti-CD212, anti-CD213, anti-CD214, anti-CD215, anti-CD216, anti-CD217, anti-CD218, anti-CD219, anti-CD220, anti-CD221, anti-CD222, anti-CD223, anti-CD224, anti-CD225, anti-CD226, anti-CD227, anti-CD228, anti-CD229, anti-CD230, anti-CD231, anti-CD232, anti-CD233, anti-CD234, anti-CD235, anti-CD236, anti-CD237, anti-CD238, anti-CD239, anti-CD240 anti-CD241, anti-CD242, anti-CD243, anti-CD244, anti-CD245, anti-CD246, anti-CD247, anti-CD248, anti-CD249, anti-CD250, and the like antibodies.

Other exemplary human chemokine antibodies to be administered in combination with the compounds and compositions described in the invention include, but not limited to, Human CNTF Antibodies, Human Eotaxin Antibodies, Human Epitherlial Neutrophil Activating Peptide-78, Human Exodus Antibodies, Human GRO Antibodies, Human HCC-1 Antibodies, Human I-309 Antibodies, Human IP-10 Antibodies, Human I-TAC Antibodies, Human LIF Antibodies, Human Liver-Expressed Chemokine Antibodies, Human lymphotoxin Antibodies, Human MCP Antibodies, Human MIP Antibodies, Human Monokine Induced by IFN-gamma Antibodies, Human NAP-2 Antibodies, Human NP-1 Antibodies, Human Platelet Factor-4 Antibodies, Human RANTES Antibodies, Human SDF Antibodies, and Human TECK Antibodies.

Other exemplary chemokine antibodies to be administered in combination with the compounds and compositions described in the invention include, but not limited to, Human B-Cell Attracting Murine Chemokine Antibodies, Chemokine-1 Antibodies, Murine Eotaxin Antibodies, Murine Exodus Antibodies, Murine GCP-2 Antibodies, Murine KC Antibodies, Murine MCP Antibodies, Murine MIP Antibodies, Murine RANTES Antibodies, Rat Chemokine Antibodies, Rat Chemokine Antibodies, Rat CNTF Antibodies, Rat GRO Antibodies, Rat MCP Antibodies, Rat MIP Antibodies, and Rat RANTES Antibodies.

Exemplary cytokine/cytokin receptor antibodies to be administered in combination with the compounds and compositions described in the invention include, but not limited to, Human Biotinylated Cytokine/Cytokine Receptor Antibodies, Human IFN Antibodies, Human IL Antibodies, Human Leptin Antibodies, Human Oncostatin Antibodies, Human TNF Antibodies, Human TNF Receptor Family Antibodies, Murine Biotinylated Cytokine/Cytokine Receptor Antibodies, Murine IFN Antibodies, Murine IL Antibodies, Murine TNF Antibodies, Murine TNF Receptor Antibodies, murine anti-CCR4 antibody, Rat Biotinylated Cytokine/Cytokine Receptor Antibodies, Rat IFN Antibodies, Rat IL Antibodies, and Rat TNF Antibodies.

Exemplary ECM antibodies to be administered in combination with the compounds and compositions described in the invention include, but not limited to, antibodies recognizing Collagen/Procollagen, Laminin, Collagen (Human), Laminin (Human), Procollagen (Human), Vitronectin/Vitronectin Receptor, Vitronectin (Human), Vitronectin Receptor (Human), Fibronectin/Fibronectin Receptor, Fibronectin (Human), and Fibronectin Receptor (Human).

Exemplary growth factor antibodies to be administered in combination with the compounds and compositions described in the invention include, but not limited to, Human Growth Factor Antibodies, Murine Growth Factor Antibodies, and Porcine Growth Factor Antibodies.

Other exemplary growth factor antibodies to be administered in combination with the compounds and compositions described in the invention include, but not limited to, Baculovirus Antibodies, Cadherin Antibodies, Complement Antibodies, Clq Antibodies, VonWillebrand Factor Antibodies, Cre Antibodies, HIV Antibodies, Influenza Antibodies, Human Leptin. Antibodies, Murine Leptin Antibodies, Murine CTLA-4 Antibodies, Human CTLA-4 Antibodies, P450 Antibodies, and RNA Polymerase Antibodies.

Exemplary neurobiologic antibodies to be administered in combination with the compounds and compositions described in the invention include, but not limited to, Amyloid Antibodies, GFAP Antibodies, Human NGF Antibodies, Human NT-3 Antibodies, and Human NT-4 Antibodies.

Further exemplary antibodies to be administered in combination with the compounds and compositions described in the invention include, but not limited to, antibodies listed in references such as the MSRS Catalog of Primary Antibodies, and Linscott's Directory.

In some preferred embodiments of the invention, the antibodies to be administered in combination with the compounds and compositions described in the invention include, but not limited to, Avastin (bevacizumab), BEC2 (mitumomab), Bexxar (tositumomab), Campath (alemtuzumab), CeaVac, Herceptin (trastuzumab), IMC-C225 (centuximab), LymphoCide (epratuzumab), MDX-210, Mylotarg (gemtuzumab ozogamicin), Panorex (edrecolomab), Rituxan (rituximab), Theragyn (pemtumomab), Zamyl, and Zevalin (ibritumomab tituxetan). The invention also covers antibody fragments thereof.

In some preferred embodiments, the cancer antigen is VEGF, Anti-idiotypic mAb (GD3 ganglioside mimic), CD20, CD52; Anti-idiotypic mAb (CEA mimic), ERBB2, EGFR, CD22, ERBB2×CD65 (fcγRI), EpCam, PEM and CD33.

The antibodies to be administered in combination with the compounds and compositions described in the invention include, but not limited to, monoclonal or polyclonal antibodies, which can be prepared by conventional methodology. They can further be isolated or present in an ascites fluid. Such antibodies can be further manipulated to create chimeric or humanized antibodies as will be discussed in greater detail below.

Significantly, as is well-known in the art, only a small portion of an antibody molecule, the paratope, is involved in the binding of the antibody to its epitope (see, in general, Clark, W. R. (1986) The Experimental Foundations of Modern Immunology Wiley & Sons, Inc., New York; Roitt, I. (1991) Essential Immunology, 7th Ed., Blackwell Scientific Publications, Oxford). The pFc' and Fc regions, for example, are effectors of the complement cascade but are not involved in antigen binding. An antibody from which the pFc', region has been enzymatically cleaved, or which has been produced without the pFc' region, designated an F(ab')$_2$ fragment, retains both of the antigen binding sites of an intact antibody. Similarly, an antibody from which the Fc region has been enzymatically cleaved, or which has been produced without the Fc region, designated an Fab fragment, retains one of the antigen binding sites of an intact antibody molecule. Proceeding further, Fab fragments consist of a covalently bound antibody light chain and a portion of the antibody heavy chain denoted Fd. The Fd fragments are the major determinant of antibody specificity (a single Fd fragment may be associated with up to ten different light chains without altering antibody specificity) and Fd fragments retain epitope-binding ability in isolation.

Included in the invention are complementarity determining regions (CDRs) of antibodies, which directly interact with the epitope of the antigen, and framework regions (FRs), which maintain the tertiary structure of the paratope (see, in general, Clark, 1986; Roitt, 1991).

Also included are non-CDR regions of a mammalian antibody may be replaced with similar regions of co-specific or heterospecific antibodies while retaining the epitopic specificity of the original antibody. Such antibodies, including fragments of intact antibodies with antigen-binding ability, referred to as "chimeric" antibodies.

The present invention also provides for F(ab')$_2$, Fab, Fv and Fd fragments; chimeric antibodies in which the Fc and/or FR and/or CDR1 and/or CDR2 and/or light chain CDR3 regions have been replaced by homologous human or non-human sequences; chimeric F(ab')$_2$ fragment antibodies in which the FR and/or CDR1 and/or CDR2 and/or light chain CDR3 regions have been replaced by homologous human or non-human sequences; chimeric Fab fragment antibodies in which the FR and/or CDR1 and/or CDR2 and/or light chain CDR3 regions have been replaced by homologous human or non-human sequences; and chimeric Fd fragment antibodies in which the FR and/or CDR1 and/or CDR2 regions have been replaced by homologous human or non-human sequences. The present invention also includes so-called single chain antibodies.

The compounds and compositions described herein are administered in therapeutically effective and physiologically acceptable amounts, which are the amounts physiologically tolerable to the subject necessary or sufficient to realize the desired beneficial biologic effect, in this case the treatment of cancer or the inhibition of angiogenesis. A biologically beneficial effect can, for example, be measured by determining the physiological effects of the treatment following administration of the treatment. The biologically beneficial effect may be the amelioration and or absolute elimination of symptoms resulting from the disorder being treated, or the inhibition of angiogenesis in the disorder being treated as evidenced, for example, by a reduction in the number of microvessels (e.g., abnormal microvessels) on imaging.

The therapeutically effective and physiologically acceptable amount may vary depending upon the particular compound(s) or combinations of compounds, composition(s) or combinations of compositions, and/or therapies used. It can also vary depending on such factors as the condition (e.g. cancer) being treated, the size of the subject, or the severity of the disease or condition. One of ordinary skill in the art can empirically determine the effective amount of a particular septin targeting compounds compound or combination without necessitating undue experimentation. Combined with the teachings provided herein, by choosing among the various compounds and weighing factors such as potency, relative bioavailability, patient body weight, severity of adverse side-effects and preferred mode of administration, an effective prophylactic or therapeutic treatment regimen can be planned which does not cause substantial toxicity and yet is entirely effective to treat the particular subject.

In some instances, a sub-therapeutic dosage of either the compounds or compositions described herein or the second agent, or a sub-therapeutic dosage of both, is used to treat the subject. For example, when a compound or a composition described herein is used together with an anti-cancer agent, the compound or composition and the anti-cancer agent are administered in sub-therapeutic doses and still produce a desirable therapeutic effect. A "sub-therapeutic dose" as used herein refers to a dosage which is less than that dosage which would produce a therapeutic result in the subject if administered in the absence of the other agent. Thus, the sub-therapeutic dose of an anti-cancer agent is one which would not produce the same or a substantially similar therapeutic result in the subject in the absence of the administration of the compound or composition described herein. Therapeutic doses of anti-cancer agents are known in the field of medicine. These doses have been extensively described in references such as Remington's Pharmaceutical Sciences, 18th ed., 1990, as well as many other medical references relied upon by the medical profession as guidance for the treatment of cancer and are well known in the art.

For compounds and compositions described herein a therapeutically effective amount is initially determined from in vitro assays such as cell culture assays. Therapeutically effective amounts can also be determined in animal studies. For instance, the effective amount of a compound or composition described herein with or without a second agent is assessed using in vivo assays of, for example, tumor regression and/or prevention of tumor formation. Relevant animal models include, for example, assays in which malignant cells are injected into the animal subjects, usually in a defined site. Generally, a range of septin targeting compound doses are administered into the animal. Inhibition of the growth of a tumor following the injection of the malignant cells is indicative of the ability to reduce the risk of developing a cancer. Inhibition of further growth (or reduction in size) of a pre-existing tumor is indicative of the ability to treat the cancer.

The applied dose of both agents can be adjusted based on the relative bioavailability and potency of the administered compound(s). Adjusting the dose to achieve maximal efficacy based on the methods described above and other methods are well within the capabilities of the ordinarily skilled artisan.

Preferred subject doses of the compounds and compositions described herein typically range from about 0.1 µg to 30,000 mg, more typically from about 1 µg/day to 20,000 mg, even more typically from about 10 µg to 15,000 mg, and most typically from about 100 µg to 10,000 µg. Stated in terms of subject body weight, typical dosages range from about 0.1 µg to 200 mg/kg/day, more typically from about 0.5 to 150 mg/kg/day. In some important embodiments, the compound is administered in amounts from about 1 to 100 mg/kg/day. In some other important embodiments, the compound is administered in an amount of 10-60 mg/kg/day.

A "routine schedule" as used herein, refers to a predetermined designated period of time selected to deliver the compounds or compositions described in the invention. The routine schedule encompasses periods of time which are identical or which differ in length, as long as the schedule is predetermined. For instance, the routine schedule may involve 2, 3, 4, or 6 administrations per day, administration on a daily basis, every two days, every three days, every four days, every five days, every six days, a weekly basis, a monthly basis or any set number of days or weeks therebetween, every two months, three months, four months, five months, six months, seven months, eight months, nine months, ten months, eleven months, twelve months, etc.

Alternatively, the predetermined routine schedule may involve administration on a daily basis for the first week, followed by a monthly basis for several months, and then every three months after that. Any particular combination would be covered by the routine schedule as long as it is determined ahead of time that the appropriate schedule involves administration on a certain day.

The compounds or compositions of the invention are administered in pharmaceutically acceptable carriers, or in the context of a vector or delivery system. An example of a chemical/physical vector of the invention is a colloidal dispersion system. Colloidal dispersion systems include lipid-based systems including oil-in-water emulsions, micelles, mixed micelles, and liposomes. A preferred colloidal system of the invention is a liposome. Liposomes are artificial membrane vessels which are useful as a delivery vector in vivo or in vitro. It has been shown that large unilamellar vessels (LUV), which range in size from 0.2-4.0 µm can encapsulate large macromolecules. RNA, DNA and intact virions can be encapsulated within the aqueous interior and be delivered to cells in a biologically active form (Fraley, et al., *Trends Biochem. Sci.*, (1981) 6:77).

Liposomes can be employed to deliver the compounds embodying this invention. Liposomes can be targeted to a particular tissue by coupling the liposome to a specific ligand such as a sugar, glycolipid, or protein. Ligands which may be useful for targeting a liposome to a cell include, but are not limited to intact or fragments of molecules which interact with cell specific receptors and molecules, such as antibodies, which interact with the cell surface markers of cells. Such ligands may easily be identified by binding assays well known to those of skill in the art. In still other embodiments, the liposome may be targeted to the cancer by coupling it, for example, to one of the immunotherapeutic antibodies discussed earlier. Additionally, the vector may be coupled to a nuclear targeting peptide, which will direct the vector to the nucleus of the host cell.

Liposomes employed to deliver the compounds or compositions described herein are commercially available from Gibco BRL, for example, as LIPOFECTIN™ and LIPOFECTACE™, which are formed of cationic lipids such as N-[1-(2,3 dioleyloxy)-propyl]-N,N,N-trimethylammonium chloride (DOTMA) and dimethyl dioctadecylammonium bromide (DDAB). Methods for making liposomes are well known in the art and have been described in many publications. Liposomes also have been reviewed by Gregoriadis, G. in *Trends in Biotechnology*, (1985) 3:235-241.

In other embodiments, the chemical/physical vector employed to deliver the compounds embodying this invention include a biocompatible microsphere that is suitable for delivery, such as oral or mucosal delivery. Such microspheres are disclosed in Chickering et al., *Biotech. And Bioeng.*, (1996) 52:96-101 and Mathiowitz et al., *Nature*, (1997) 386:410-414 and PCT Patent Application WO97/03702.

Both non-biodegradable and biodegradable polymeric matrices that can be used to deliver the compounds or compositions described in the invention include biodegradable matrices. Such polymers may be natural or synthetic polymers. The polymer is selected based on the period of time over which release is desired, generally in the order of a few hours to a year or longer. Typically, release over a period ranging from between a few hours and three to twelve months is most desirable. The polymer optionally is in the form of a hydrogel that can absorb up to about 90% of its weight in water and further, optionally is cross-linked with multi-valent ions or other polymers.

The polymeric matrix considered to be employed for the formulation of the agents described herein is preferably in the form of a microparticle such as a microsphere (wherein the agents are dispersed throughout a solid polymeric matrix) or a microcapsule (wherein the agents are stored in the core of a polymeric shell). Other forms of the polymeric matrix for containing the agents that can be utilized to deliver the compounds embodying this invention include films, coatings, gels, implants, and stents. The size and composition of the polymeric matrix device is selected to result in favorable release kinetics in the tissue into which the matrix is introduced. The size of the polymeric matrix further is selected according to the method of delivery which is to be used, typically injection into a tissue or administration of a suspension by aerosol into the nasal and/or pulmonary areas. Preferably when an aerosol route is used the polymeric matrix and the septin targeting compounds compound are encompassed in a surfactant vehicle. The polymeric matrix composition can be selected to have both favorable degradation rates and also to be formed of a material which is bioadhesive, to further increase the effectiveness of transfer when the matrix is administered to a nasal and/or pulmonary surface that has sustained an injury. The matrix composition also can be selected not to degrade, but rather, to release by diffusion over an extended period of time. In some preferred embodiments, the compounds or compositions described herein is administered to the subject via an implant.

Bioadhesive polymers of particular interest include bio-erodible hydrogels (such as those described by H. S. Sawhney, C. P. Pathak and J. A. Hubell in *Macromolecules*, (1993) 26:581-587), polyhyaluronic acids, casein, gelatin, glutin, polyanhydrides, polyacrylic acid, alginate, chitosan, poly (methyl methacrylates), poly(ethyl methacrylates), poly (butylmethacrylate), poly(isobutyl methacrylate), poly(hexylmethacrylate), poly(isodecyl methacrylate), poly(laurel methacrylate), poly(phenyl methacrylate), poly(methyl acrylate), poly(isopropyl acrylate), poly(isobutyl acrylate), and poly(octadecyl acrylate).

The compositions and methods of the invention are useful for replacing existing surgical procedures or drug therapies, although in some instances the present invention is useful in improving the efficacy of existing therapies for treating such conditions. Accordingly combination therapy may be used to treat the subjects that are undergoing or that will undergo a treatment for cancer. For example, the agents may be administered to a subject in combination with another antiproliferative (e.g., an anti-cancer) therapy. Suitable anticancer therapies include surgical procedures to remove the tumor mass, chemotherapy or localized radiation. The other anti-proliferative therapy may be administered before, concurrent with, or after treatment with the agent of the invention. There may also be a delay of several hours, days and in some instances weeks between the administrations of the different treatments, such that the agent may be administered before or after the other treatment. In some embodiments, the compounds or compositions described herein are administered with or without the other anti-proliferative treatment (e.g., prior to surgery, radiation or chemotherapy), although the timing is not so limited.

The compounds or compositions described herein can also be administered in combination with non-surgical, anti-proliferative (e.g., anti-cancer) drug therapy. In some embodiments, the agent may be administered in combination with an anti-cancer agent such as a cytostatic compound. A cytostatic compound is a compound (e.g., a nucleic acid, a protein) that suppresses cell growth and/or proliferation. In some embodiments, the cytostatic compound is directed towards the malignant cells of a tumor. In yet other embodiments, the cytostatic compound is one which inhibits the growth and/or proliferation of vascular smooth muscle cells or fibroblasts.

According to the methods of the invention, the compounds or compositions described herein are administered prior to, concurrent with, or following other anti-cancer agent(s). The administration schedule involves administering the different agents in an alternating fashion. In other embodiments, the combination therapy of the invention is delivered before and during, or during and after, or before and after treatment with other therapies. In some cases, the agent is administered more than 24 hours before the administration of the other anti-proliferative treatment. In other embodiments, more than one anti-proliferative therapy are administered to a subject. For example, the subject receives the agents of the invention, in combination with both surgery and at least one other anti-proliferative compound. Alternatively, the agent is administered in combination with more than one anti-cancer agent.

The compounds or compositions described herein can be combined with other therapeutic agents such as adjuvants to enhance immune responses. The compounds or compositions described herein and other therapeutic agent(s) may be administered simultaneously or sequentially. When the other therapeutic agents are administered simultaneously they can be administered in the same or separate formulations, but are administered at the same time. The administration of the other therapeutic agents and the compounds or compositions described herein can also be temporally separated, meaning that the therapeutic agents are administered at a different time, either before or after, the administration of the compounds or compositions described herein. The separation in time between the administration of these compounds and agents can be a matter of minutes or any time longer. Other therapeutic agents include but are not limited to nucleic acid adjuvants, non-nucleic acid adjuvants, cytokines, non-immunotherapeutic antibodies, antigens, etc.

A nucleic acid adjuvant is an adjuvant that is a nucleic acid. Examples include immunostimulatory nucleic acid molecules such as those containing CpG dinucleotides, as described in U.S. Pat. No. 6,194,388 B1, issued Feb. 27, 2001, U.S. Pat. No. 6,207,646 B1, issued Mar. 27, 2001, and U.S. Pat. No. 6,239,116 B1, issued May 29, 2001.

A "non-nucleic acid adjuvant" is any molecule or compound except for the immunostimulatory nucleic acids described herein which can stimulate the humoral and/or cellular immune response. Non-nucleic acid adjuvants include, for instance, adjuvants that create a depo effect, immune-stimulating adjuvants, adjuvants that create a depo effect and stimulate the immune system and mucosal adjuvants.

An "adjuvant that creates a depo effect" as used herein is an adjuvant that causes an antigen, such as a cancer antigen present in a cancer vaccine, to be slowly released in the body, thus prolonging the exposure of immune cells to the antigen. This class of adjuvants includes but is not limited to alum (e.g., aluminum hydroxide, aluminum phosphate); or emulsion-based formulations including mineral oil, non-mineral oil, water-in-oil or oil-in-water-in oil emulsion, oil-in-water emulsions such as Seppic ISA series of Montanide adjuvants (e.g., Montanide ISA 720, AirLiquide, Paris, France); MF-59 (a squalene-in-water emulsion stabilized with Span 85 and Tween 80; Chiron Corporation, Emeryville, Calif.; and PROVAX (an oil-in-water emulsion containing a stabilizing detergent and a micelle-forming agent; DEC Pharmaceuticals Corporation, San Diego, Calif.).

An "immune stimulating adjuvant" is an adjuvant that causes activation of a cell of the immune system. It may, for instance, cause an immune cell to produce and secrete cytokines. This class of adjuvants includes but is not limited to saponins purified from the bark of the $Q.$ $saponaria$ tree, such as QS21 (a glycolipid that elutes in the $21^{st}$ peak with HPLC fractionation; Antigenics, Inc., Waltham, Mass.); poly[di (carboxylatophenoxy)phosphazene (PCPP polymer; Virus Research Institute, USA); derivatives of lipopolysaccharides such as monophosphoryl lipid A (MPL; Ribi ImmunoChem Research, Inc., Hamilton, Mont.), muramyl dipeptide (MDP; Ribi) and threonyl-muramyl dipeptide (t-MDP; Ribi); OM-174 (a glucosamine disaccharide related to lipid A; OM Pharma SA, Meyrin, Switzerland); and $Leishmania$ elongation factor (a purified $Leishmania$ protein; Corixa Corporation, Seattle, Wash.).

"Adjuvants that create a depo effect and stimulate, the immune system" are those compounds which have both of the above-identified functions. This class of adjuvants includes but is not limited to ISCOMS (Immunostimulating complexes which contain mixed saponins, lipids and form virus-sized particles with pores that can hold antigen; CSL, Melbourne, Australia); SB-AS2 (SmithKline Beecham adjuvant system #2 which is an oil-in-water emulsion containing MPL and QS21: SmithKline Beecham Biologicals [SBB], Rixensart, Belgium); SB-AS4 (SmithKline Beecham adjuvant system #4 which contains alum and MPL; SBB, Belgium); non-ionic block copolymers that form micelles such as CRL 1005 (these contain a linear chain of hydrophobic polyoxpropylene flanked by chains of polyoxyethylene; Vaxcel, Inc., Norcross, Ga.); and Syntex Adjuvant Formulation (SAF, an oil-in-water emulsion containing Tween 80 and a nonionic block copolymer; Syntex Chemicals, Inc., Boulder, Colo.).

EXPERIMENTAL EXAMPLES

Example 1. Representative Synthesis of Disclosed Compound UR214-9

The compound UR214-9 was synthesized using the following general procedure:

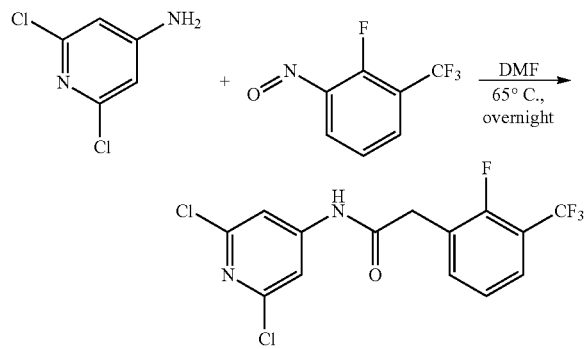

To a solution of amine (0.01-0.1 mol) in dry DMF was added a solution of isocyanate (0.01-0.1 mol) drop-wise, and the reaction mixture was subsequently heated and stirred overnight at 65° C. The reaction mixture was cooled to room temperature, and DMF was removed under reduced pressure. A portion of the resulting reaction mixture was purified using preparative thin layer chromatography using hexane:ethyl acetate or DCM:MeOH as eluent. The desired band was scraped, and the compound was stripped off from silica gel using MeOH:DCM (90:10). The solvent was evaporated under reduced pressure, and the desired compound was collected as a powder.

The other compounds of the present application such as those disclosed or exemplified in the present application (e.g., compounds of Formula (I)-(IV)) are also prepared following the same synthetic routes.

Figure 13:
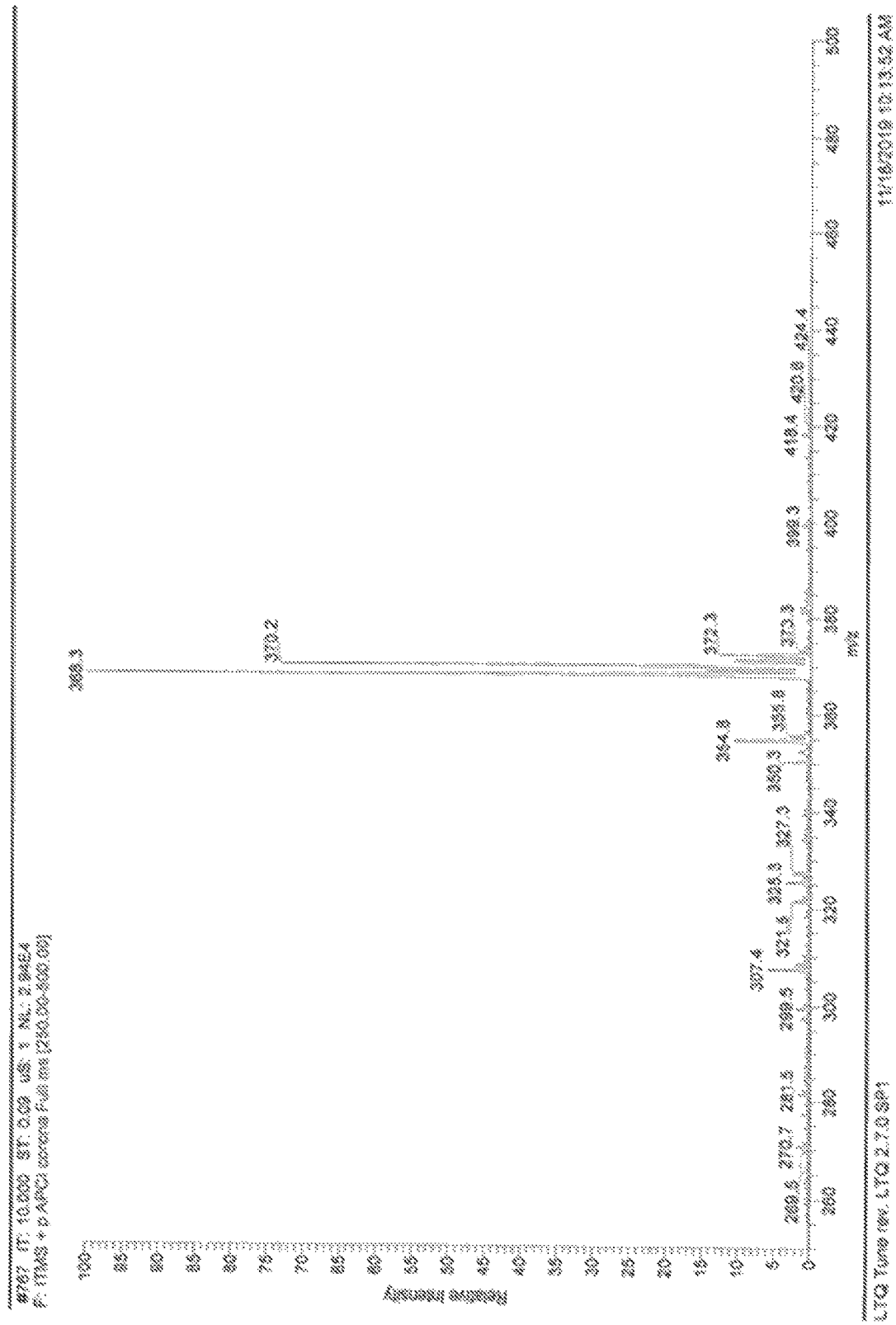
FIG. 13 provides a mass spectrum of compound UR214-9 as described herein.

A representative mass spectrum of UR214-9 obtained by the process is provided in FIG. 13.

Example 2. Development of Potent Septin Inhibitors and their Cytotoxic Effect in Cancer Cell Lines Introduction Malignancy of the ovary and uterus is relatively common and unfortunately quite lethal. The fourth most common cancer in women, uterine cancer represents approximately 60,000 new cancer diagnoses and 10,000 cancer deaths per year in the US (see Siegel, R. L., Miller, K. D. & Jemal, A. Cancer Statistics, 2017. *CA Cancer J. Clin.* 67, 7-30, 2017). While less common, ovarian cancer is more fatal yet, with a 5-year survival of 46.6% (www.cdc.gov/cancer/dataviz, June 2019). Current treatment of these diseases relies on a combination of surgical and medical management. While evolving, the foundation of first-line medical treatment for both is a combination of platinum-based and taxane drugs and has been so for over a decade.

Diaryl urea derivatives have been of great interest in medicinal chemistry and the small molecules containing a broad spectrum of biological activities including anti-inflammatory, antithrombic and antimicrobial effects (see Garuti, L., Roberti, M., Bottegoni, G. & Ferraro, M. Diaryl Urea: A Privileged Structure in Anticancer Agents. *Curr. Med. Chem.* 23, 1528-1548, 2016). Additionally, diaryl urea derivatives such as sorafenib and regorafenib are used clinically for cancer treatment (see Sadeghian-Rizi, S. et al. Synthesis and characterization of some novel diaryl urea derivatives bearing quinoxalindione moiety. *Res. Pharm. Sci.* 13, 82-92, 2018). Forchlorofenuron (FCF; N-(2-chloro-4-pyridyl)-N'-phenylurea) is a small synthetic urea derivative that is currently utilized in agriculture. FCF shows potent cytokinin activity and has been used worldwide as a plant fertilizer that increases fruit size. Interestingly, FCF has been shown to inhibit proliferation, anchorage independent growth, migration and invasion of cancer cell lines (see Blum, W. et al. The phytohormone forchlorfenuron decreases viability and proliferation of malignant mesothelioma cells in vitro and in vivo. *Oncotarget* 10, 6944-6956, 2019; Zhang, N. et al. The requirement of SEPT2 and SEPT7 for migration and invasion in human breast cancer via MEK/ERK activation. *Oncotarget* 7, 61587-61600, 2016; and Vardi-Oknin, D., Golan, M. & Mabjeesh, N. J. Forchlorfenuron disrupts SEPT9_i1 filaments and inhibits HIF-1. *Plos One* 8, e73179, 2013). The effect of FCF has been demonstrated in various cancer types, including prostate, mesothelioma, lung, colon, breast, ovary and cervix. FCF was also found to be effective in a mouse model, in which tumor growth was inhibited. At a molecular level, FCF treatment causes the suppression of HIF-1α and HER2, both of which are known to be associated with more malignant cancer phenotypes (see Marcus, E. A. et al. Septin oligomerization regulates persistent expression of ErbB2/HER2 in gastric cancer cells. *Biochem. J.* 473, 1703-1718, 2016).

In this example, a focused, structure-activity relationship study was conducted to optimize the chemical structure of FCF, with the goal of developing potent Septin inhibitors that could be tested for cytotoxic activity against a panel of gynecologic cancer cell lines. It was also explored whether FCF or derived inhibitors contribute to human epididymis protein 4 (HE4) secretion, which has been linked to the progression of ovarian cancer as well as poor patient outcomes, including advanced disease and decreased survival (see James, N. E., Chichester, C. & Ribeiro, J. R. Beyond the Biomarker: Understanding the Diverse Roles of Human Epididymis Protein 4 in the Pathogenesis of Epithelial Ovarian Cancer. *Front. Oncol.* 8, 124, 2018). The role of the disclosed inhibitors on cancer cell growth factor receptor expression was also explored.

Methods

Cell lines, Culture, and Reagents. Cells were maintained in either DMEM (SKOV-3, KLE, OVCAR-3, OVCAR8-C5 and IGROV-1) or RPMI-1640 (ECC-1 and HCH-1), supplemented with 10% fetal calf serum (or 20% for OVCAR-3), penicillin (100 units/mL), and streptomycin (100 μg/mL) at 37° C. with 5% $CO_2$ in a humidified incubator. Antibodies were purchased from Abcam (septin-2; ab179436) and Cell Signaling Technology; ERK (9102), p-ERK (4370), -actin (3700), u-Tubulin (2144), EGFR (4267) and HER2 (4290). FCF was purchased from Abcam. All other chemicals were from Sigma Aldrich.

Synthesis of Derivatives. Derivatives of FCF were synthesized by coupling variously substituted aryl isocyanates with differentially substituted 4-aminopyridines in (0.1:0.1) molar ratio in dry DMF at 65° C. overnight. The reaction was monitored using thin-layer chromatography plates with DCM-MeOH or pure ethyl acetate as eluent. Spots were monitored in a UV chamber. The reaction mixture, upon completion of the reaction, was poured into wet ice mixture and triturated, then the separated solid was filtered by vacuum. The product was washed with hexane, followed by diethyl ether, and was dried under vacuum. The compounds were characterized by spectrophotometric techniques.

Quantitative Real-Time PCR. The indicated cell lines were transfected with siRNA targeting septin-2 or non-targeting control siRNA (Santa Cruz Biotechnology: sc-37007 or sc-40936) using Lipofectamine 3000 (Invitrogen). Tri reagent and Direct-zol kit (Zymo Research) were used to lyse and isolate total RNA. Reverse transcription was performed using iScript cDNA synthesis kit (BioRad), both following the manufacturer's recommendations. Quantitative real-time PCR was conducted using QuantStudio 12 K Flex Real-Time PCR System (ABI) and the Taqman Gene Expression Assay (ABI) consisting of the FAM-labeled probes as follows: SEPT2 (Hs01565417_m1); WFDC2 (Hs00899484_m1); TBP (Hs00427620_m1) or B2M (Hs00187842_m1), which was used as reference for normalization.

Cell Viability, Proliferation and Apoptosis Assay. Cell viability, proliferation, and cellular apoptosis were measured using the MTS (Promega), BrdU cell proliferation (Cell Signaling Technology), and Caspase-Glo 3/7 apoptosis detection (Promega) assays, following the respective manufacturer's recommendations with suitable modification.

Enzyme-Linked Immunosorbent Assay (ELISA) and Immunoblotting. Cells were maintained overnight in the culture media described above. The medium was removed and replaced with fresh complete medium containing either vehicle (DMSO) or FCF/disclosed inhibitors in the indicated conditions. Following the treatment, cell lysates and supernatants were collected and subjected to HE4 assay (Human HE4 Quantikine ELISA Kit, R&D Systems). The amount of HE4 in supernatant was normalized to the protein concentration of matching cell lysate. The levels of HER2 were determined by Human Total ErbB2/Her2 DuoSet IC ELISA (R&D systems. Wester blot analysis was conducted using the protocol previously published (see Kim, K. K. et al. Tetrathiomolybdate inhibits mitochondrial complex IV and mediates degradation of hypoxia-inducible factor-1alpha in cancer cells. *Sci. Rep.* 5, 14296, 2015).

Data Acquisition and Statistical Analysis. Gene expression profiling of septins, comparing microdissected normal ovarian stroma (N=8) against that of tumor stroma samples (N=31) from high grade serous ovarian cancer patients, was obtained from Mixed Ovarian Cancer (CAFs)-Wong-77-u133p2 data-set through 'R2: Genomics Analysis and Visualization Platform (http://r2/am/n1). Mean values with SD were plotted and compared using Student t-test (two tail, unpaired heteroscedastic t-test, significant difference when $p<0.01$). The prognostic assessment of septin-2 amongst different cancers or septins in endometrial cancer was conducted using TCGA data acquired through Human Protein Atlas (http://www.proteinatlas.org) (see Uhlen, M. et al. Towards a knowledge-based Human Protein Atlas. *Nat. Biotechnol.* 28, 1248-1250, 2010). Survival curves between septin high and low population and their statistical significance were analyzed using GraphPad Prism software (Mantel-Cox test).

Results

Treatment of FCF Reduced the Viability of Endometrial and Ovarian Cancer Cell Lines. The effect of FCF on cellular viability was first tested in a panel of gynecologic cancer cell lines employing endometrial (ECC-1 and KLE) and ovarian (HCH-1, OVCAR-3, and SKOV-3) cancer cell lines. FCF treatment reduced the viability of these cells in a time- and dose-dependent manner (FIG. 1). Although FCF exhibited noticeable cytotoxic activity against a panel of cell lines, such an inhibition was only achieved at relatively high concentrations (at or above 100 μM).

Figure 2A:
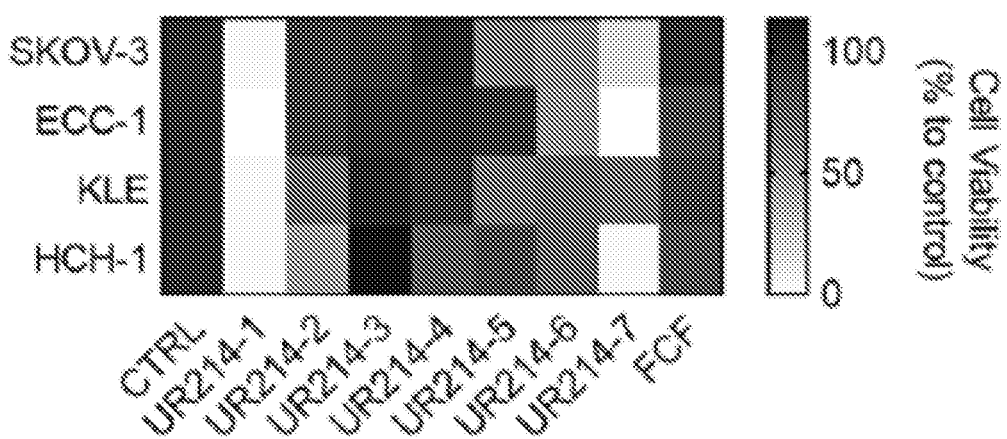
FIGS. 2A-2E show the effect of the compounds described herein on the viability of ovarian and endometrial cancer cell lines.

Structural Modification of FCF. A systematic structural modification of the FCF scaffold was conducted with the intent of generating a highly potent derivative (Table 1). The substituents on the phenyl moiety were varied initially, keeping the 2-cholopyridine constant (except for UR214-5 and UR214-6). The substituents were varied to read the effect of modification on the anti-proliferative activity of the molecules. As described in FIG. 2A, substitutions such a benzyloxy (UR214-2), pyrimidinyl (UR214-4) and pyrrolyl (UR214-3) were not tolerated. However, CF3S substitution (UR214-1) on the phenyl ring of FCF generated very potent cytotoxic activity. The importance of 2-choloropyridine was demonstrated by replacing 2-choloropyridine with 2-chloropyrimidine while retaining the CF3S-Ph moiety (UR214-6); this alteration resulted in lack of activity. UR214-1 emerged as the most potent molecule against cancer cells, followed by UR214-7 (FIG. 2A). UR214-1 was not further altered, but UR214-7 was chosen for further optimization in an effort to enhance efficacy.

TABLE 1

Structure of FCF and Synthesized Derivatives

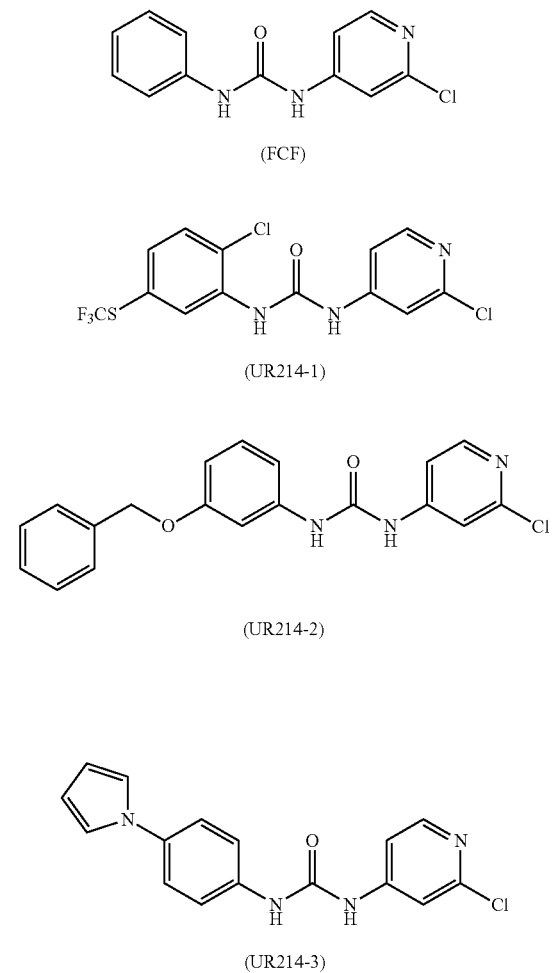

TABLE 1-continued

Structure of FCF and Synthesized Derivatives

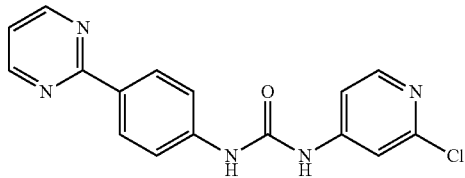

(UR214-4)

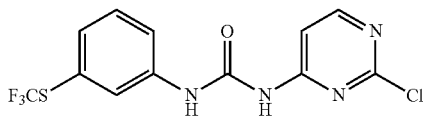

(UR214-5)

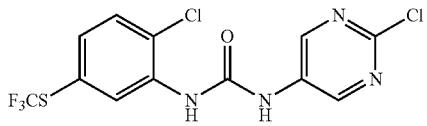

(UR214-6)

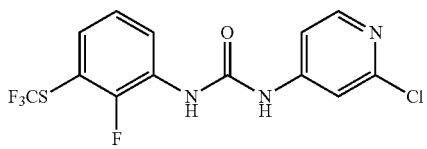

(UR214-7)

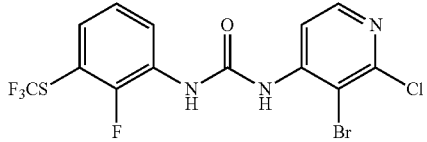

(UR214-8)

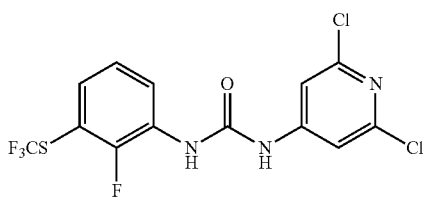

(UR214-9)

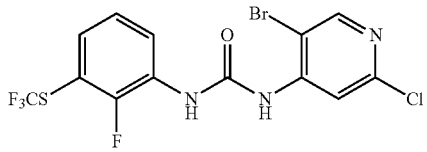

(UR214-10)

TABLE 1-continued

Structure of FCF and Synthesized Derivatives

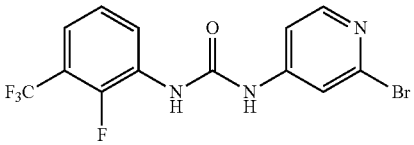

(UR214-11)

Figure 2B:
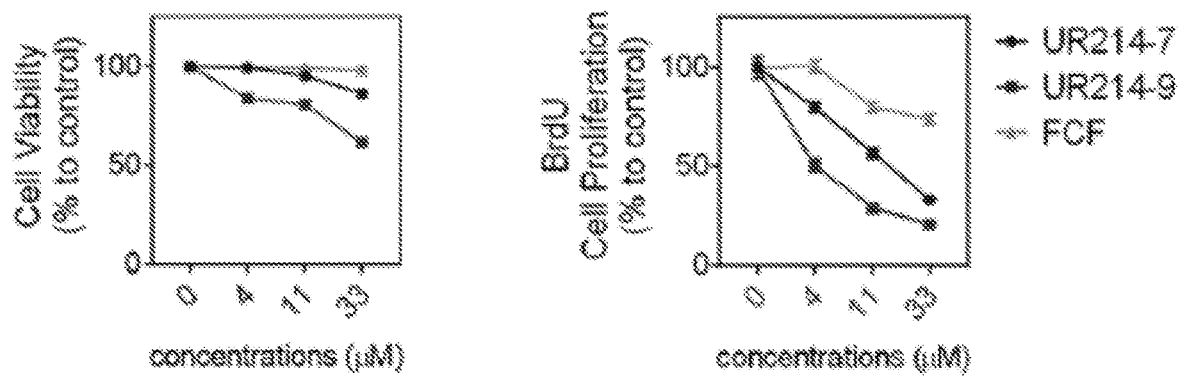
Figure 2C:
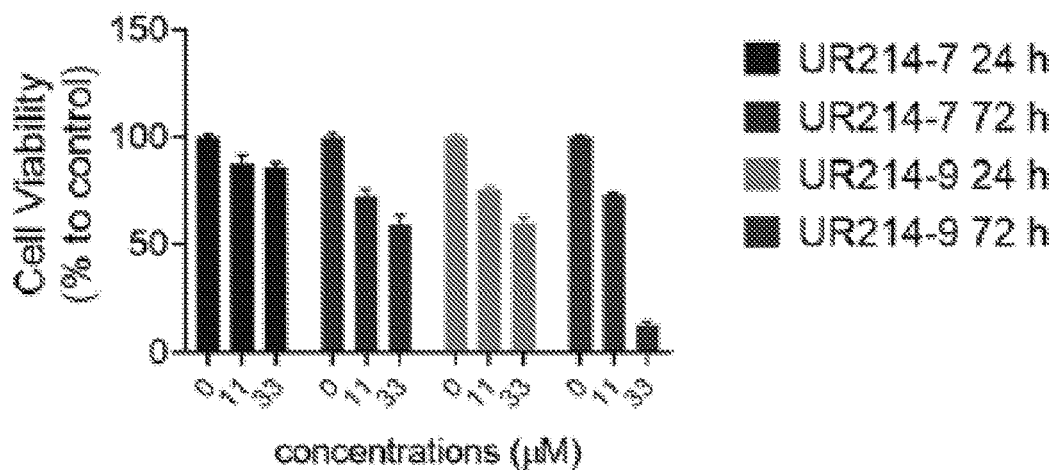
Figure 2D:
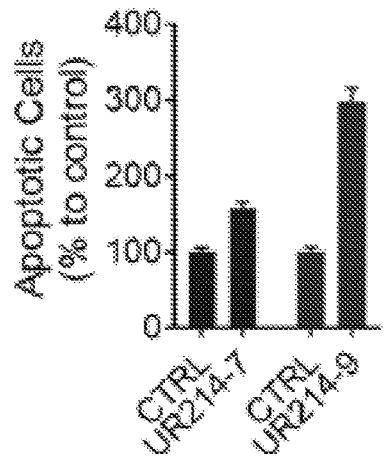
Figure 2E:
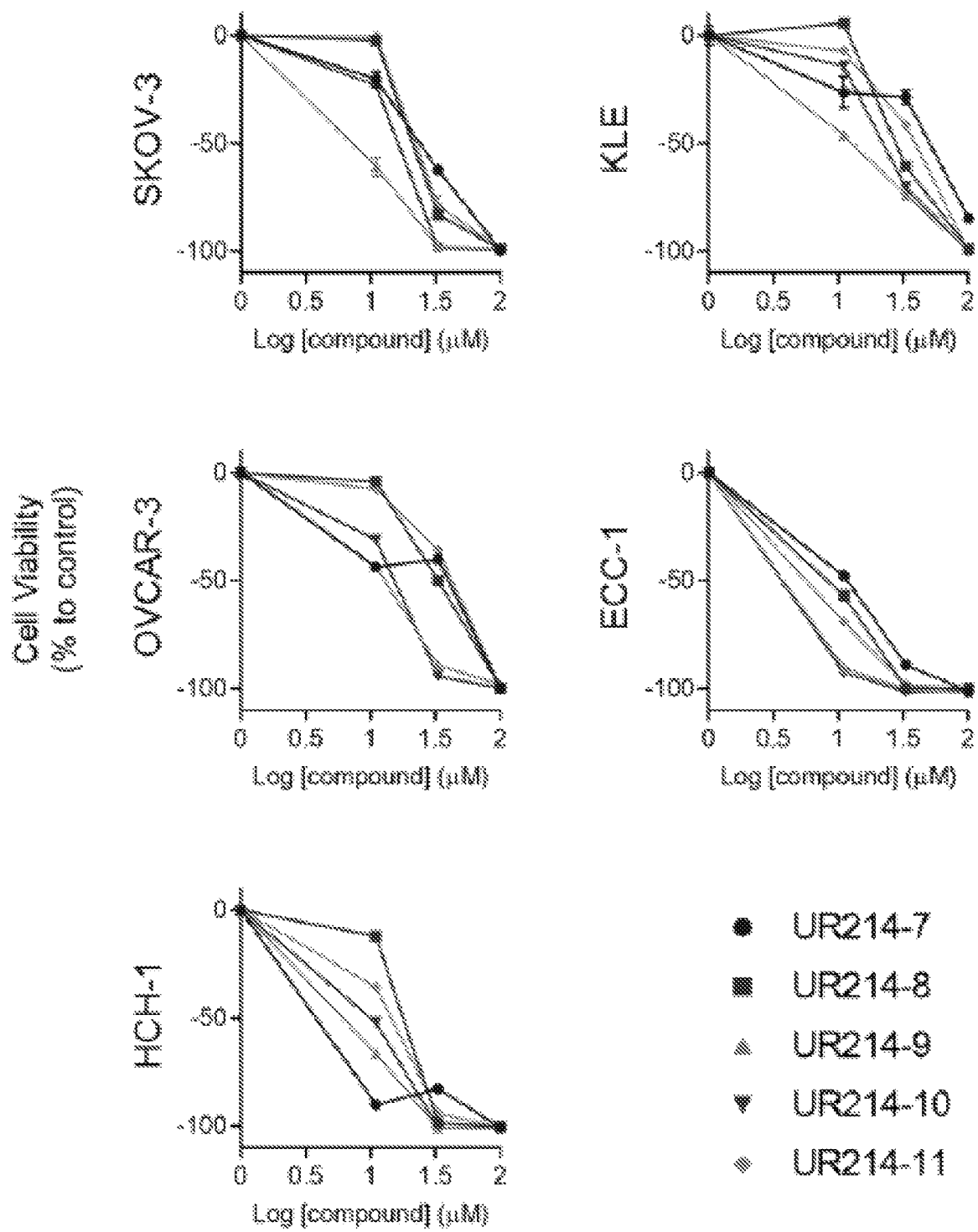

Effects of Synthesized Derivatives on Cell Viability and Proliferation. UR214-7's structure was elaborated further to develop molecules UR214-8 through UR214-11. The dose-dependent effects of these compounds (UR214-7 to -11) on the viability of tumor cells was tested using MTS assay (FIG. 2E). Treatment with compounds UR214-7 to -11 exerted potent anti-viability effects against ovarian (SKOV-3, OVCAR-3, and HCH-1) and endometrial (ECC-1 and KLE) cancer cells. To produce the most active compound of the series (UR214-9), a chloride was installed at the 6th carbon of pyridine. UR214-9 showed potent activity across most cell lines, except for HCH-1, where UR214-7 had superior efficacy for unclear reasons (FIG. 2E). For the most part, halide substituents on the pyridine were well tolerated. Surprisingly, the replacement of 2-chloro with 2-bromo was tolerated and as such, UR214-11 did not lose activity, keeping the window open for further modifications. Next, a BrdU assay was employed to measure the anti-proliferative activity of UR214-7 and UR214-9 against ECC-1 cells at lower dose ranges. In this assay, FCF was utilized as a positive control. As shown in FIG. 2B, UR214-9 treatment for 48 hours inhibited viability and proliferation around 33 and 4 µM, respectively. UR214-7 did not alter tumor cell viability below 11 µM, but did reduce proliferation (FIG. 2B, right). In both assays, FCF lacked activity. Next, the ability of UR214-7 and UR214-9 to induce apoptosis of ECC-1 cells was analyzed. As shown in FIG. 2D, treatment with both UR214-7 and UR214-9 caused apoptosis, but the latter was much more effective. The effects of UR214-7 and UR214-9 treatment were time- and dose-dependent (FIG. 2C).

Figure 3A:
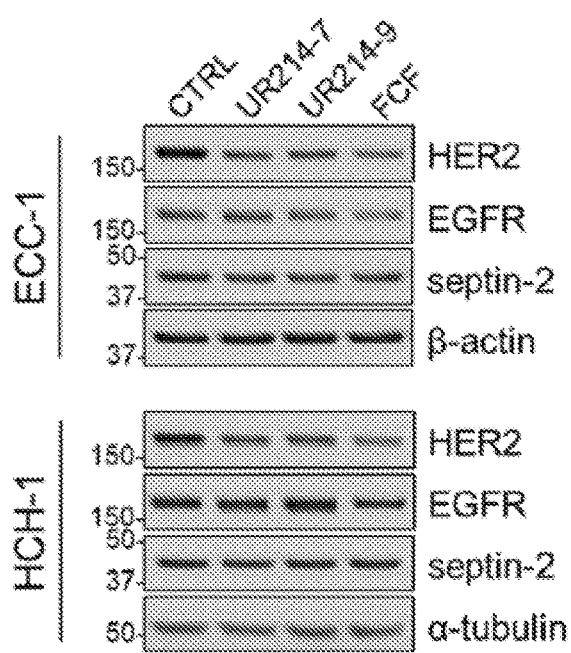
FIGS. 3A-3C show the effect of the disclosed compounds on HER2 expression.
Figure 3B:
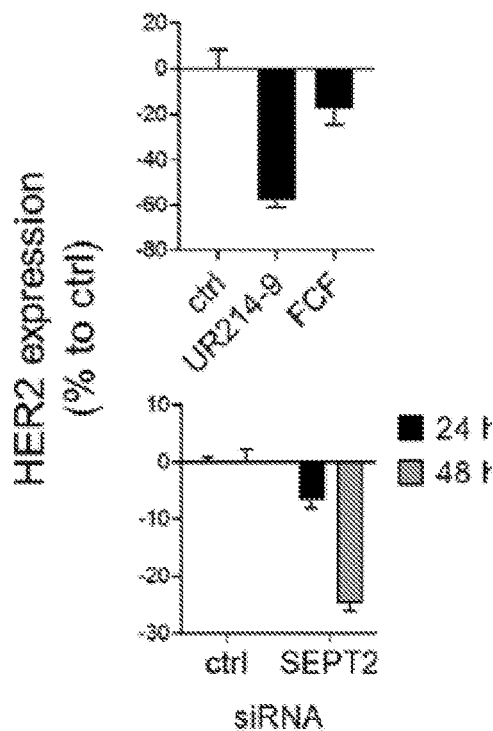
Figure 3C:
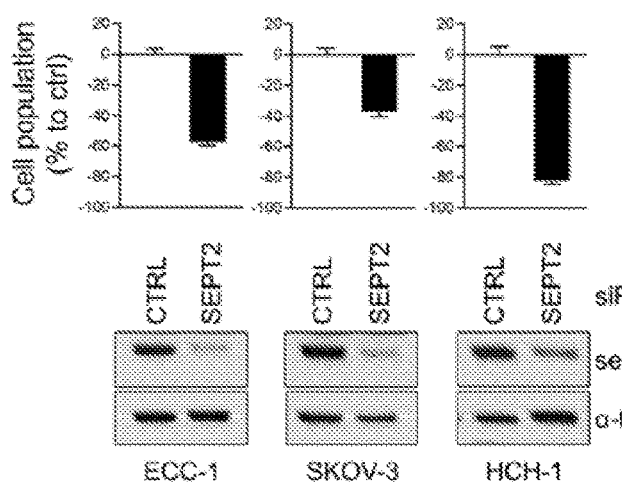

Derivatives Selectively Inhibit HER2 Expression. FCF has been shown to downregulate HER2, the cell membrane-anchored growth factor implicated in the aggressiveness of several cancer types. Therefore, whether the newly generated derivatives impact HER2 expression in cancer cell lines was explored. Treatment with UR214-7 and UR214-9 did not have an effect on EGFR expression. However, treatment with UR214-7 and UR214-9 led to the inhibition of HER2 expression in both ECC-1 and HCH-1 cells, as did FCF at a significantly higher dose (FIG. 3A). Previous study suggests that the effect of FCF on HER2 could be achieved through the disruption of septins and septin-2 knockdown decreased HER2 expression. Thus, septin-2 was knocked down and its effect on HER2 levels determined. Septin-2 knockdown resulted in HER2 downregulation (FIG. 3B). Inhibition of septin-2 also decreased the viability of cancer cell lines (FIG. 3C).

Figure 4A:
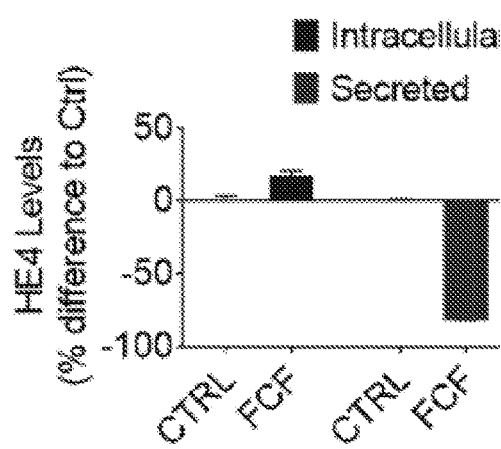
FIGS. 4A-4E show the effect of the disclosed compounds on the expression of HE4.
Figure 4B:
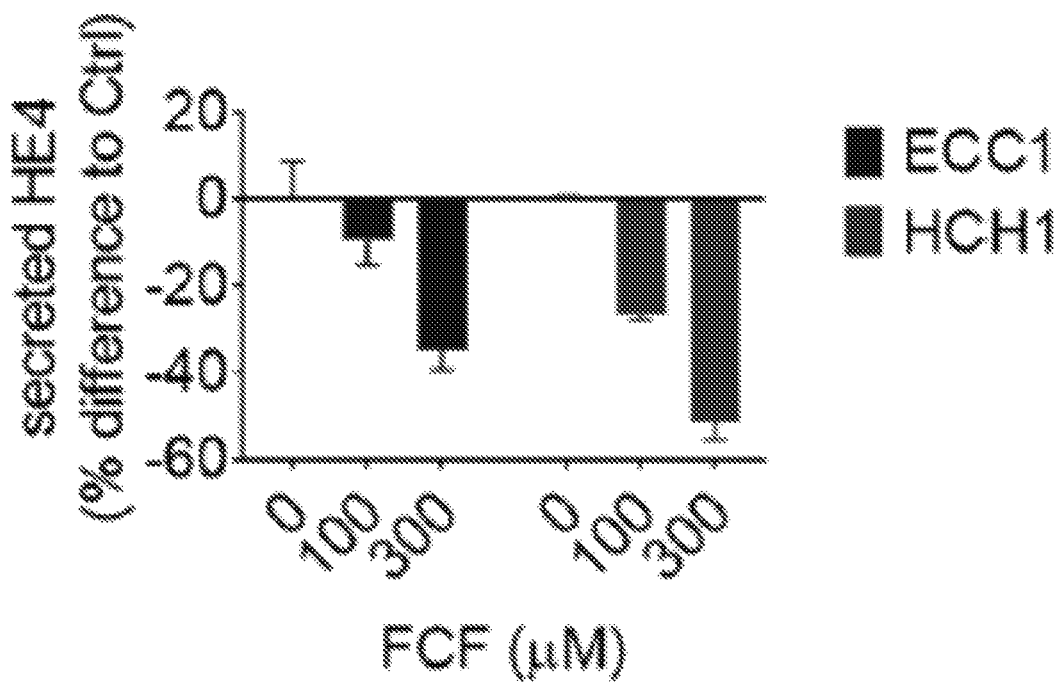
Figure 4C:
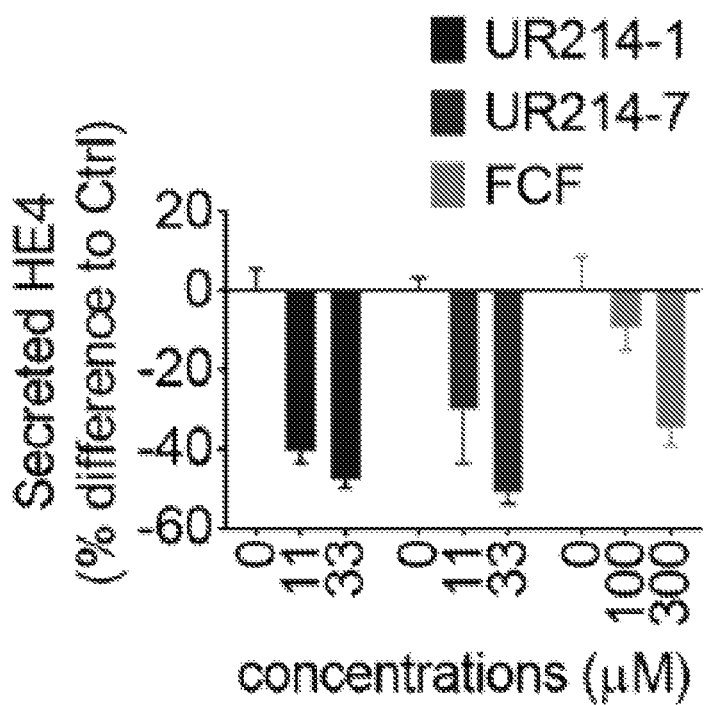
Figure 4D:
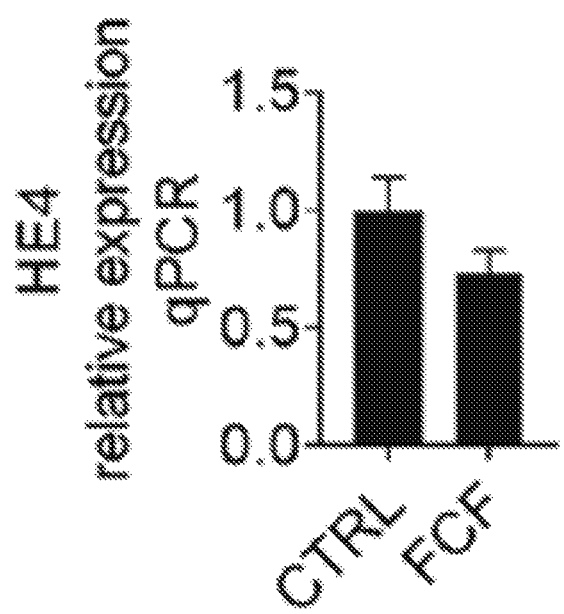
Figure 4E:
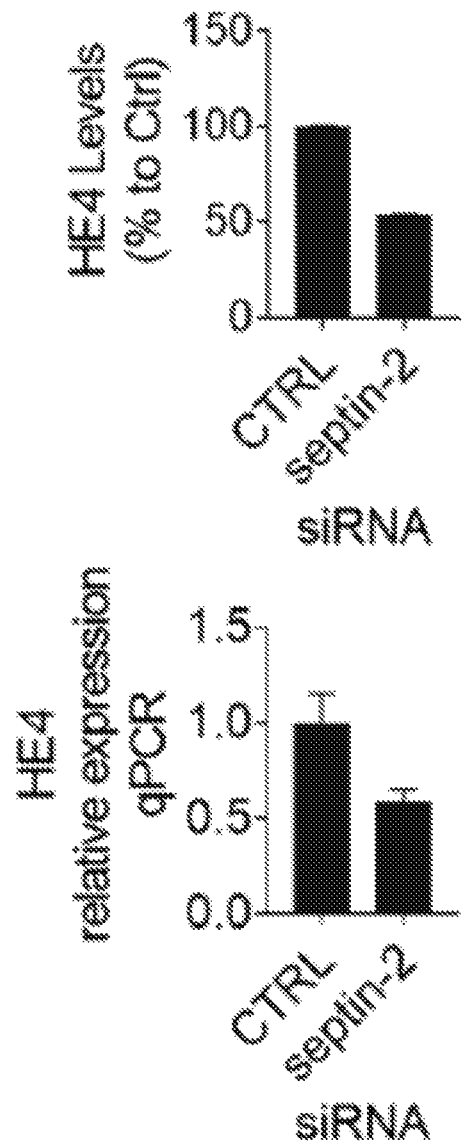

Derivatives Decrease HE4 Secretion. HE4 is a small secretory glycoprotein that is highly upregulated in patients with ovarian and endometrial cancers (see Moore, R. G. et al. The use of multiple novel tumor biomarkers for the detection of ovarian carcinoma in patients with a pelvic mass. *Gynecol. Oncol.* 108, 402-408, 2008; and Moore, R. G. et al. Serum HE4 levels are less frequently elevated than CA125 in women with benign gynecologic disorders. *Am. J. Obstet. Gynecol.* 206, 351 e351-358, 2012) and is associated with malignant phenotypes of cancer. Therefore, whether FCF, or its potent analog, can impact the secretion of HE4 was determined. As shown in FIG. 4A, FCF treatment (300 μM for 7 h) resulted in a decrease in HE4 secretion by OVCAR8-C5 that stably overexpresses HE4, along with a marginal increase in intracellular levels of HE4. This effect was found to be dose-dependent in both ECC-1 and HCH-1 cells (FIG. 4B). Compared to FCF, similar inhibition of HE4 secretion was achieved by UR214-1 and UR214-7 at much lower concentrations (<10- to 27-fold; FIG. 4C). FCF treatment was found to suppress HE4 mRNA to some extent (FIG. 4D). Septin-2 disruption by small interfering RNA also resulted in reduction of HE4 expression (FIG. 4E).

Figure 5A:
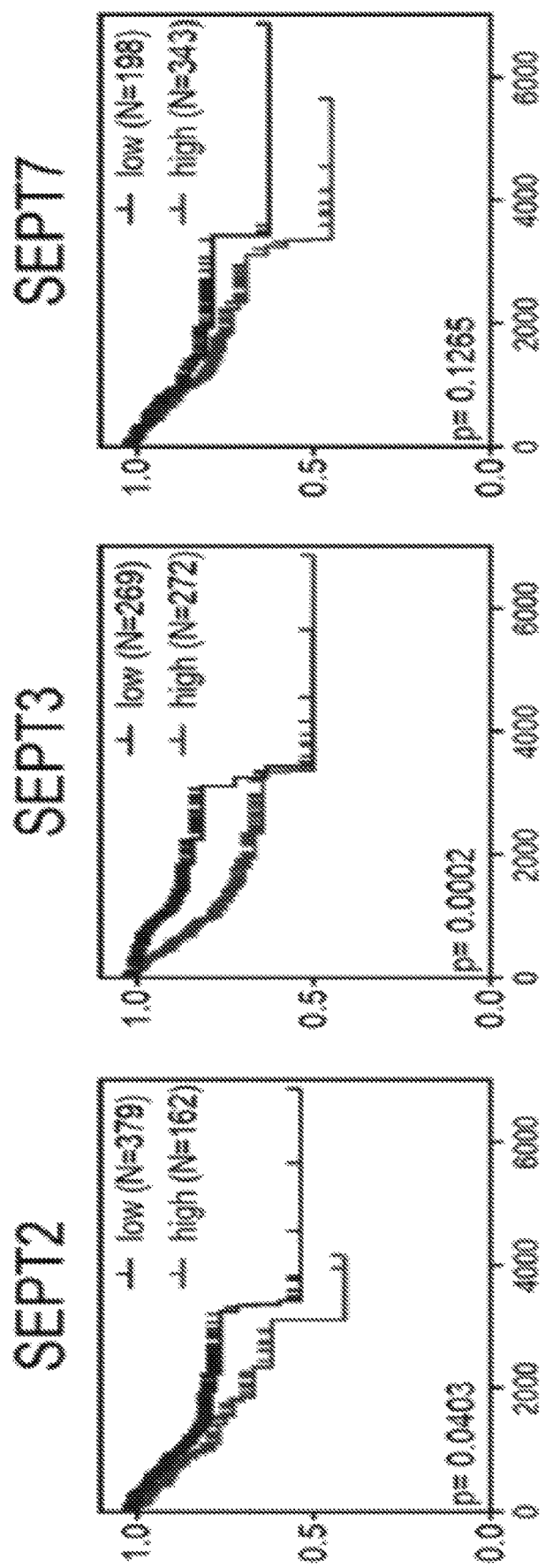
FIGS. 5A-5C shows how septin overexpression is associated with increased cancer mortality.
Figure 5B:
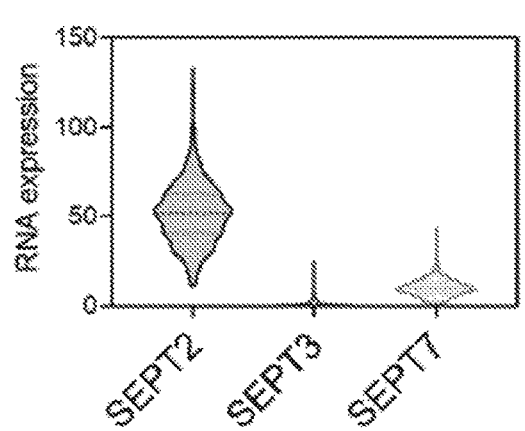
Figure 5C:
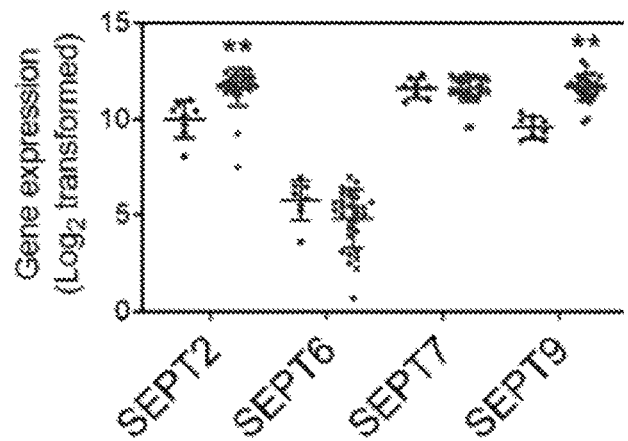

Septin Overexpression is Associated with Increased Cancer Mortality. In the present study, septin-2 knockdown caused a decrease in HER2 and HE4 expression and inhibited the viability of cancer cell lines. In addition, septins are associated with malignant cancer phenotypes (see Dolat, L. et al. Septins promote stress fiber-mediated maturation of focal adhesions and renal epithelial motility. *J. Cell Biol.* 207, 225-235, 2014; Mizutani, Y. et al. Possible role of a septin, SEPT1, in spreading in squamous cell carcinoma DJM-1 cells. *Biol. Chem.* 394, 281-290, 2013; Jiang, H. et al. MicroRNA-127-3p promotes glioblastoma cell migration and invasion by targeting the tumor-suppressor gene SEPT7. *Oncol. Rep.* 31, 2261-2269, 2014; Froidevaux-Klipfel, L. et al. Septin cooperation with tubulin polyglutamylation contributes to cancer cell adaptation to taxanes. *Oncotarget* 6, 36063-36080, 2015; and Gonzalez, M. E., Makarova, O., Peterson, E. A., Privette, L. M. & Petty, E. M. Up-regulation of SEPT9_v1 stabilizes c-Jun-N-terminal kinase and contributes to its pro-proliferative activity in mammary epithelial cells. *Cell Signal.* 21, 477-487, 2009). Therefore, it was explored if septin expression is associated with patient outcomes in endometrial and ovarian cancers. Kaplan-Meier survival analyses were conducted for endometrial cancer stratified by expression of septin-2, -3, and -7. These septins are of particular interest because they were used for the binding study of FCF (see Angelis, D., Karasmanis, E. P., Bai, X. & Spiliotis, E. T. In silico docking of forchlorfenuron (FCF) to septins suggests that FCF interferes with GTP binding. *Plos One* 9, e96390, 2014). Analyses of The Cancer Genome Atlas (TCGA) (FIG. 5A) show that both septin-2 and septin-3 overexpression correlate with increased mortality in endometrial cancer. In endometrial cancer, relative expression of septin-2 was highest, followed by septin-7. Septin-3 expression was found to be very low (FIG. 5B). The correlation between septin-2 expression and increased mortality was also found in kidney, lung, liver, and pancreatic cancers, but not in ovarian cancer. Cancer-associated fibroblasts (CAFs) are found in the stroma that surrounds and supports cancer cells. The septin network is known to support CAFs in creating a pro-tumorigenic microenvironment (see Calvo, F. et al. Cdc42EP3/BORG2 and Septin Network Enables Mechano-transduction and the Emergence of Cancer-Associated Fibroblasts. *Cell Rep.* 13, 2699-2714, 2015). Therefore, data that profiled septin expression in ovarian cancer-associated vs. normal ovarian stroma were also analyzed (Wong-77-MAS5.0-u133p2). In cancer-associated stroma, the expression of septin-2 and septin-9 was significantly upregulated, while septin-6 and septin-7 were unchanged (FIG. 5C).

Discussion

In the present example, treatment with FCF was found to reduce cell viability in ovarian and endometrial cancer cell lines in the range 100-300 μM, which is pharmacologically undesirable. Through efforts to optimize FCF's structure, highly potent analogs, UR214-1, UR214-7 and UR214-9, were generated. Treatment with these analogs blocked proliferation in multiple endometrial and ovarian cancer cells at considerably lower doses than FCF. UR214-9 was found to inhibit cancer cell proliferation in the range 4-5 μM. It is possible that further structural optimization could lead to a nanomolar disruptor that would then be appropriate for further animal and potentially human trials.

Septins are a class of cytoskeletal proteins that are associated with malignant phenotypes of cancer. Additionally, septins have been increasingly linked to cancer oncogene expression, including EGFR, HER2 and the HIF-1α/angiogenesis axis (see Diesenberg, K., Beerbaum, M., Fink, U., Schmieder, P. & Krauss, M. SEPT9 negatively regulates ubiquitin-dependent downregulation of EGFR. *J. Cell Sci.* 128, 397-407, 2015; Angelis, D. & Spiliotis, E. T. Septin Mutations in Human Cancers. *Front. Cell Dev. Biol.* 4, 122, 2016; and Amir, S., Wang, R., Simons, J. W. & Mabjeesh, N. J. SEPT9_v1 up-regulates hypoxia-inducible factor 1 by preventing its RACK1-mediated degradation. *J. Biol. Chem.* 284, 11142-11151, 2009). It is therefore not surprising that high septin-2 levels are linked to worse patient survival in several cancer types, including endometrial cancer. Additionally, ovarian tumor stroma has been found to be highly enriched for septin-2 and -9, prompting further investigations into the role of these two structural proteins in ovarian cancer.

HE4 is a secretory glycoprotein encoded by WFDC2. It is found to be upregulated in ovarian and endometrial cancers (see Moore, R. G. et al. Utility of a novel serum tumor biomarker HE4 in patients with endometrioid adenocarcinoma of the uterus. *Gynecol. Oncol.* 110, 196-201, 2008) and has been shown to increase cancer cell proliferation, migration, invasion, metastasis and chemoresistance. The present findings show that treatment with UR214-1 and UR214-7 results in reduced HE4 secretion. Therefore, these FCF analogs may have particular therapeutic benefit in gynecologic cancers.

To date, FCF is the only known small molecule septin inhibitor. Septins are not found in land plants (see Yamazaki, T. et al. Localization and evolution of septins in algae. *Plant. J.* 74, 605-614, 2013) and so it would seem logical that FCF, which has profound effects on plant growth (see Kopecny, D. et al. Phenyl- and benzylurea cytokinins as competitive inhibitors of cytokinin oxidase/dehydrogenase: a structural study. *Biochim.* 92, 1052-1062, 2010), participates in cellular processes not involving septins. Indeed, non-septin effects of FCF have been described (see Heasley, L. R., Garcia, G. III & McMurray, M. A. Off-target effects of the septin drug forchlorfenuron on nonplant eukaryotes. *Eukaryot. Cell* 13, 1411-1420, 2014). Nevertheless, FCF has also been shown to inhibit septin dynamics and disrupt the assembly of septin-based structures (see Hu, Q., Nelson, W. J. & Spiliotis, E. T. Forchlorfenuron alters mammalian septin assembly, organization, and dynamics. *J. Biol. Chem.* 283, 29563-29571, 2008). In silico studies suggest that FCF could interact with a nucleotide-binding pocket of septins. In the present example, treatment with FCF analogs caused downregulation of both HER2 and HE4, which appeared to mimic the effect of septin-2 knockdown.

Example 3. Septin Disruption Controls Tumor Growth and Enhances Efficacy of Trastuzumab (Herceptin™)

Septins are a family of GTP-binding cytoskeletal proteins that participate in cytokinesis, cell migration, chromosomal dynamics and protein secretion. Septins hetero-oligomerize to generate scaffolding filaments, bundles, and rings within cells. Additionally, septins are a critical cytoskeletal component that regulate the function of tubulin and actin. Altered septin protein expression in pancreatic, kidney, lung, colorectal, skin, brain, endometrial, ovarian, breast and other malignancies have been observed. Aberrant septin expression has also been linked to neurodegenerative/neuromuscular diseases, blood disorders, infertility, and developmental disabilities. It is unclear whether aberrant enrichment of individual septin family members is enough to enhance tumorigenesis or if a specific hetero-oligomer assembly may be implicated. Pharmacologic agents to target septins have remained elusive, largely because the oligomeric structural configurations of septins pose difficult challenges in designing therapies.

In this example, the impact of individual septins on the survival of patients with cancers of the pancreas, breast, lung, kidney, or liver cancer or with melanoma was investigated. To determine the effect of septins on survival, the Human Protein Atlas (HPA), and publically available transcriptional data and tools available at R2:Genomics Analysis and Visualization Platform (https://hgserver1.amc.nl/cgi-bin/r2/main.cgi) was used. A potent septin modulator, UR214-9, is described which disrupts structural organization of septin-2 and septin-9 as well as of β-actin, and controls cancer cell proliferation and tumor growth. Molecular docking techniques were employed to investigate how UR214-9 and its analogs interact with the elements of the GDP binding domain, and of the known FCF binding pocket. To identify how gene expression is impacted by UR214-9, and thereby characterize its off-target liabilities, transcriptome analyses of UR214-9 treated breast and pancreatic cancer cells were conducted. In summary, this example presents UR214-9, as a potent septin filamental modulator and demonstrates that the dismantling of septin structures in pancreatic, ovarian and breast cancer cells by UR214-9 can be an effective therapeutic strategy.

Methods

Cell Lines, Cell Culture, and Reagents. PANC-1, BXPC-3 and CAPAN-1, SKOV-3, MCF7, MDA-MD-231 cells were obtained from ATCC and maintained in DMEM, RPMI-1640 and IMDM supplemented with 10% fetal calf serum penicillin (100 units/mL), and streptomycin (100 µg/mL) at 37° C. with 5% $CO_2$ in a humidified incubator. JIMT-1 cells were purchased from AddexBio Inc, USA (catalog number: C0006005) and maintained in 10% FBS and antibiotic supplemented DMEM. Septin-2 (catalog number: HPA018481), septin-7 (catalog number: HPA029524), septin-9 (catalog number: HPA029524) antibodies were purchased from Sigma Aldrich Inc. DyLight 488 (catalog number: DI-1488, rabbit, Dylight594 (catalog number: DI-2594, mouse) were purchased from Vector Laboratories Inc. Phalloidin-TRITC was purchased from ECM Biosciences (catalog number: PF7551). HER2 (Cell Signaling Technology, catalog number: 4290); pSTAT-3 (catalog number: 9145p), STAT-3 (catalog number: 4904) and GAPDH antibodies (catalog number: 2118s) were purchased from Cell Signaling Technology Inc. USA and used at manufacturer recommended dilutions.

Synthesis of Derivatives. UR214-9 was synthesized by coupling aryl isocyanates with 2,6-dichloro 4-aminopyridines in (0.1:0.1) molar ratio in dry DMF at 65° C. overnight under an argon flushed atmosphere. The reaction was monitored using thin-layer chromatography plates with DCM-MeOH or pure ethyl acetate as eluent. Spots were monitored in a UV chamber. The reaction mixture, upon completion of the reaction, was poured into wet ice mixture and triturated and the separated solid was filtered under vacuum. The product was washed with hexane, followed by diethyl ether, and was dried under vacuum. The compounds were characterized by mass spectrometry.

Molecular Docking. Docking experiments to investigate the potential binding mode of 9 and related compounds were performed using Molsoft's ICM software package (v. 3.8-7). The molecules are rather small and somewhat symmetric (consisting of a central urea group flanked by two lipophilicly substituted aromatic rings). We assumed that since compounds 8, 9, and 10 are the most active ones, that they might share a similar binding mode. Thus, compounds FCF, UR214-8, -9, and -10 were docked into the nucleotide binding site of PDB ID 2QNR, which is the highest quality structure of a septin-2 dimer complex available to date (see Angelis, D., et al., *In silico docking of forchlorfenuron (FCF) to septins suggests that FCF interferes with GTP binding*. PLoS One. 9, e96390, 2014). Receptor preparation (based on the GDP binding site in chain A) and ligand construction was performed within ICM using standard settings. ICM scores for each compound and their poses were calculated and compared with FCF. The compounds were docked with the "dock table" functionality, with a setting for effort of 2.0 and 20 poses per compound. Upon visual inspection of the docking poses, two sets of low energy poses ("set A" and "set B") stood out, in which the highly active compounds are able to adopt similar conformations.

Cell Viability and Cell Cycle Analysis. Cell viability of PANC-1, BXPC-3 and CAPAN-1 pancreatic cancer cells treated with UR214-9 was measured using the Cell Titre96R Aqueous One Solution Cell Proliferation Assay (Promega Corp., catalog number: G3580) following the procedure published earlier. The Live/Dead dye kit (Invitrogen Coro., catalog number: L34975) was used to estimate live and dead cell population in PANC-1 and BXPC-3 pancreatic cancer cells treated with UR214-9 or vehicle. Briefly, cells were treated with vehicle or UR214-9 (3 µM) for 72 hours. Cells were harvested by trypsinization, fixed and permeabilized using Fixation-Permeabilization reagent (prepared by diluting the concentrate in the diluent in the ratio 1:3) (Biogem Inc., diluent: catalog number 92160-00-160 and concentrate catalog number: 2550-00-50) and stained with Live/dead dye for one hour. The cells were centrifuged at 1000 rpm for 5 minutes and pellets were washed and spun down three times with DPBS. The cells were analyzed by a 305 flow cytometer and relative live and dead cell population was calculated by inputting equal number of cells in both vehicle and control group.

For cell cycle analysis, BXPC-3 and PANC-1 and JIMT-1 cells (100,000/well) were seeded overnight in a 6 well dishes and allowed to adhere overnight. Media was replaced with fresh complete medium supplemented with DMSO or UR214-9 (100 nM and 3 µM) and cells were incubated for 72 hours. The media containing the drugs was removed and cells were washed twice with PBS and trypsinized gently. The cells were collected in 15 mL tubes, complete DMEM media was added to block trypsin and cells were centrifuged. The supernatants were removed and cells were gently treated with 70% cold-EtOH for 30 minutes. The fixed cells were centrifuged and the pellets obtained were collected in flow cytometry tubes and stained with preformulated PI/RNase solution (Cell Signaling Technology, catalog number: 4087s) for 30 minutes. The PI content was analyzed using a flow cytometer. Data was processed using Flowjo software.

Cell Cycle Protein Expression. Cell Cycle Antibody Array (FullMoon BioSystems Inc, catalogue number: ACC:058), a high throughput ELISA based antibody array, designed for qualitative/semi-quantitative protein expression profiling was employed to investigate the protein changes after drug treatment. PANC-1 cells were lysed in buffer containing protease and phosphatase inhibitors (Cell Signaling, catalog number: 9803S). Total protein content was quantified by Bradford assay and equal amounts of proteins were analyzed in duplicate with arrays containing 4 to 6 spots for each of 60 probes (ACC058, Cell Cycle Antibody Array; Full Moon Biosystems, Sunnyvale, Calif.), according to manufacturer's instructions. After background correction, mean signal intensities were measured using FullMoon Inc's imaging services. Protein expressions in both the naïve and 328 treatment group was normalized to GAPDH signals.

Confocal Analysis of Septin Disarrangement. To determine the impact of UR214-9 treatment on Septin-2 structure in cells, PANC-1 or JIMT-1 cells were seeded on glass slides and allowed to adhere overnight. The media was replaced with complete DMEM media supplemented with DMSO or UR214-9 (1 µM and 70 nM) and cells were incubated for 48 hours. Media was replaced again with new complete medium and fixed with neutral buffered formalin for 15 minutes at 40 C. Media was removed and cells were washed repeatedly with PBST (5×5 mL). The cells were stained with Septin-2 antibody (Sigma Aldrich, catalog number: HPA018481) in PSB overnight at 40° C. Media was removed again and cells were washed with 2×5 mL PBST. The cells were stained with fluorescence linked secondary antibody for 1 hr under dark. Slides were washed repeatedly in dark for 7×5 mL PBST, mounting medium containing DAPI (Vector labs) were applied and covered with glass slide. The slides were stored in dark at 40 C till analysis. Confocal images were obtained and processed essentially as published earlier (see Moore, R. G., Hill, E. K., Horan, T., Yano, N., Kim, K., MacLaughlan, S., Lambert-Messerlian, G., Tseng, Y. D., Padbury, J. F., Miller, M. C., Lange, T. S., Singh, R. K. Sci Rep. 4, 3574, 2014). Pancreatic tumor microarray (US Biomax, cat no: T142a) were deparaffinized, processed and stained with Septin-2 antibody (Sigma Aldrich, cat number: HPA018481) overnight, washed with PBST and incubated with source matched secondary (FITC) for an hour. Slide was washed in PBST (5×10 mL) for five minutes each. DAPI containing mounting media was applied and covered with a glass slide. Confocal images were acquired with Nikon C1si confocal microscope (Nikon Inc. Mellville N.Y.) using diode lasers 402, 488 and 561. Serial optical sections were obtained with EZ-$C_1$ computer software (Nikon Inc. Mellville, N.Y.). Z series sections were collected at 0.3 µm with a 40× PlanApo lens and a scan zoom of 2 or with a 60× PlanApo objective and a scan zoom of 2, collected every 0.25 µm. Deconvolution measurements were performed with Elements (Nikon Inc. Mellville, N.Y.) computer software. Five cells were outlined and analyzed per field.

Xenograft Studies to Evaluate Antitumor Response of UR214-9. NSG mice 356 were implanted in their left flank with 1 million PANC-1 (HER2+, n=12), JIMT1 (number of animals=10) and SKOV-3 (number of animals=10) cells each in matrigel:media (1:1). Mice were randomized, identified with ear punches and subdivided into vehicle and treatment groups when tumors were found palpable. Both JIMT1 and SKOV-3 formed aggressive tumors within a week and were treated with vehicle or UR214-9 (25 mg/kg, IP, seven days a week). PANC-1 formed slow growing tumors and when tumors reached length exceeding 5 mm, the treatment was started. A group of SKOV-3 cells were also treated with trastuzumab or trastuzumab+UR214-9. The vehicle formulation was: 40% Hydroxypropyl-beta-cyclodextrin [Acros Organics] & solutol HS15 [Sigma] in sterile water). 25 mg/kg equivalent of UR214-9 (1 uL=200 ug in DMSO) was dissolved in 600 uL PBS+400 uL of the vehicle and vortexed to obtain a clear suspension. Tumor burden and animal weight was measured manually by digital calipers on weekly or biweekly routine. Tumor volume was calculated using the formula $\frac{1}{2}(L \times W^2)$ where L is a longest diameter and W is the widest width. Statistical difference between the vehicle and treatment groups was analyzed by GraphPrism-8 software using one way anova. $P<0.05$ was considered significant. Mice after the treatment period were euthanized and tumors were resected, weighed and frozen in liquid nitrogen. A portion of the tumors from the control and treatment groups were fixed in neutral buffered formaldehyde and paraffin embedded. 5 µM thickness tissues slides were prepared for histochemistry.

mRNA Sequencing. The total RNA concentration was determined with the NanopDrop 1000 spectrophotometer (NanoDrop, Wilmington, Del.) and RNA quality assessed with the Agilent Bioanalyzer (Agilent, Santa Clara, Calif.) (see Bolger, A. M., Lohse, M., Usadel, B. Trimmomatic: a flexible trimmer for Illumina sequence data. Bioinformatics. 30, 2114-2120, 2014). The TruSeq Stranded mRNA Sample Preparation Kit (Illumina, San Diego, Calif.) was used for next generation sequencing library construction per manufacturer's protocols. Briefly, mRNA was purified from 200 ng total RNA with oligo-dT magnetic beads and fragmented. First-strand cDNA synthesis was performed with random hexamer priming followed by second strand cDNA synthesis using dUTP incorporation for strand marking. End repair and 3' adenylation was then performed on the double stranded cDNA. Illumina adaptors were ligated to both ends of the cDNA, purified by gel electrophoresis and amplified with PCR primers specific to the adaptor sequences to generate cDNA amplicons of approximately 200-500 bp in size. The amplified libraries were hybridized to the Illumina single end flow cell and amplified using the cBot (Illumina, San Diego, Calif.). Single end reads of 75 nt were generated for each sample using Illumina's NextSeq550 (see Dobin, A., Davis, C. A., Schlesinger, F., Drenkow, J., Zaleski, C., Jha, S., Batut, P., Chaisson, M., Gingeras, T. R. STAR: ultrafast universal RNA-seq aligner. Bioinformatics. 29, 15-21, 2012).

Whole Transcriptome Data Analysis. Raw reads generated from the NovaSeq6000 sequencer were demultiplexed using bcl2fastq version 2.19.0. Quality filtering and adapter removal are performed using Trimmomatic-0.36 with the following parameters: "TRAILING:13 LEADING:13 ILLUMINACLIP:adapters.fasta:2:30:10 SLIDINGWINDOW:4:20 MINLEN:35" Processed/cleaned reads were then mapped to the *Homo sapiens* reference sequence (GRCh38, hg38) with STAR-2.6.0c given the following parameters: "-twopassMode Basic -runMode alignReads -genomeDir ${GENOME}-readFilesIn ${SAMPLE}-outSAMtype BAM SortedByCoordinate -outSAMstrandField intronMotif -outFilterIntronMotifs RemoveNoncanonical". The subread-1.6.1 package (featureCounts) was used to derive gene counts given the following parameters: "-s 2 -t exon -g gene_name". Differential expression analysis and data normalization was performed using DESeq2-1.16.1 with an adjusted p-value threshold of 0.05 within an R-3.4.1 environment. Heatmaps were created using the pheatmap R package (see R Core Team. R: A language and environment for statistical computing. R Foundation for Statistical Computing, Vienna, Austria. (2016). URL https://www.R-project.org/; Love, M. I., Huber, W., Anders, S. "Moderated estimation of fold change and dispersion for RNA-seq data with DESeq2." Genome Biology 15,550(2014); and 39. Liao, Y., Smyth, G K., Shi, W. featureCounts: an efficient general-purpose program for assigning sequence reads to genomic features. Bioinformatics 30, 923-930, 2014)

Data Acquisition and Statistical Analysis. The prognostic assessment of septin-2, -7 and -9 in the panel of different cancers was conducted using Human Protein Atlas tools. Alternatively, R2 genome.org tools were employed to determine the impact of septins enrichment on the survival prospects. P values less than 0.05 were considered significant. The relative tumor sizes in the naïve vs treat groups were calculated using GraphPrism8 using one-way annova settings. P values less than 0.05 were considered significant.

Results

Figure 6A:
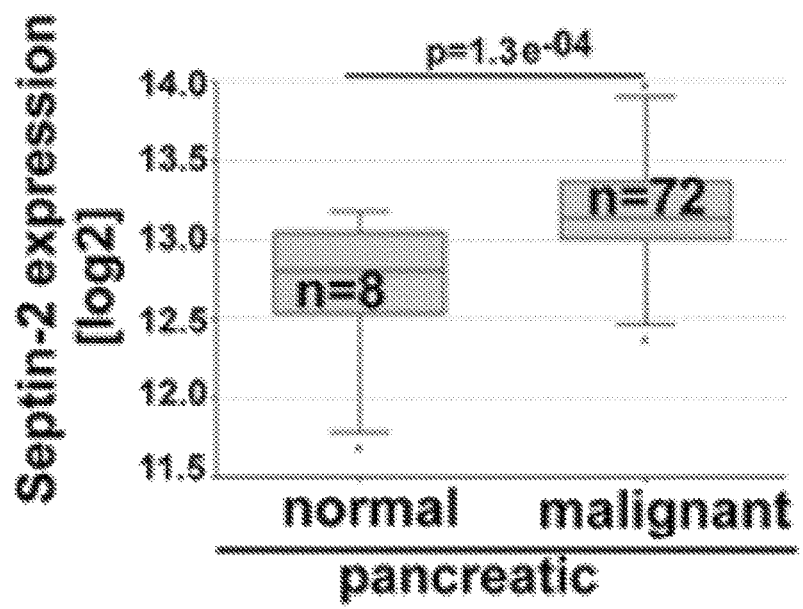
FIGS. 6A-6F show how enrichment of septins correlates with decreased survival in patients with cancer.
Figure 6B:
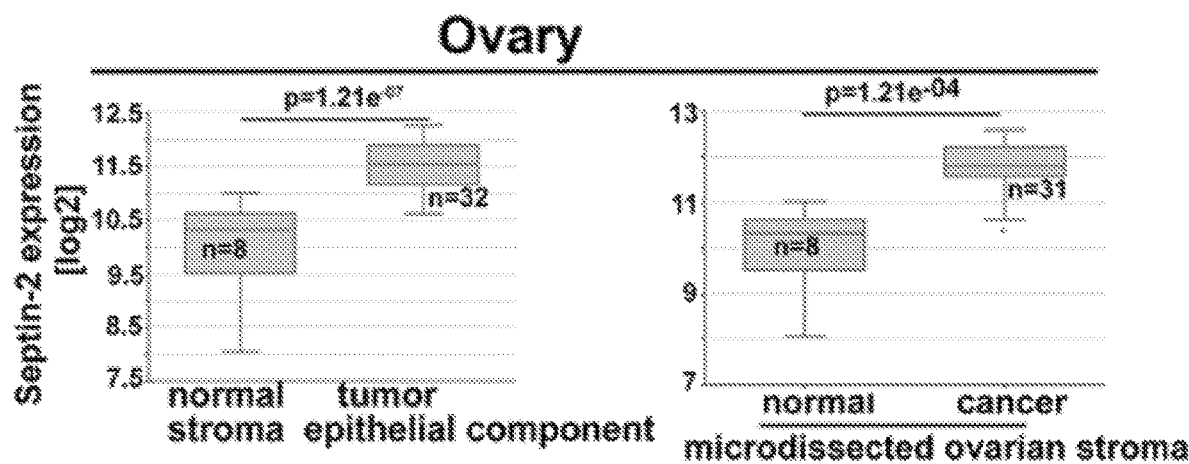

Enrichment of Septins Correlates With Decreased Survival in Patients with Cancer. Publicly accessible microarray data bases of pancreatic cancer and ovarian cancer patients deposited at R2:Genomics Analysis and Visualization Platform (https://hgserver1.amc.n1/cgi-bin/r2/main.cgi) were analyzed. Septin-2 mRNA was enriched in malignant pancreas compared to normal pancreas (FIG. 6A, p=1.3e-4). Similarly, ovarian cancer epithelium expressed significantly enrichment of septin-2 compared to normal stroma (FIG. 6B, left, p=1.2e-7). Microdissected stroma of malignant ovarian stroma was also exhibited elevated expression of septin-2 mRNA than normal stroma (FIG. 6B, right, p=1.21e-4). Similarly, compared to normal stroma, tumor epithelium components of malignant breasts showed increased septin-2 mRNA enrichment (FIG. 6C, left, p=0.49e-3).

Figure 6C:
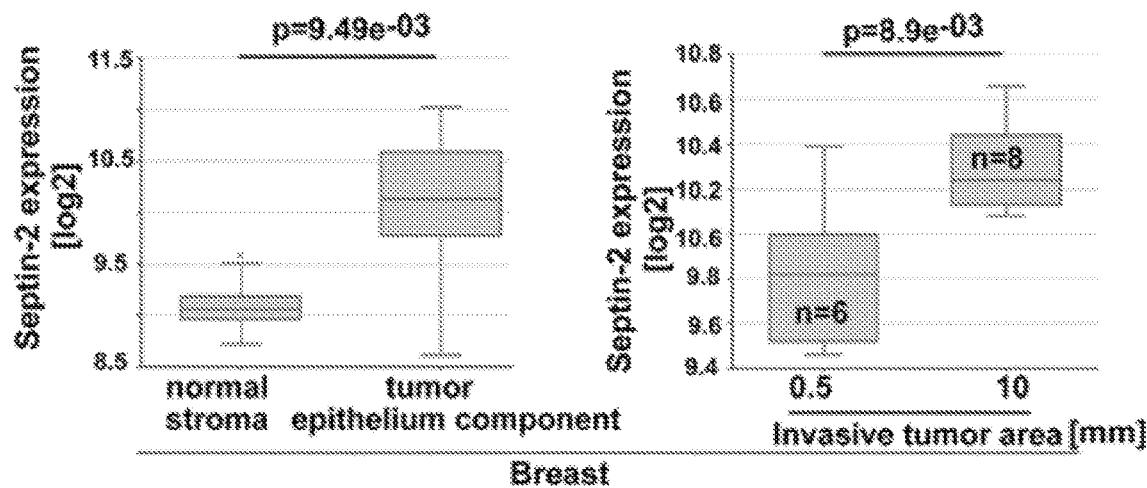
Figure 6D:
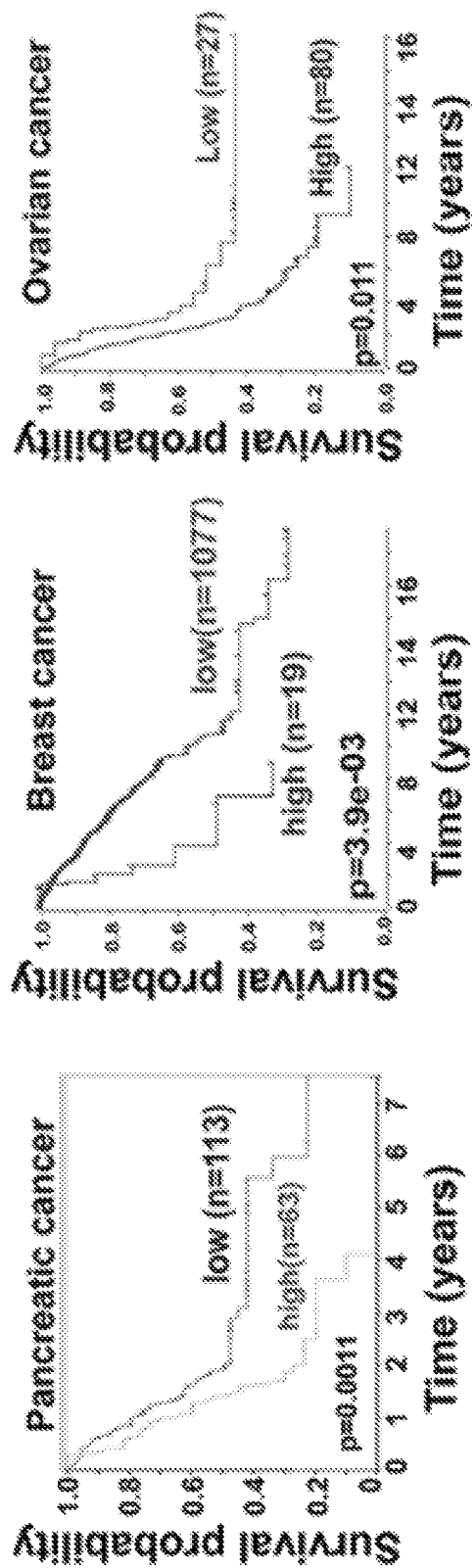
Figure 6E:
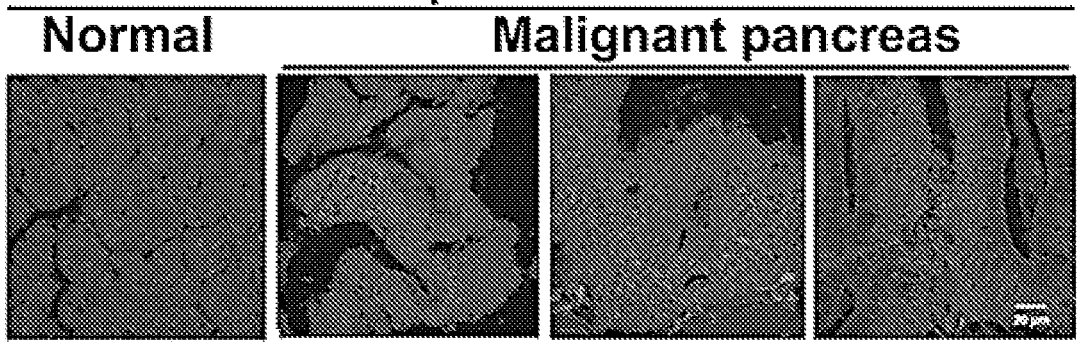
Figure 6F:
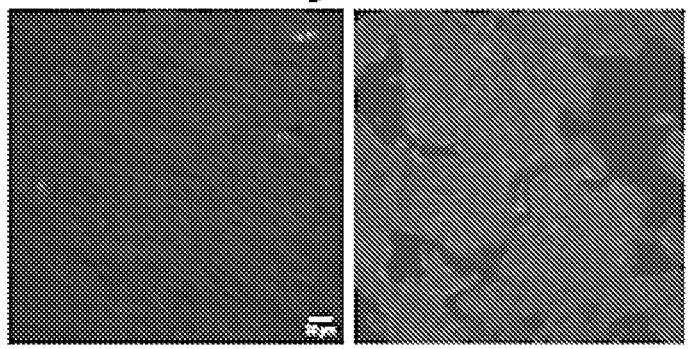

Further, increase in invasive area of breast tumors led to increased septin-2 enrichment (FIG. 6C, right, p=8.9e-3). Kaplan-Meier survival of patients with pancreatic cancer, grouped by the extent of septin-2 expression (from microarray data available at https://hgserver1.amc.n1/cgi-bin/r2/main.cgi20 and Human Protein Atlas21, show that septin-2 mRNA enrichment significantly (p=0.0011) correlates with increased mortality (FIG. 6D, left). Similarly, enrichment of septin-7 and -9 correlates with increased mortalities in pancreatic cancer patients. Septin-2 enrichment is also an unfavorable factor for patients with breast (FIG. 6D, middle, p=3.9e-3) and ovarian cancer (FIG. 6D, right, p=0.011). Analysis of the survival prospects based on other septins indicate that septin-7 enrichment was found to be unfavorable for the patients diagnosed with malignancies of breast (p=0.00[79]).

Figure 7A:
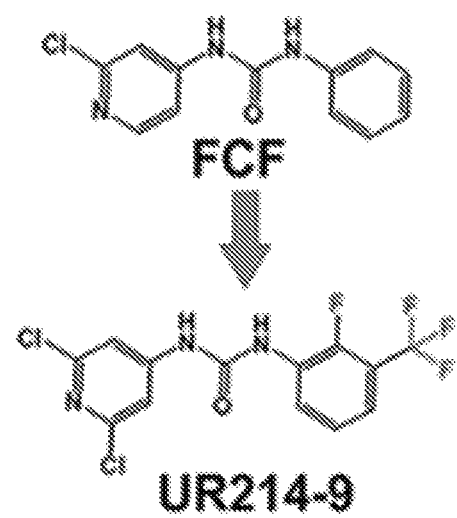
FIGS. 7A-7G show that UR214-9 causes septin-2 catastrophe in cells.
Figure 7B:
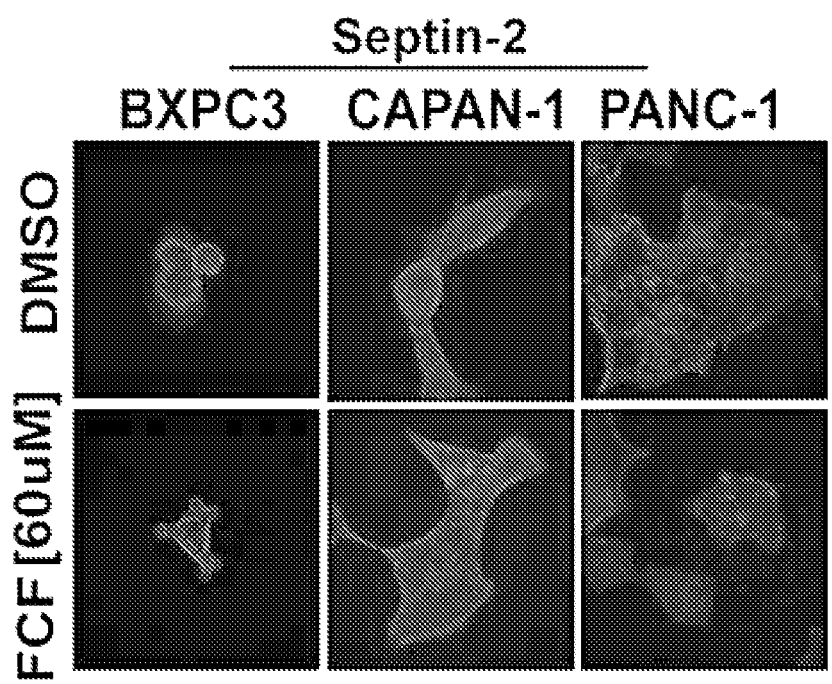
Figure 7C:
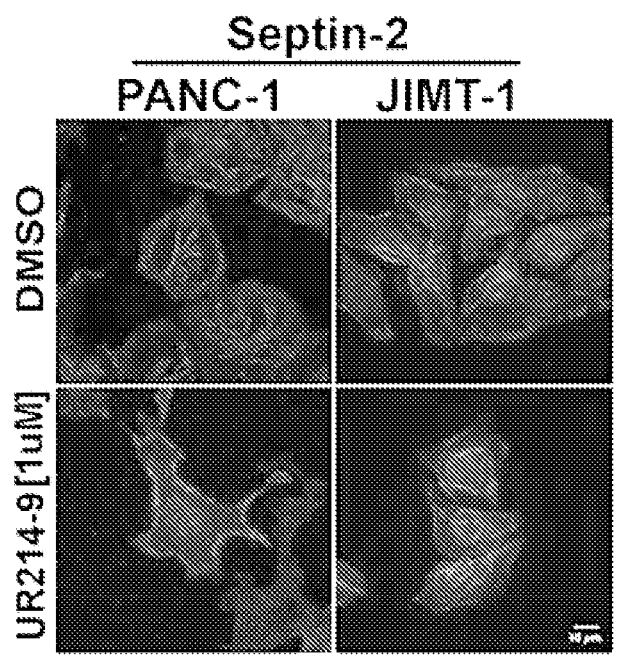
Figure 7D:
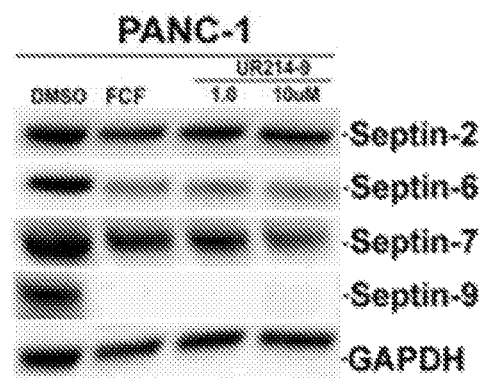
Figure 7E:
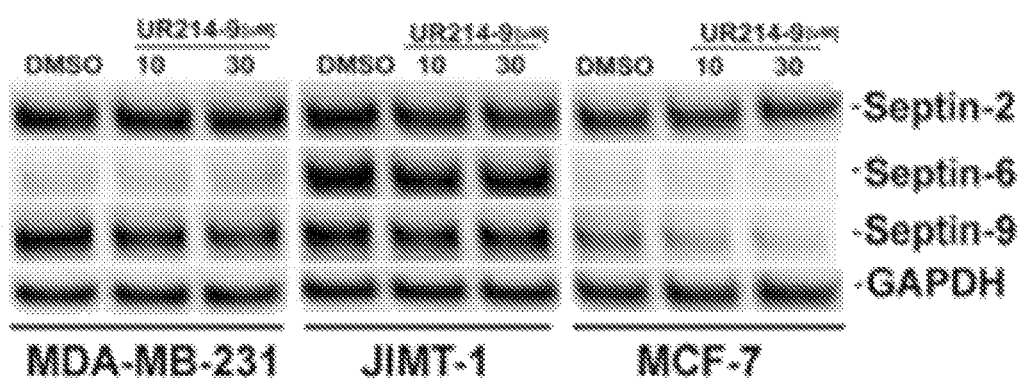
Figure 7F:
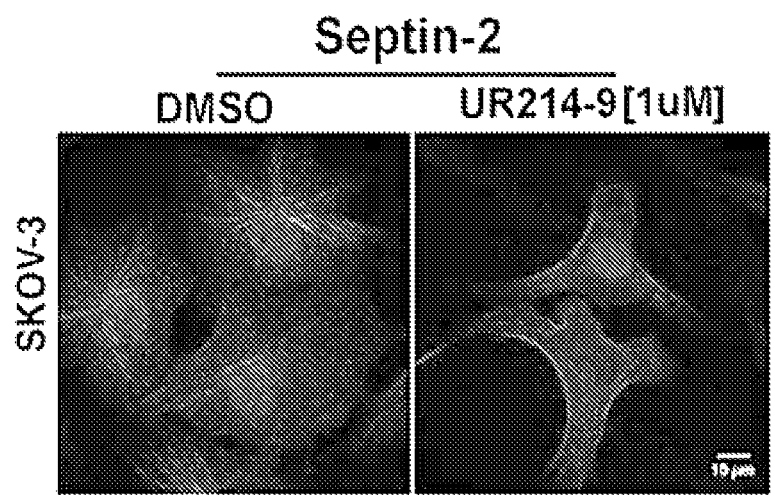
Figure 7G:
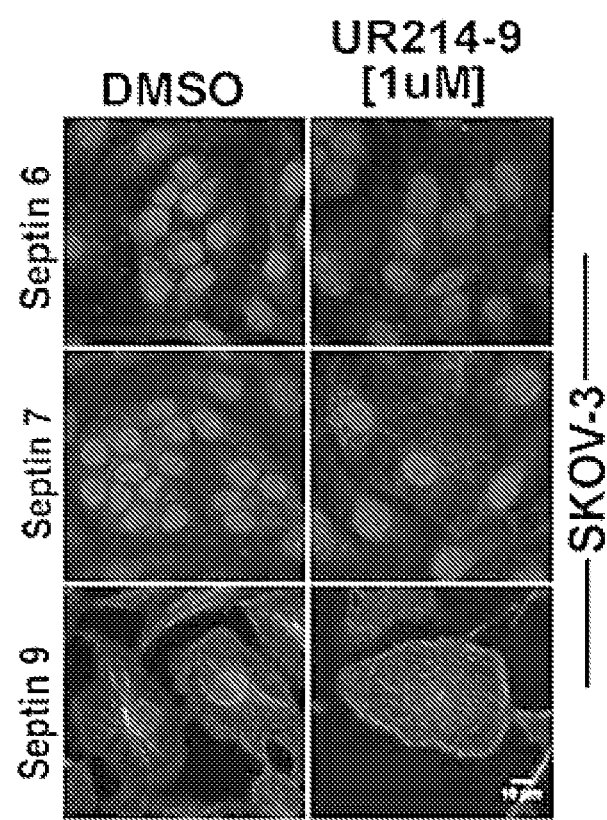

UR214-9 Causes Septin-2 Catastrophe in Cells. The chemical structure of UR214-9 is shown in FIG. 7A. UR214-9 was obtained by the structure-activity relationship guided optimization of FCF. Incorporation of a group of fluorine atoms on phenyl ring and installation of a chlorine atom at C-6 of pyridine ring made UR214-9 a potent disruptor of septin's filamental structure. Confocal microscopy at higher resolution (60×2) was employed to determine the impact of DMSO, FCF (+ve control) and UR214-9 on the structural arrangement of septin-2, 6, 7 and -9 in a panel of BXPC-3, CAPAN-1, Panc-1 (pancreatic) and JIMT-1(breast) and SKOV-3 ovarian cancer cells. While FCF seems to strengthen the septin-2 filaments in BXPC-3 cells (FIG. 7B, left-lower), Septin-2 needles in PANC-1 were disarranged and translocated at the cell-surface after UR214-9 treatment (1 uM) (FIG. 7C, lower left). Similarly, the septin-2 needles in JIMT-1 cells after drug treatment showed structural disruptions and relocation to nuclear periphery (FIG. 7C, right-lower). Next, the confocal microscopy was employed to investigate the response of other septin family members in PANC-1 cells upon treatment with UR214-9. Septin-7 showed reduced expression whereas septin-9 showed disarrangement of filamental structure. Septin-4, -6, did not exhibit clear filamental structures and showed punctate staining instead, which was either reduced in the treatment group compared to DMSO treated control or the drug effect was inconclusive (data not shown). Similarly, UR214-9 treated JIMT-1 breast cancer cells showed strong structural disarrangement and relocation of septin-2 on the periphery of nucleus. JIMT-1 cells did not exhibit defined septin-7 structures, and therefore, the effect of UR214-9 on septin-7 remains ambiguous. However, the confocal microscopy of PANC-1 and JIMT-1 cells treated with UR214-9 exhibited clear disarrangement in septin-9 filament structures. Whether UR214-9 treatment alters expression of septin family of proteins was investigated by immunoblotting the total cell-lysates of PANC-1, MDA-MB-231, JIMT-1 and MCF-7 cancer cells. The immunoblots were probed with validated septin-2, 6, 7 and -9 antibodies. In PANC-1 cells, septin-9 expression was completely inhibited intriguingly, while expression of septin-2, -6 and -7 were unaffected (FIG. 7D). Similarly, western blot analysis of MDA-MB-231, JIMT-1 and MCF-7 cells showed that UR214-9 does not alter the protein expression levels of septin-2,6 and -9 family of proteins (FIG. 7E) even though their filamental structures are overwhelmingly disrupted. Septin catastrophe phenomenon in cancer cells was further validated using SKOV-3 ovarian cancer cells that upon treatment with UR214-9 (1 μM, 48 hours) showed complete disruption of septin-2 filaments wherein septin-2 appears to have relocated to cell surface after drug exposure (FIG. 7F). Further examination of 125 septin-6, 7 and -9 structures in drug treated SKOV-3 cells showed reorganization of septin-9 (FIG. 7G, lower). Septin-6 was found to be non-needle-like and decreased upon treatment with UR214-9 (FIG. 7G, upper). Changes in septin-7 expression were not clear due to non-needle like and diffused/punctated expression of UR214-9 (FIG. 7G, middle).

Figure 8:
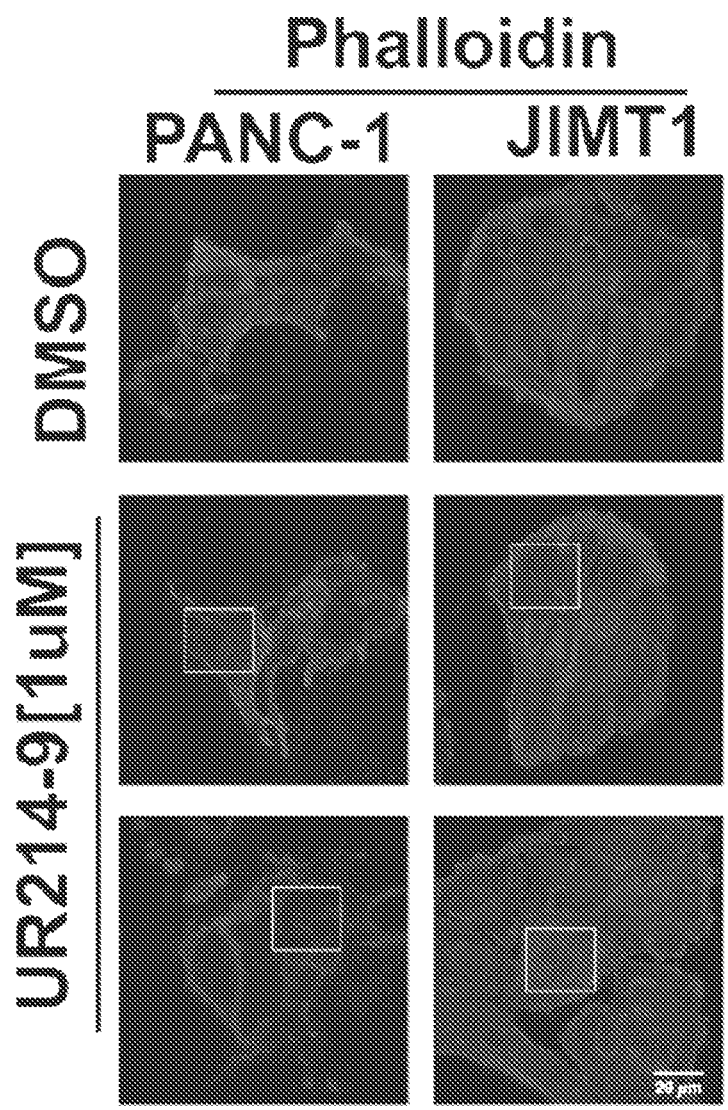
FIG. 8 shows that UR214-9 causes actin filamental disruption in pancreatic and breast cancer cells. PANC-1 pancreatic cancer cells and JIMT-1 breast cancer cells were treated with vehicle or UR214-9 (1 µM) for 48 hour duration, fixed, permeabilized and stained with Phalloidin-TRITC. Confocal images were recorded at 60×2 magnification. Areas of interest are shown by white boxes.

UR214-9 Causes Actin Filamental Disruption in Pancreatic and Breast Cancer Cells. Septins have been previously shown to control the function of actin (see Schmidt, K., Nichols, B J. Functional interdependence between septin and actin cytoskeleton. BMC Cell Biol. 12, 43, 2004). Confocal microscopy of UR214-9 treated PANC-1 and JIMT1 cells exhibited actin filament disruption (FIG. 8) when treated at a dose of 1p M for 48 hours. Representative structural disarrangement of actin filamental needles, for both PANC-1 and JIMT1 cells (FIG. 8). Area of interest are shown in shown in the white boxes.

Figure 9A:
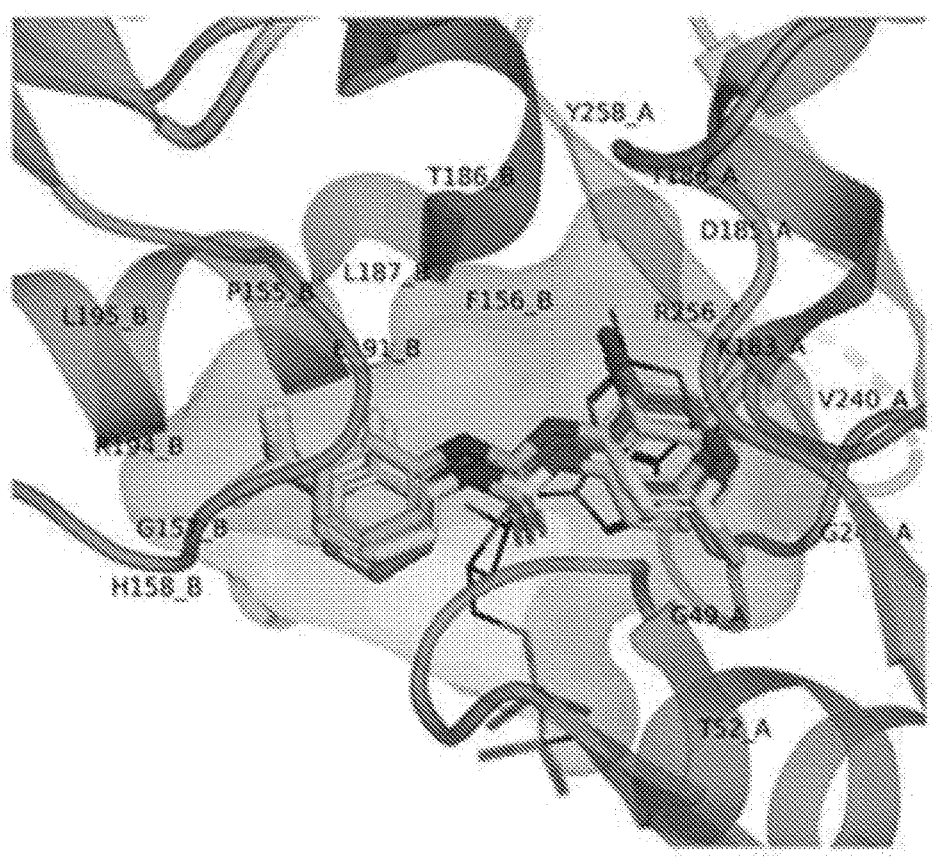
FIGS. 9A-9D show that UR314-9 impairs cancer cell viability and blocks cell cycle progression.
Figure 9B:
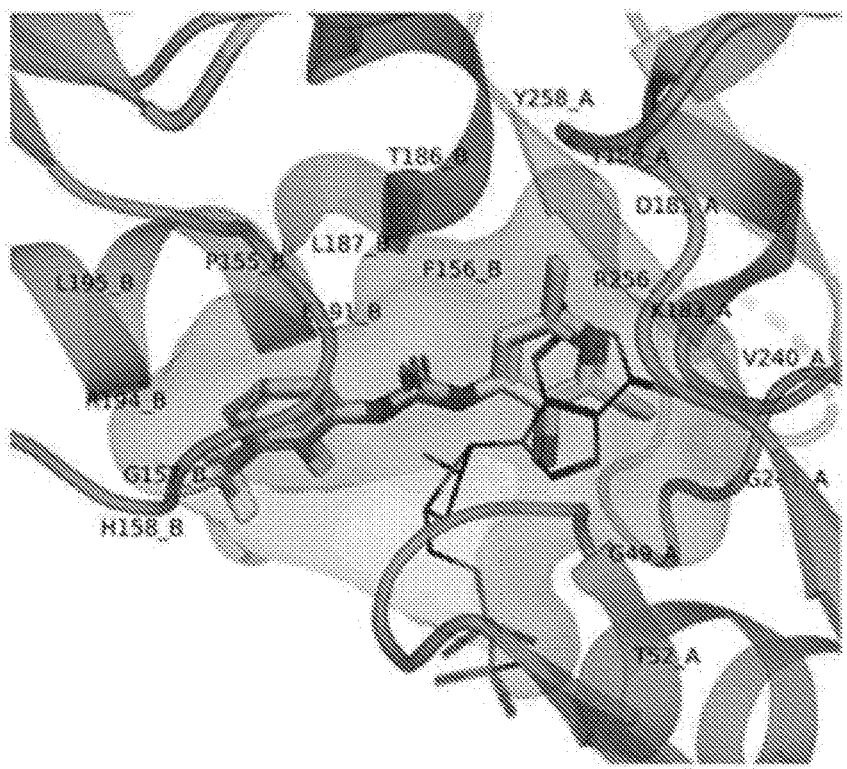
Figure 9C:
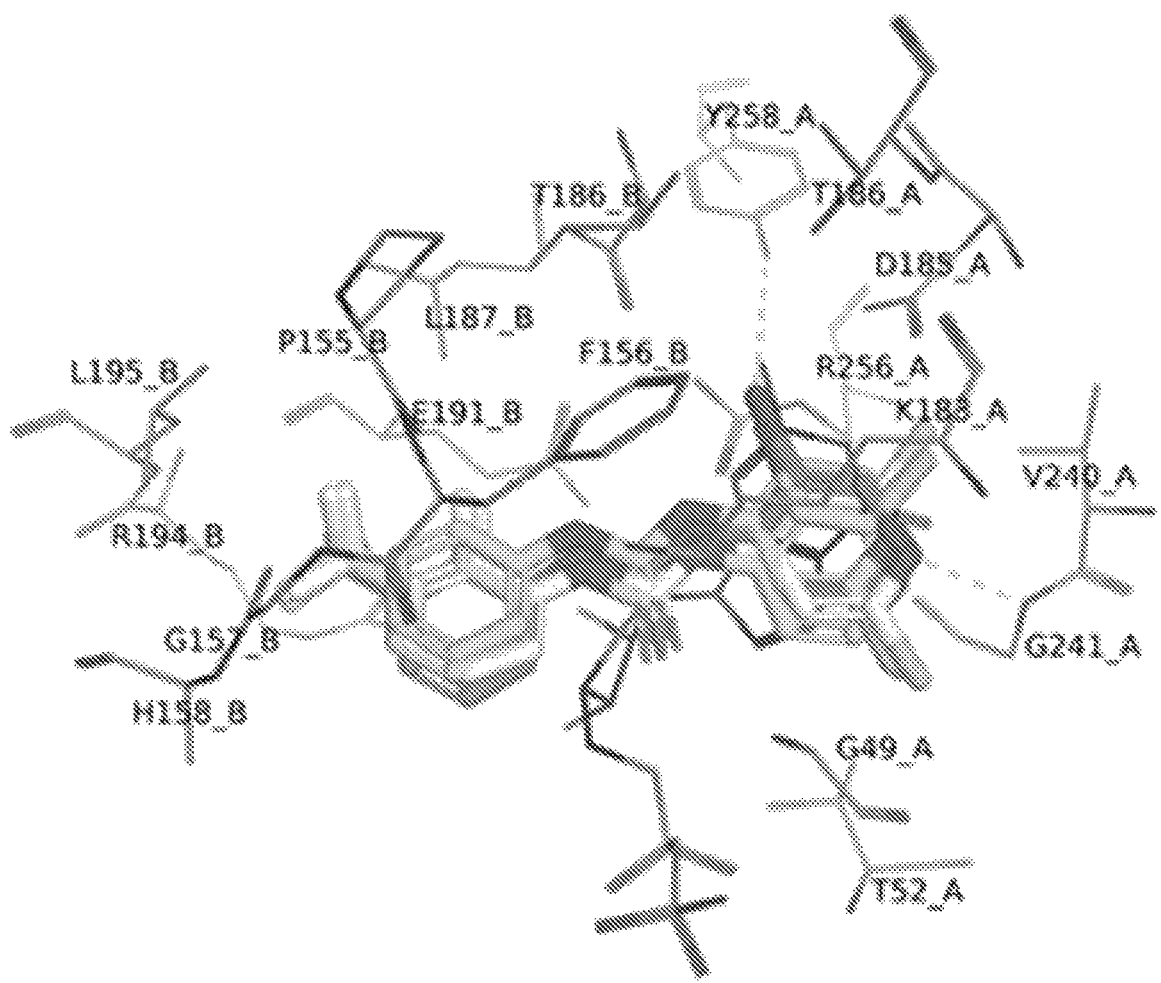
Figure 9D:
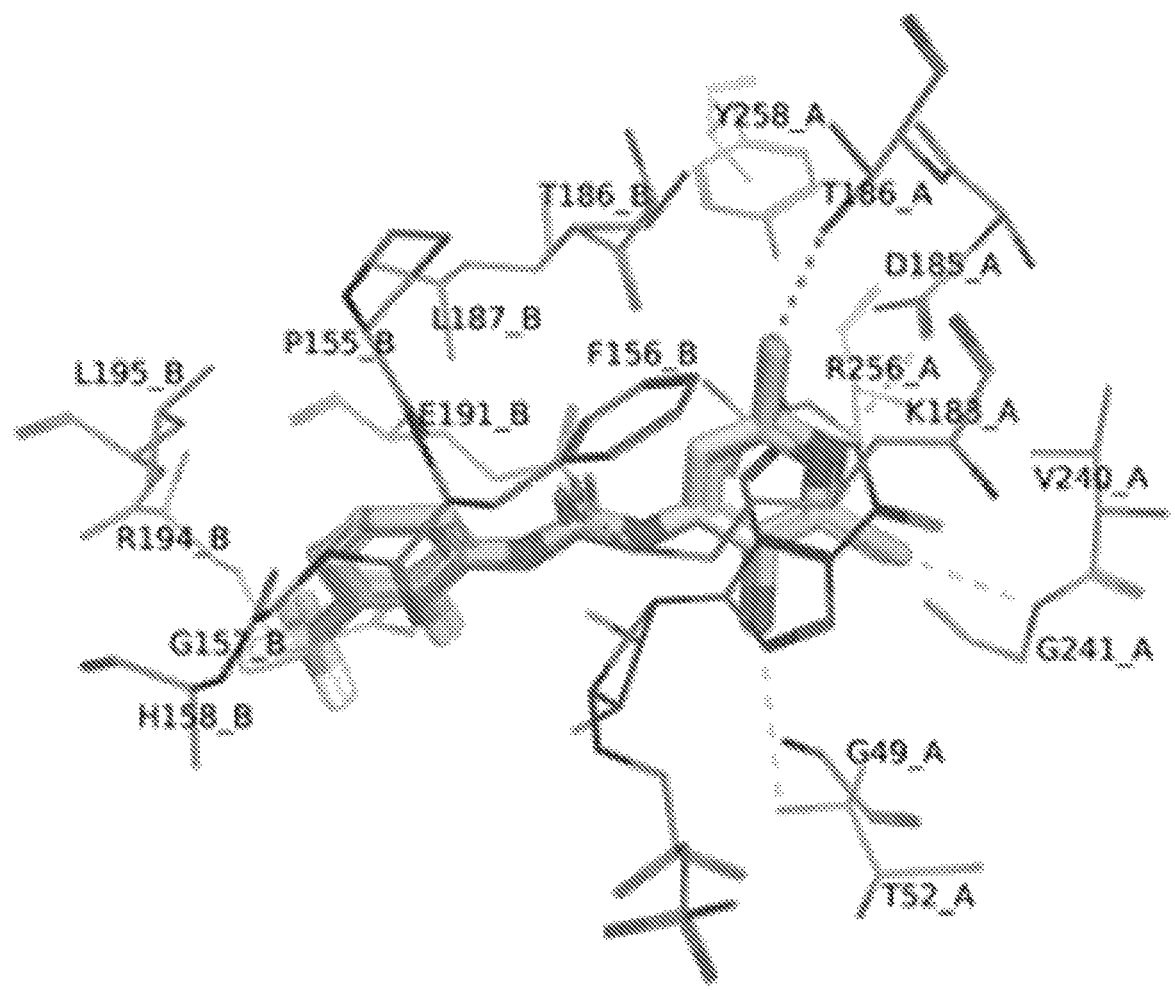

In Silico Docking Shows Key Interactions of UR214-9 with Septin-2. Docking experiments to investigate the potential binding mode of UR214-9 and related compounds (including FCF) were performed. UR214-9 and its analogs are smaller in size and similar in structure and symmetry; they consist of a central urea group flanked by two lipophilic substituted aromatic rings. Compounds UR214-8, 9, and 10 are the most active compounds described herein; taking this into account, it was hypothesized that they could share a similar binding mode. Thus, compounds FCF, UR214-8, UR214-9, and UR214-10 were docked into the nucleotide binding site of PDB ID 2QNR, which is the highest quality structure of a septin-2 dimer complex available. Upon visual inspection of the docking poses, two sets of low energy poses ("set A, upper and lower" and "set B, upper and lower") were identified in which all highly active compounds are able to adopt similar conformations. The two sets are similar to each other in that the three main portions of the molecules—the central urea moiety, the pyridine and the phenyl ring—are in roughly the same area, with the pyridine ring taking the place of the guanine in GDP (FIGS. 9A-9D). In set A, the pyridine nitrogen atom is seen taking the place of the guanine carbonyl oxygen atom, making a hydrogen bond with the 152 backbone of G241 of chain A. ICM scores of set-A were found to be compound UR214-8:-8.85, compound UR214-9: -8.59, compound UR214-10: -10.4 and FCF: -7.21 indicating stronger binding energy of the synthesized analogs than the parent FCF. Set B appears to be identical to a previously reported docking pose for FCF in the same structure template, obtained with the Autodock software. In FIGS. 9C and 9D, the identity of amino acid residues interacting with atoms of UR214-9 or its analogs are shown.

UR214-9 Impairs Cancer Cell Viability and Blocks Cell Cycle Progression. Treatment with UR214-9 reduced the viability of human pancreatic cancer cells (BXPC-3 and PANC-1) cells (FIG. 9A) during 72 hours of treatment. PANC-1 and BXPC-3 cells upon treatment with UR214-9 exhibited a large population of non-viable cells based upon staining by the Live-Dead cell kit and by flow cytometry following 72 hours of treatment (FIG. 9B and -9C). Given the role of septins in the cell cycle process, effect of UR214-9 on cell cycle progression of PANC-1 and BXPC-3 pancreatic cancer cells at a non-cytotoxic concentration of 100 nM was analyzed. Treatment with UR214-9 at 100 nM dose caused minor S-phase arrest in PANC-1 while BXPC-3 cells showed no change in cell cycle distribution at the non-toxic doses. Increasing the dose to 3 μM concentration of UR214-9 caused overwhelming arrest in G1 phase (-95% compared to 21%) of BXPC-3 cells, while PANC-1 cells showed complete arrest in sub-G1/G0 phase. Similarly, JIMT-1 cells treated with an increased dose (3 μM) of UR214-9 exhibited G1 phase arrest and showed largely increased accumulation in G0-phase.

Analysis of Cell Cycle Protein Expression. The spotted antibody array was employed to simultaneous study multiple cell-cycle related proteins expressed in drug treated or naïve PANC-1 cells. Measurement of relative photon counts showed that Cullin-3, glycogen synthase kinase-3 (GSK-3b), p19ARF, 14.3.3.Pan, APC11, APC2, ATM, C-able, CD14Aphsophatase, CDC25C, CDC34, CDC37, CDC47, CDC7, CDH1, CDK1 and CDK-3 were the most expressed and affected proteins in the treated vs naïve PANC-1 considering >2.0 fold change as meaningful. β-actin showed the most pronounced expression but expression levels remained unchanged after treatment. On the other hand, Cullin-3 showed most pronounced upregulation in the treated versus naïve PANC-1 cells. Cullin-3, a member of the cullin-based ubiquitin ligase family interacts with Hrt1 and BTB domain containing proteins. The resulting complex functions as a Cullin3-based E3 ligase to bring specific substrates to ubiquitinylation and degradation (see Pintard, L., Willems, A., Peter, M. Cullin-based ubiquitin ligases: Cul3-BTB complexes join the family. EMBO J. 23, 1681-7, 2004) indicating the role of septins in suppression of cullin-3 mediated ubiquitinylation and subsequent degradation.

Figure 10A:
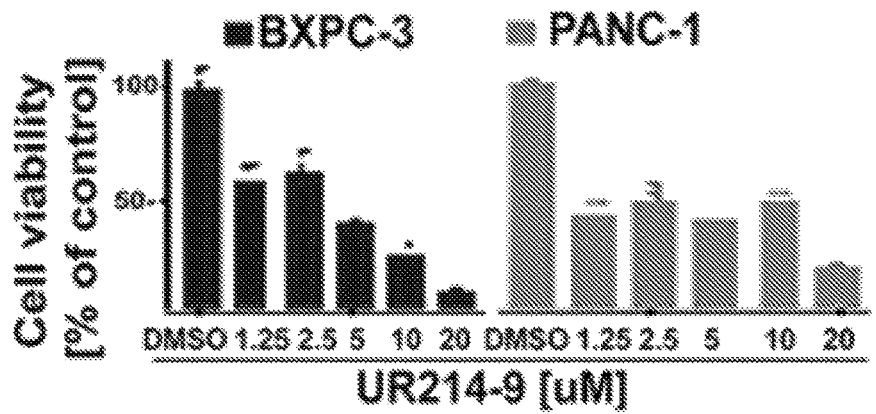
FIGS. 10A-10G show that UR214-9 treatment slows the growth of HER2+ xenograft tumors.
Figure 10B:
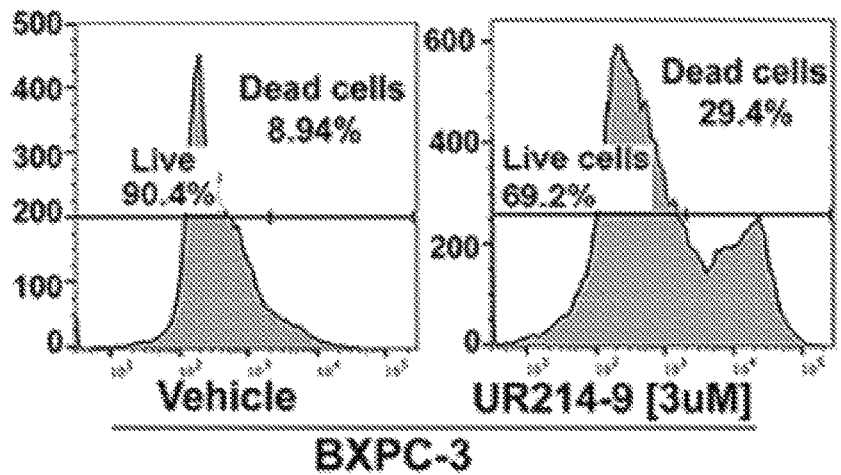
Figure 10C:
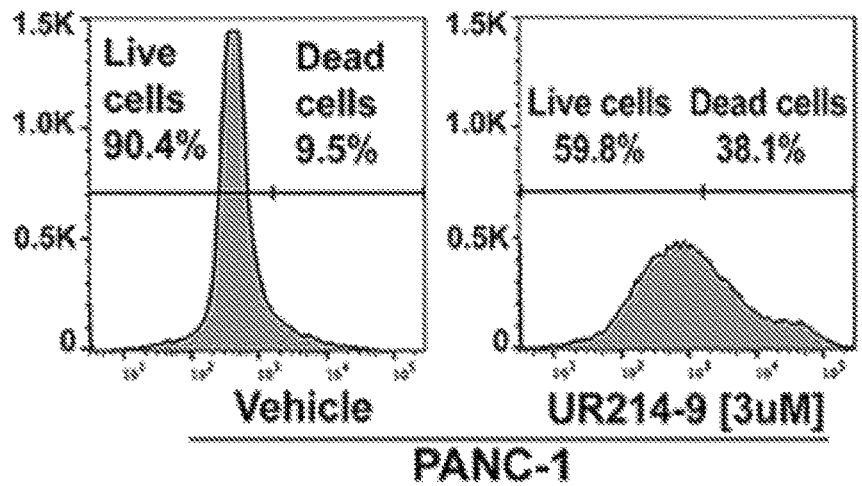
Figure 10D:
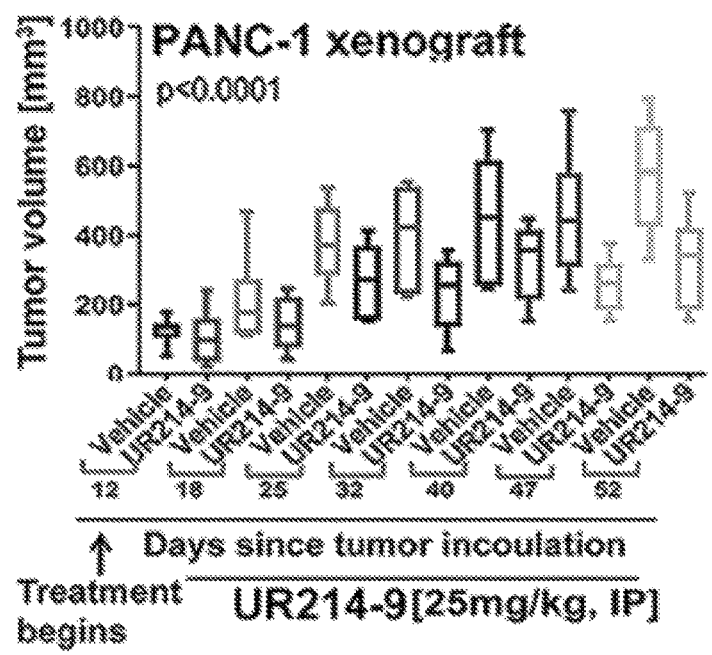
Figure 10E:
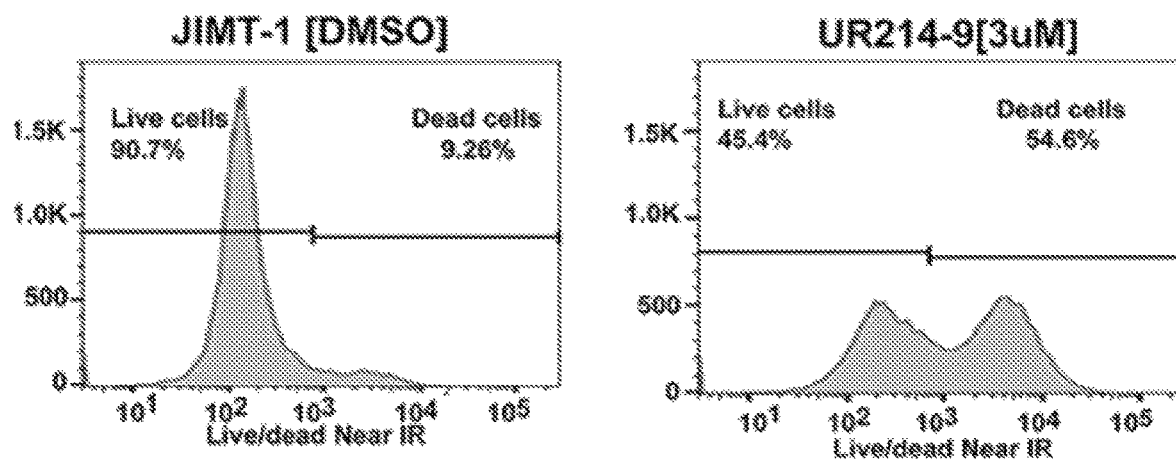
Figure 10F:
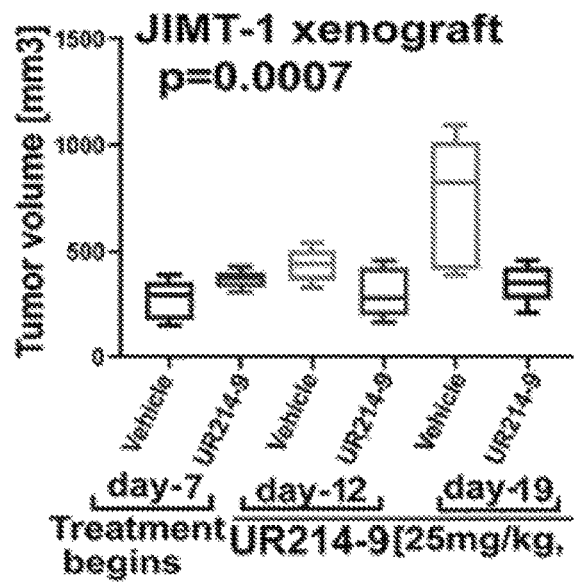
Figure 10G:
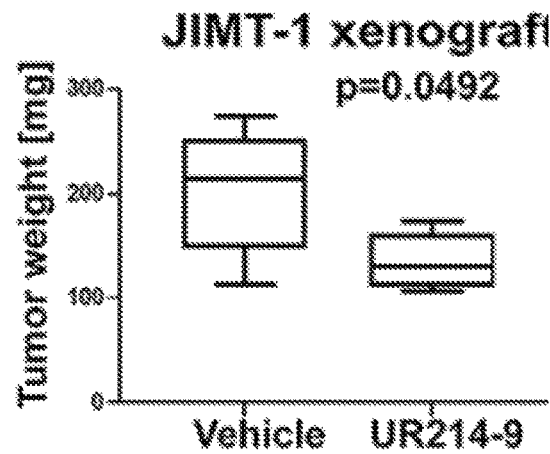

UR214-9 Treatment Slows the Growth of HER2+ Xenograft Tumors. Septin-2 regulates HER2 expression in gastric cancer cells (see Kumar, V., Abbas, A., Aster, J. Robbins basic pathology. Philadelphia: Elsevier/Saunders. 2013; p. 697. ISBN 9781437717815). HER2 is over-expressed in diverse variety of malignancies (see Buza, N., Roque, D M., Santin, A D. "HER2/neu in Endometrial Cancer: A Promising Therapeutic Target With Diagnostic Challenges". Archives of Pathology & Laboratory Medicine. 138,343-50, 2014; and Rüschoff, J., Hanna, W., Bilous, M., Hofmann, M., Osamura, R. Y., Penault-Llorca, F., van de Vijver, M, Viale, G. "HER2 testing in gastric cancer: a practical approach". Modern Pathology. 25:637-50, 2012) and is known to promote tumor development, progression, metastasis and chemoresistance (Ruiz-Saenz, A., Dreyer, C., Campbell, M. R., Steri, V., Gulizia, N., Moasser, M. M. HER2 Amplification in Tumors Activates PI3K/Akt Signaling Independent of HER3. Cancer Res. 78, 3645-3658, 2018). Septins are shown to protect and stabilize HER2 receptor at the plasma membrane of tumor cells to perpetuate the HER2 orchestrated tumorigenesis (see Marcus, E. A., Tokhtaeva, E., Turdikulova, S., Capri, J., Whitelegge, J. P., Scott, D. R., Sachs, G., Berditchevski, F., Vagin, O. Septin oligomerization regulates persistent expression of ErbB2/HER2 in gastric cancer cells. Biochem J. 473, 1703-18, 2016). We postulated that targeting septin-2 can potentially emerge as a novel approach to control HER2 orchestrated tumorigenesis. An MTS assay showed that UR214-9 treatment reduced the growth of BXPC-3 and PANC-1 pancreatic cancer dose dependently by 48th hour of drug exposure (FIG. 10A). Treatment with UR214-9 [3 μM] created 29.4% dead cells during 48 hours of drug exposure when the total population of BXPC-3 cells was analyzed by Live-dead kit (Invitrogen Inc). Similarly, PANC-1 cells presented over 38% dead-cell 203 population upon treatment with UR214-9 [3 μM]. Next, the impact of UR214-9 treatment on pancreatic cancer xenograft tumor growth in vivo was determined. Mice xenografted with HER2+ PANC-1 cells showed significantly delayed growth (p<0.0001) (FIG. 10D). The anti-tumor efficacy of UR214-9 was further evaluated against HER2 positive xenografts derived from JIMT1 (breast cancer) cells. In addition to increased cell death of JIMT-1 cells upon UR214-9 exposure in vitro (FIG. 10E), JIMT1 xenograft tumors treated with UR214-9 casted a significant growth control (FIG. 10F), based on both tumor volume and weight measurements (FIG. 10G).

Figure 11A:
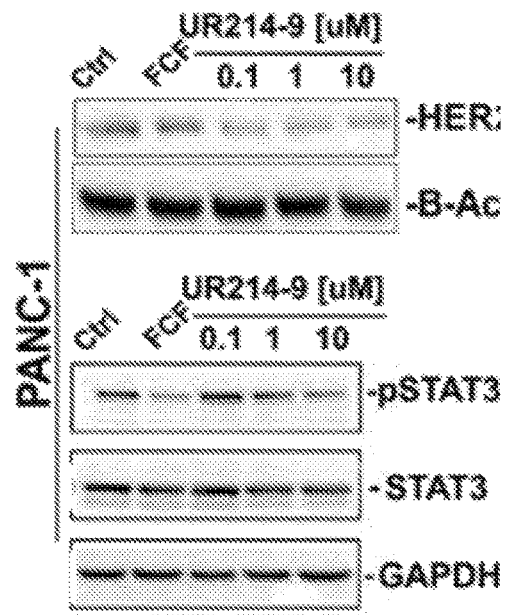
FIGS. 11A-11E show that UR214-9 inhibits HER2 expression and blocks phosphorylation of STAT-3.
Figure 11B:
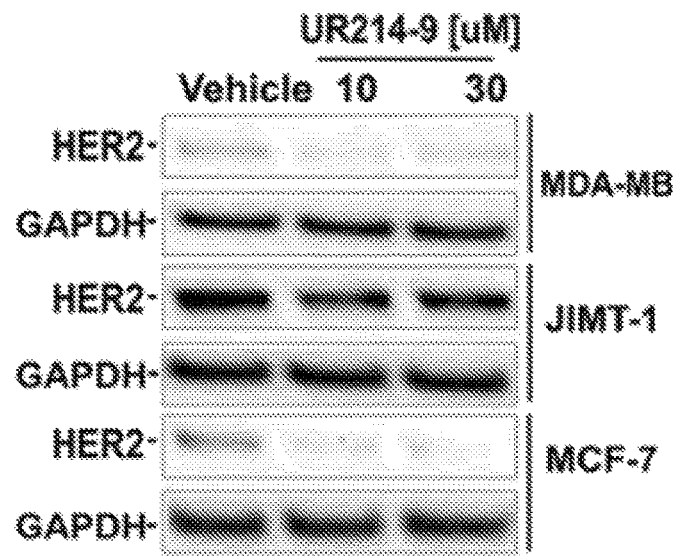
Figure 11C:
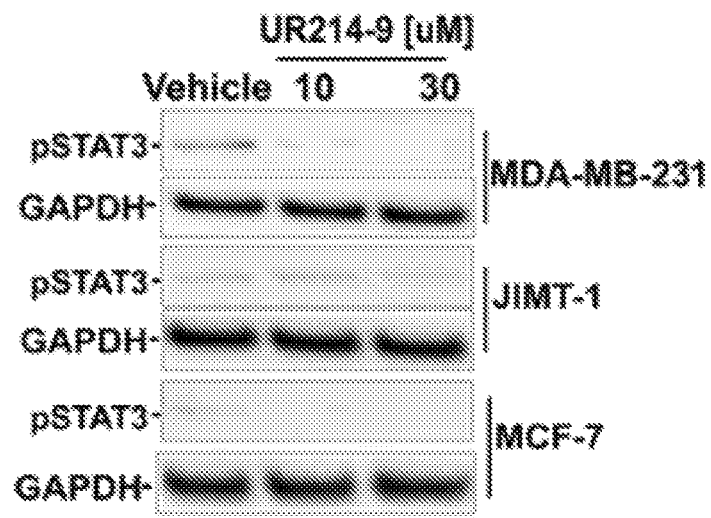
Figure 11D:
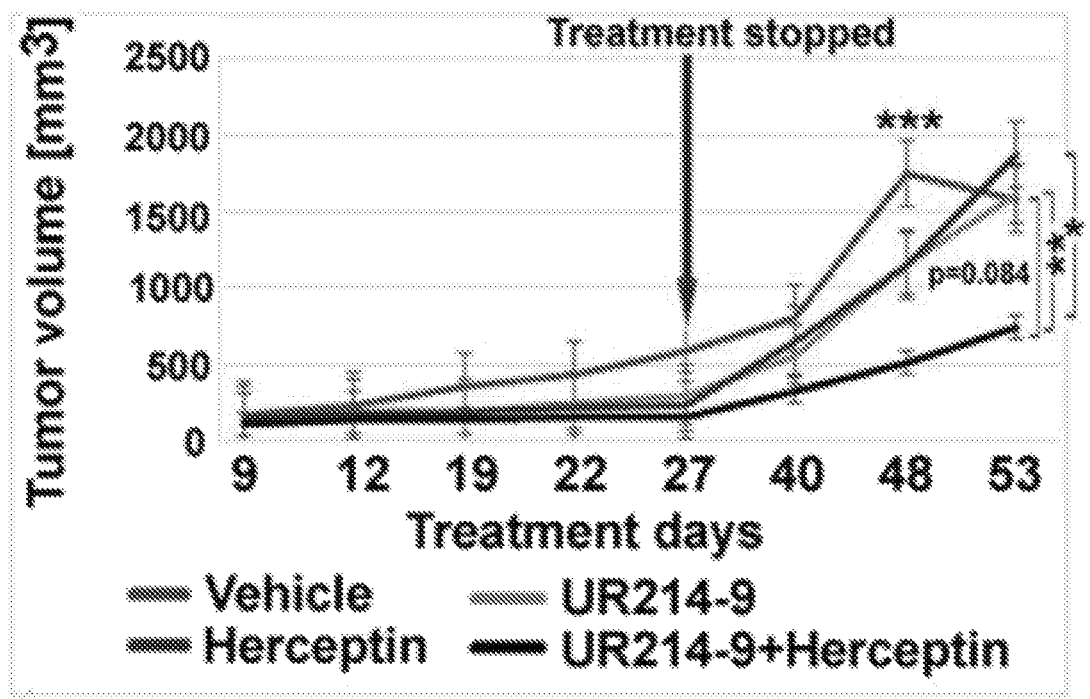
Figure 11E:
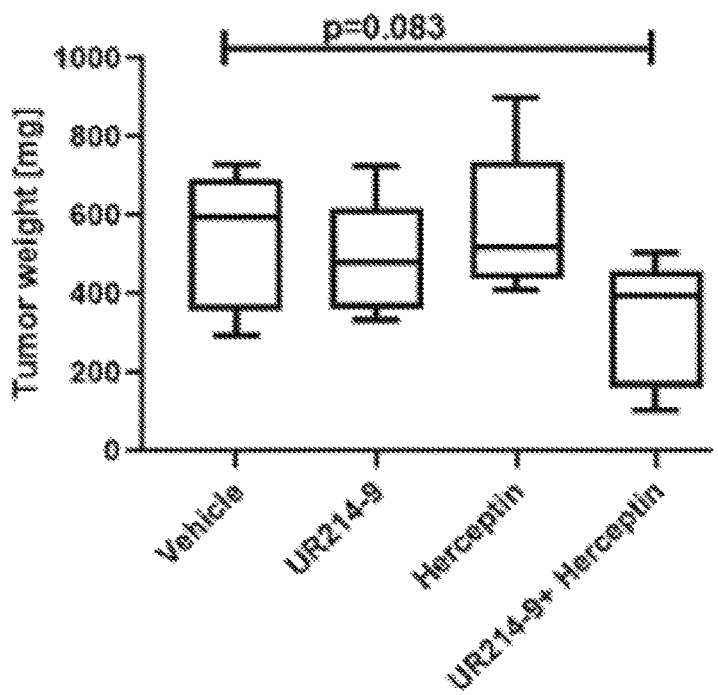

UR214-9 Inhibits HER2 Expression and Blocks Phosphorylation of STAT-3. Immunoblot analysis of the total cell lysates of pancreatic cancer cells PANC-1 (HER2+), cells treated with UR214-9 for 72 hours showed a dose-dependent decrease in HER2 expression in PANC-1 (FIG. 11A, upper). STAT3 phosphorylation is a down-stream readout of HER2 activation33, accordingly UR214-9 treatment also reduced phosphorylated STAT-3 in PANC-1 (FIG. 11A, lower) cells. Similarly, UR214-9 treatment reduced HER2 expression in a panel of MDA-MB-231, JIMT-1 and MCF-7 breast cancer cells (FIG. 11B) and reduced phosphorylation of STAT-3 in each cell-lines (FIG. 11C). We have recently shown that septin-2 is highly overexpressed in ovarian cancer (see James, N. E., Cantillo, E., Yano, N., Chichester, C. O., DiSilvestro, .P.A., Hovanesian, V., Rao, R. S. P., Kim, K. K., Moore, R. G., Ahsan, N., Ribeiro, J. R. Septin-2 is overexpressed in epithelial ovarian cancer and mediates proliferation via regulation of cellular metabolic proteins. Oncotarget. 10, 2959-2972, 2019). Similar to JIMT-1 and PANC-1 cell-lines, SKOV-3, a platinum resistant ovarian cancer cell-lines is characterized by HER2 amplification (see DeFazio-Eli, L., Strommen, K., Dao-Pick, T., Parry, G., Goodman, L., Winslow, J. Quantitative assays for the measurement of HER1-HER2 heterodimerization and phosphorylation in cell lines and breast tumors: applications for diagnostics and targeted drug mechanism of action. Breast Cancer Res. 13(2), R44, 2011; and English, D. P., Roque, D. M., Santin, A. D. HER2 expression beyond breast cancer: therapeutic implications for gynecologic malignancies. Mol. Diagn. Ther. 17, 85-99, 2013). SKOV-3 cell-line derived xenografts were therefore employed to validate the antitumor efficacy of UR214-9 against HER2 amplified xenograft tumors. To further ascertain the outcome of the combination of UR214-9 with trastuzumab, mice were additionally treated with trastuzumab alone or in combination with UR214-9. As shown in the FIG. 11D, both UR214-9 and trastuzumab controlled the growth of tumors. The combination clearly, controlled the tumor growth to a greater degree than both the drugs alone. The real benefit of combination of UR214-9 with trastuzumab became apparent when treatments were stopped and tumors were allowed to grow. As shown in the FIG. 11D while tumor sizes in UR214-9 and trastuzumab group reached the average size in control when the treatments were stopped, the combination maintained greater control over tumor growth (combination $p<0.0001**$ vs $p=0.0004*$ and $0.0001***$ for vehicle vs UR214-9 and trastuzumab). When extracted tumors were weighed, the combination group exhibited presence of smaller tumors, whereas, both the UR214-9 and trastuzumab group produced the tumors that matched the average size seen in vehicle group (FIG. 11E).

Figure 12A:
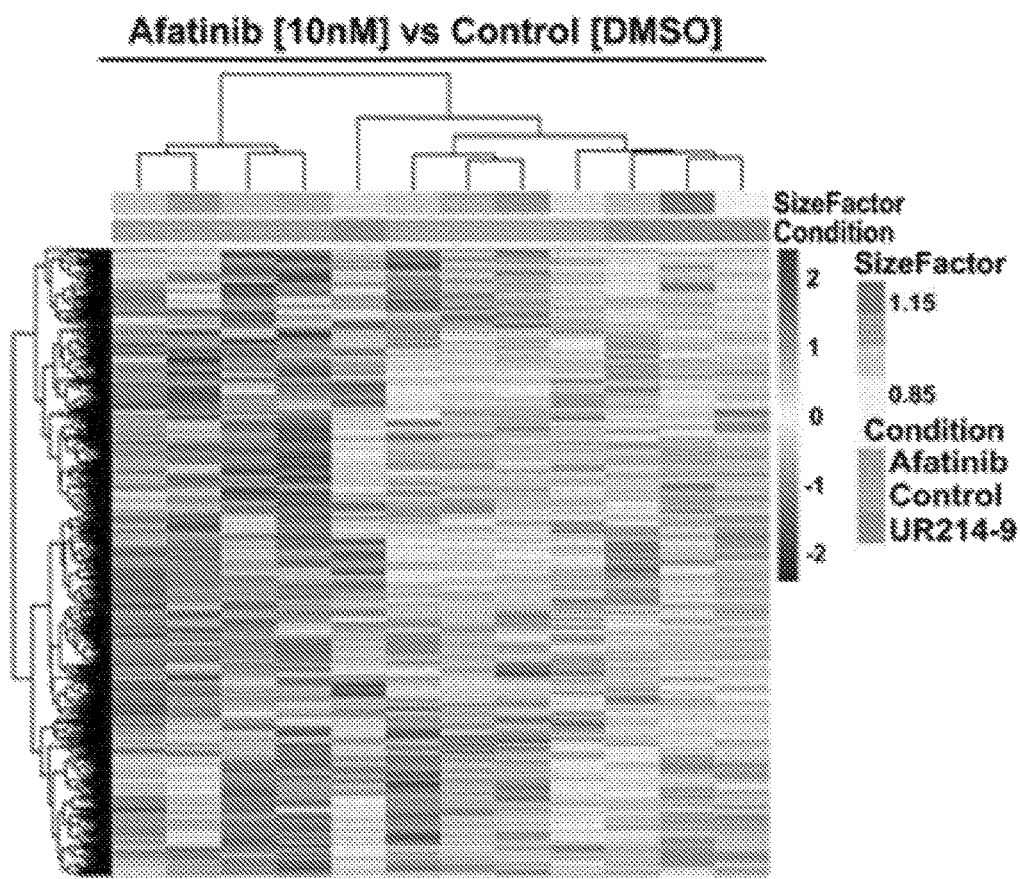
FIGS. 12A-12D shows that whole transcriptome analysis reveals that UR214-9 is target selective. Hierarchically clustered heat map of mRNA expression for 1234 significantly differentially expressed genes (BH adjusted p-value <0.050 in the JIMT-1 breast cancer cells treated with afatinib compared to control (FIG. 12A) and associated volcano plot (FIG. 12C). Hierarchically clustered heat map of mRNA expression for 11 significantly differentially expressed genes (BH adjusted p-vale <0.05) in the JIMT-1 breast cancer cells treated with UR214-9 compared to control (FIG. 12B) and associated volcano plot (FIG. 12D). Heatmap color key represents row scaling of the rLog transformed expression values. The volcano plots have horizontal lines at p-value 0.05.
Figure 12B:
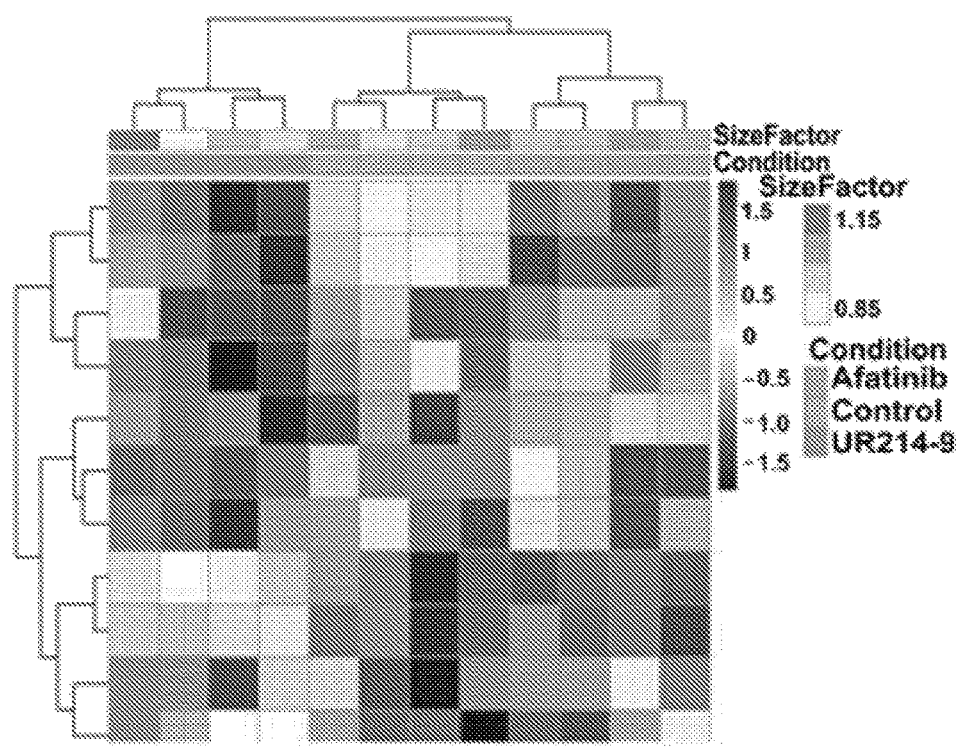
Figure 12C:
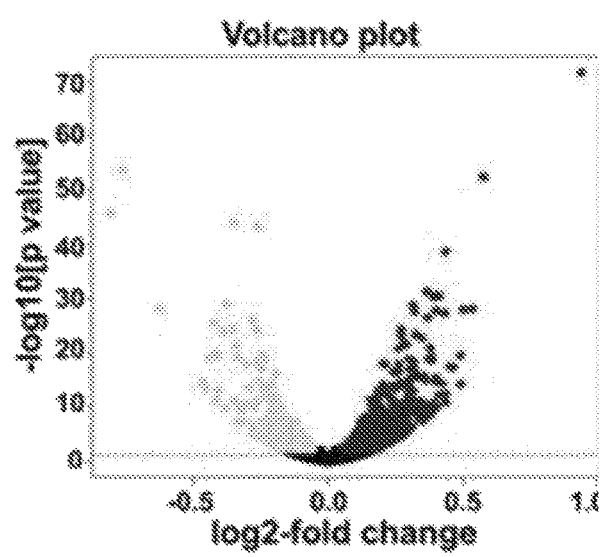
Figure 12D:
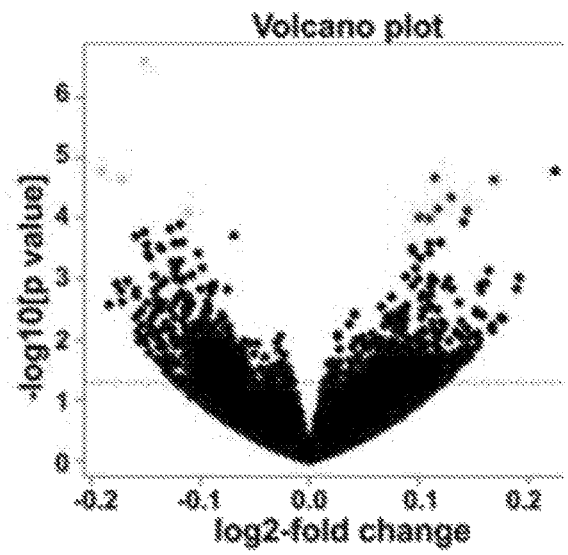

Whole Transcriptome Analysis Reveals That UR-214-9 is Selective. RNA-Seq was performed in the JIMT-1 and Panc-1 cell lines with three treatment groups (10 nM Afatinib, 1 μM UR214-9, and DMSO) of four replicates each. The samples were sequenced to an average depth of 58 million reads and greater than 90% of the read data for each sample aligned uniquely to the human reference genome (hg38) after adapter and quality trimming. The drug treatments were compared to the control group and differentially expressed genes were determined (adjusted p-value <0.05). There were 1236 (713 up and 523 down) dysregulated genes between Afatinib treatment and control (FIGS. 12A and 12C). The ENRICHR webtool was used to determine that the upregulated genes (ALPP, TRIM29, CYP1A1) are associated with extracellular matrix organization and cadherin binding, while the down regulated genes (EGR1, DUSP6, HMGA2, etc.) are associated with purine metabolism and ribosome biogenesis. Conversely, only 11 (7 up and 4 down) genes were called dysregulated between UR214-9 treatment and control (FIG. 12B and 12D). In terms of the PANC-1 cell line, there were only two genes (COL13A1 and PRSS22) determined to be significantly differentially expressed upon Afatinib treatment compared to the control group and no differentially expressed genes was called between UR214-9 and the control.

Discussion

Data continue to emerge on the association of septins with malignancies, making identification of septin-targeted therapies crucial to block the aberrant septin functions in cancer cells. Considering FCF that essentially strengthens septin-2 as the starting point, UR214-9 has been developed, a small molecule which dismantles septin-2 and -9 filamental assembly in cancer cells without killing the cells or altering the septins protein levels in the cells. Disrupting oligomeric septin filamental structures via UR214-9 treatment may be the key to impact cytokinesis and control the proliferation of cancer cells. Not only did the disruption of septin filaments by UR214-9 reduce the proliferation of pancreatic cancer cells (and of breast, ovarian endometrial, lung and kidney cancers) in vitro, xenografted tumors of breast, ovarian, pancreatic and lung malignancies treated with UR214-9 also showed reduction in tumor growth. Interestingly, the combination with trastuzumab led to stronger control over HER2 positive SKOV-3 xenograft's growth (FIG. 11D).

Enhancement in antitumor effects of trastuzumab via co-treatment with UR214-9 in HER2 positive ovarian cancer xenograft model is stemming likely from the association of septin-2 with HER2. Septin-2 is shown to maintain HER2 signaling in cancer cells. Septins protect and stabilize HER2 receptor at the plasma membrane of tumor cells to perpetuate the HER2 orchestrated oncogenic signaling and tumorigenesis. It is anticipated that targeting septins can improve the survival rate of HER2 positive breast, pancreatic and other malignancies such as ovarian and lung. HER2 overexpression leads to aggressive breast malignancy and poor patient survival (see Slamon, D. J., Clark, G. M., Wong, S. G., Levin, W. J., Ullrich, A., McGuire, W. L. Human breast cancer: correlation of relapse and survival with amplification of the HER-2/neu oncogene. Science 235:177-182, 1987). Current repertoire of therapies for HER2+ malignancies are inadequate. More than 60% of HER2+ breast cancer patients do not respond to trastuzumab treatment and resistance to the treatment develops rapidly in virtually all patients (see Pohlmann, P. R., Mayer, I. A., Mernaugh, R. Resistance to Trastuzumab in Breast Cancer. Clin Cancer Res. 15:7479-7491, 2009). Further, the inability of trastuzumab to penetrate solid breast tumors to block secreted (truncated) forms of HER2, that promote resistance and metastasis, limits its usefulness in providing a complete and lasting control over HER2 orchestrated breast tumor growth (see Hayes, D. F., Yamauchi, H., Broadwater, G., Cirrincione, C. T., Rodrigue, S. P., Berry, D. A., Younger, J., Panasci, L. L., Millard, F., Duggan, D. B., Norton, L., Henderson, I. C.; Cancer and Leukemia Group B. Circulating HER-2/erbB-2/c-neu (HER-2) extracellular domain as a prognostic factor in patients with metastatic breast cancer: Cancer and Leukemia Group B Study 8662. Clin. Cancer Res. 7, 2703-11, 2001). Similarly, treating or preventing brain metastases in patients with HER2+ breast cancer is challenging (see Belkacemi, Y., Hanna, N. E., Besnard, C., Majdoul, S., Gligorov, J. Local and Regional Breast Cancer Recurrences: Salvage Therapy Options in the New Era of Molecular Subtypes. Front Oncol. 8, 112, 2018), particularly in the post-trastuzumab phase of treatment. About two-thirds of patients develop brain metastases despite control or response of their extracranial disease to trastuzumab (see Clayton, A. J., Danson, S., Jolly, S., Ryder, W. D., Burt, P. A., Stewart, A. L., Wilkinson, P. M., Welch, R. S., Magee, B., Wilson, G., Howell, A., Wardley, A. M. Incidence of cerebral metastases in patients treated with trastuzumab for metastatic breast cancer. Br J Cancer 91,639-643, 2004). Because trastuzumab does not penetrate the central nervous system, the brain may serve as a sanctuary site (see Morris P G, McArthur H L, Hudis C A. Therapeutic options for metastatic breast cancer. Expert Opin Pharmacother. 10,967-981, 2009). A blood-brain barrier (BBB) penetrant drug would be required to better control brain metastases in patients with HER2+ positive cancers. UR214-9 carries the structural attributes of small polar surface area signatures (calculated for UR214-9=53.49 vs<90 required to cross BBB) that would facilitate penetration through the BBB. UR214-9, therefore, may improve outcomes of patients with brain metastases from HER2+ cancers.

Signaling associations of septins are not fully understood. To determine signaling association of septins and perturbations that UR214-9 treatment mounts, global ma-seq analyses of breast and pancreatic cancer cells treated with UR214-9 and, as a comparator, afatinib, a HER2 targeted therapy were conducted. As shown in FIGS. 12A-12D, afatinib treatment clearly had the most impact on the transcriptional profile of PANC-1 cells, while treatment with DMSO and UR214-9 did not have much effect on the transcriptome. The lack of differentially expressed genes between the UR214-9 treatment and control suggests that the mode of action of UR214-9 is non-transcriptional, and treatment with UR214-9 does not appear to elicit a gross transcriptional response.

Taken together, this example demonstrates that aberrant septins expression indicates poor prognoses among patients with cancer. UR214-9 is the first prototype of a small molecule that can induce septin-2 and -9 filamental catastrophe, a pharmacologic and cytoskeletal response of the cells not described before, to control cancer cell proliferation and tumor growth. Moreover, an important pharmacologic feature of UR214-9 is the benefits of limited off-target engagements. As shown in FIGS. 12A-12D, compared to afatinib, an EGFR targeted therapy that affected gene expression of over 1200 genes in JIMT-1 breast cancer cells, UR214-9 treatment even at 100-fold higher dose affected less than 20 genes significantly. Although UR214-9 is a close structural analog of FCF, UR214-9 differs significantly from FCF pharmacologically. While FCF is shown to strengthen septin-2, UR214-9 dismantles septin-2 and septin-9 filamental assembly. ICM scores calculated through molecular docking indicated greater binding affinity of UR214-9 with septin-2:septin-2 dimer complex than FCF. Other than FCF, which is clinically unfit due to the weak pharmacologic effects, off-target effects and functions associated with strengthening the septin-2 filaments, UR214-9 may be the only septin modulator described so far that can dismantle septin's structural arrangement in nano molar concentrations (70 nM-1 uM). Given the preliminary anti-tumor response in breast, pancreatic, ovarian and lung cancer xenograft models (data not shown) and its therapeutic capabilities to significantly enhance the response of trastuzumab in HER2 expressing xenograft tumors it is apparent that dismantling septins is an effective and clinically promising approach to prevent tumor growth, although doses, delivery formulations and frequencies of administrations have to be optimized, and a synergistic or at least an additive combinational agent has to be identified to achieve fuller control over the tumor growth. Based on the promising outcome in combination with trastuzumab, the outcome of combination of UR214-9 with paclitaxel and trastuzumab in breast cancer models to increase the clinical utilities of UR214-9 is currently being evaluated.

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. Genbank and NCBI submissions indicated by accession number cited herein are hereby incorporated by reference. All other published references, documents, manuscripts and scientific literature cited herein are hereby incorporated by reference.

While this invention has been particularly shown and described with references to preferred embodiments thereof, it will be understood by those skilled in the art that various changes in form and details may be made therein without departing from the scope of the invention encompassed by the appended claims.

What is claimed is:

1. A compound selected from

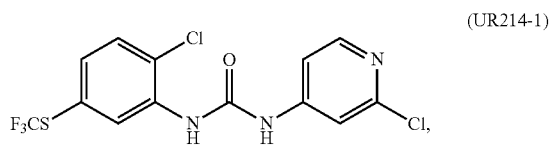
(UR214-1)

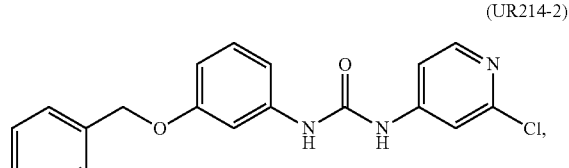
(UR214-2)

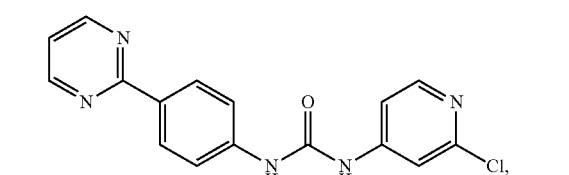
(UR214-4)

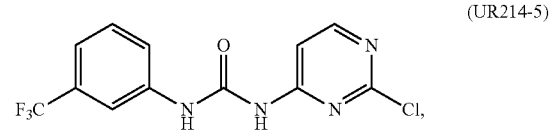
(UR214-5)

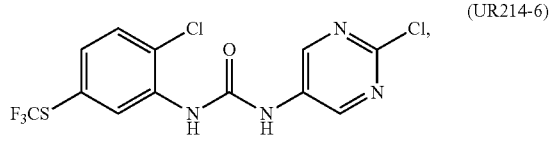
(UR214-6)

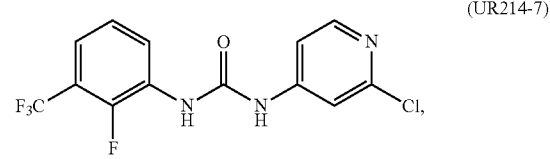 [SMILES: O=C(Nc1ccnc(Cl)c1)Nc1cccc(C(F)(F)F)c1F]
(UR214-7)

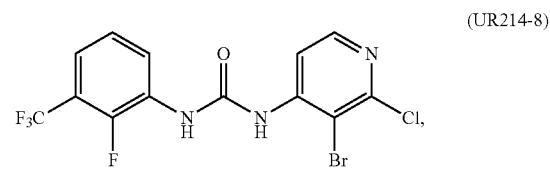
(UR214-8)

-continued (UR214-9)

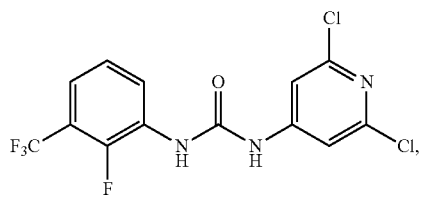

(UR214-10)

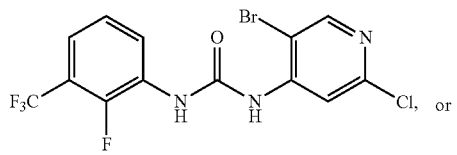

(UR214-11)

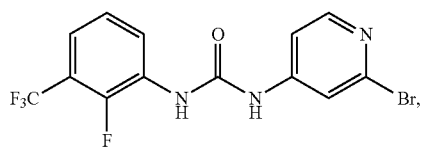

or a pharmaceutically acceptable salt thereof.

2. A pharmaceutical composition comprising the compound of claim 1, or its pharmaceutically acceptable salt thereof, and a pharmaceutically acceptable excipient.

3. A method of treating a cancer in a subject in need thereof, comprising administering to the subject a therapeutically effective amount of the compound of claim 1, or its pharmaceutically acceptable salt thereof.

4. The method of claim 3, wherein the cancer selected from the group consisting of pancreatic cancer, breast cancer, lung cancer, kidney (renal) cancer, liver cancer, ovarian cancer, endometrial cancer, basal cell carcinoma, biliary tract cancer, bladder cancer, bone cancer, brain and/or CNS cancer, cervical cancer, choriocarcinoma, colon and rectum cancer, connective tissue cancer, endometrial cancer, esophageal cancer, eye cancer, fibroma, cancer of the head and neck, gastric cancer, intra-epithelial neoplasm, larynx cancer, leukemia, melanoma, oral cavity cancer, prostate cancer, retinoblastoma, rhabdomyosarcoma, rectal cancer, cancer of the respiratory system, sarcoma, skin cancer, stomach cancer, testicular cancer, thyroid cancer, uterine cancer, cancer of the urinary system, or any combination thereof.

5. The method of claim 3, wherein the method further comprises administering one or more additional therapeutic agents.

6. The method of claim 5, wherein the one or more additional therapeutic agents are selected from the group consisting of a chemotherapeutic agent or an antibody.

7. The method of claim 6, wherein the one or more additional therapeutic agents are selected from the group consisting of a taxane, paclitaxel, an anti- HER2 antibody, or trastuzumab.

\* \* \* \* \*